US012002616B2

(12) United States Patent
Horikawa et al.

(10) Patent No.: US 12,002,616 B2
(45) Date of Patent: Jun. 4, 2024

(54) COIL DEVICE

(71) Applicant: TDK CORPORATION, Tokyo (JP)

(72) Inventors: Toshiyuki Horikawa, Tokyo (JP); Masaaki Iwakura, Tokyo (JP); Masaru Kumagai, Tokyo (JP); Shoichi Sasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 587 days.

(21) Appl. No.: 17/089,859

(22) Filed: Nov. 5, 2020

(65) Prior Publication Data

US 2021/0249180 A1 Aug. 12, 2021

(30) Foreign Application Priority Data

Nov. 5, 2019 (JP) ................................. 2019-200961
Oct. 29, 2020 (JP) ................................. 2020-181806

(51) Int. Cl.
*H01F 27/29* (2006.01)
*H01F 27/28* (2006.01)
*H01F 27/24* (2006.01)

(52) U.S. Cl.
CPC ......... *H01F 27/2823* (2013.01); *H01F 27/29* (2013.01); *H01F 27/24* (2013.01)

(58) Field of Classification Search
CPC .................................................. H01F 27/2823
USPC .......................................................... 336/192
See application file for complete search history.

(56) References Cited

U.S. PATENT DOCUMENTS

2011/0260820 A1* 10/2011 Liao ...................... H01F 27/325 336/192
2014/0001976 A1* 1/2014 Park .......................... H01F 5/04 315/276
2014/0002968 A1* 1/2014 Nam ......................... H01F 5/04 361/679.01
2015/0061808 A1* 3/2015 Iwakura ................ H01F 27/346 336/178
2015/0170819 A1 6/2015 Yamashima et al.

FOREIGN PATENT DOCUMENTS

JP H11-297544 A 10/1999
JP 2014-036194 A 2/2014
JP 2019-067925 A 4/2019

* cited by examiner

*Primary Examiner* — Ronald Hinson
(74) *Attorney, Agent, or Firm* — Oliff PLC

(57) ABSTRACT

A coil device includes a bobbin, a terminal, and a terminal block. The bobbin includes a winding portion for winding a wire around an outer circumference of the winding portion. The terminal is connectable with an end of the wire. The terminal block holds the terminal. The terminal is movable both in a first axis and a second axis of the bobbin.

18 Claims, 31 Drawing Sheets

COIL DEVICE

BACKGROUND OF THE INVENTION

The present invention relates to a coil device that can also favorably be used as, for example, a transformer.

As a coil device used for, for example, a transformer, the coil device shown in Patent Document 1 is known. In such a conventional coil device, a terminal block is fixed to a bobbin, a terminal fitting is engaged and fixed to the terminal block, an end of a wire constituting a coil is connected to the terminal fitting, and an external circuit is connected to the terminal fitting.

In such a coil device, there is no problem when a lead wire from the external circuit is connected to the terminal fitting. In recent years, however, there have been many requests for directly positioning and connecting the terminal fitting of the coil device to a circuit board or a connector as a connection target of the coil device. In that case, it is necessary to precisely align a position of the terminal fitting and a position of a connection portion of the connection target, it is difficult to manufacture and assemble each component of the coil device, and there is a problem that the manufacturing cost increases.

Patent Document 1: JP2014036194 (A)

BRIEF SUMMARY OF INVENTION

The present invention has been achieved under such circumstances. It is an object of the invention to provide a coil device that is easily positioned with a connection target and is easy to manufacture and assemble each component.

To achieve the above object, a coil device according to a first aspect of the present invention comprises:

a bobbin including a winding portion for winding a wire around an outer circumference of the winding portion;

a terminal connectable with an end of the wire; and a terminal block for holding the terminal, wherein the terminal is movable both in a first axis and a second axis of the bobbin.

In the coil device according to the first aspect of the present invention, the terminal is movable both in a first axis and a second axis of the bobbin. Thus, the terminal and a connection target can accurately be positioned and connected only by relatively moving the terminal to the bobbin after roughly positioning the connection target and the coil device.

In the coil device according to the first aspect of the present invention, the coil device does not need to be manufactured by accurately aligning a position of the terminal of the terminal block with an attachment position of the connection target. This facilitates the manufacture and assembling of each component constituting the coil device and contributes to reduction in manufacturing cost.

To achieve the above object, a coil device according to a second aspect of the present invention comprises:

a bobbin including a winding portion for winding a wire around an outer circumference of the winding portion;

a terminal connectable with an end of the wire; and a terminal block for holding the terminal and being attached to the bobbin movably both in a first axis and a second axis of the bobbin.

The coil device according to the second aspect of the present invention includes a terminal block for holding the terminal and being attached to the bobbin movably both in a first axis and a second axis of the bobbin. Thus, the terminal of the terminal block and a connection target can accurately be positioned and connected only by relatively moving the terminal block to the bobbin after roughly positioning the connection target and the coil device.

Also in the coil device according to the second aspect of the present invention, the coil device does not need to be manufactured by accurately aligning a position of the terminal of the terminal block with an attachment position of the connection target. This facilitates the manufacture and assembling of each component constituting the coil device and contributes to reduction in manufacturing cost.

The terminal block may be attached to a case for housing the bobbin or to a cover for covering at least a part of the bobbin. In this structure, the terminal of the terminal block and a connection target can accurately be positioned and connected only by relatively moving the terminal block to the case or the cover after roughly positioning the connection target and the coil device.

Preferably, the terminal is attached to the terminal block so as to movable in a third axis of the bobbin. In this structure, it is easy to slightly adjust an attachment position of the terminal and a connection target even in the third axis. As a result, the coil devices do not need to be manufactured by accurately aligning a position of the terminal to an attachment position of the connection target even in the third axis. This further facilitates the manufacture and assembling of each component constituting the coil devices and further contributes to reduction in manufacturing cost.

The terminal block may be movable in a third axis of the bobbin. Also in this case, the terminal and an attachment position of the connection target are easily slightly adjusted in the third axis by relatively moving the terminal block to the bobbin in the third axis, and the above-mentioned effect can be obtained.

Either of the bobbin and the terminal block may be provided with a loose engagement convex portion protruding in the first axis, the other of the bobbin and the terminal block may be provided with a loose engagement concave portion for inserting the loose engagement convex portion, and the loose engagement convex portion may be inserted in the loose engagement concave portion so as to be movable in the first axis and the second axis within a predetermined range. Instead, either of the bobbin and the terminal block may be provided with a loose engagement convex portion protruding in the second axis or the third axis, the other of the bobbin and the terminal block may be provided with a loose engagement concave portion for inserting the loose engagement convex portion, and the loose engagement convex portion may be inserted in the loose engagement concave portion so as to be movable in the first axis and the second axis within a predetermined range. In this structure, the terminal block for holding the terminal can be attached to the bobbin so as to be movable both in the first axis and the second axis of the bobbin.

An inner wall constituting the loose engagement concave portion may be partly structured by a support piece elastically deformable to open an entrance width of the loose engagement concave portion, and the support piece may be provided with a stopper convex portion serving as a retainer by engaging with the loose engagement convex portion. In this structure, the loose engagement convex portion is attached to the loose engagement concave portion so as to be movable in the first axis and the second axis, and the terminal block is prevented from coming off from the bobbin at the same time, only by inserting the loose engagement convex portion into the loose engagement concave portion. Thus, the terminal block is more easily attached to the bobbin.

The coil devices may further comprise a stopper wall portion serving as a retainer by being attached to the loose engagement convex portion inserted in the loose engagement concave portion, and the stopper wall portion may include an engagement portion for engaging with the loose engagement convex portion. When the engagement portion engages with the loose engagement convex portion, the stopper wall portion can prevent the terminal block from coming off from the bobbin while the loose engagement convex portion is being attached to the loose engagement concave portion so as to be movable in the first axis and the second axis.

The coil devices may further comprise a stopper wall portion serving as a retainer by being attached to the loose engagement convex portion inserted in the loose engagement concave portion, the stopper wall portion may be connected to the loose engagement convex portion with resin. When the stopper wall portion is connected to the loose engagement convex portion with resin, the stopper wall portion can prevent the terminal block from coming off from the bobbin while the loose engagement convex portion is being attached to the loose engagement concave portion so as to be movable in the first axis and the second axis.

Preferably, the loose engagement convex portion includes a main convex portion and a sub convex portion, the loose engagement concave portion includes a main concave portion for inserting the main convex portion and a sub concave portion for inserting the sub convex portion, a gap between the sub convex portion and the sub concave portion in the third axis is smaller than that between the main convex portion and the main concave portion in the third axis, and the terminal block is held movably in the first axis and the second axis to the bobbin along a guide surface where the sub convex portion and the sub concave portion contact with each other. In this structure, the terminal block can smoothly move along the guide surface in the first axis and the second axis with respect to the bobbin without rattling. In addition, when the gap between the main convex portion and the main concave portion in the third axis is relatively large, the loose engagement convex portion can relatively easily be inserted into the loose engagement concave portion.

Preferably, two sub convex portions are formed on both sides of the main convex portion, and two sub concave portions are formed on both sides of the main concave portion. Preferably, the protrusion height of the main convex portion in the first axis is larger than that of the sub convex portions in the first axis. In this structure, the loose engagement convex portion is easily inserted into the loose engagement concave portion, and it is possible to reduce the friction on guide surfaces where the sub convex portions and the sub concave portions contact with each other.

The terminal may include: a wire connection portion for fixing and connecting an end of the wire; and a hook portion formed at a different position from the wire connection portion and inserted movably in the third axis into a terminal groove formed on the terminal block. In this structure, it is easy to connect the end of the wire to the terminal and is also easy to movably attach the terminal in the third axis to the terminal block.

Preferably, the terminal may include: an insertion hole formed between the wire connection portion and the hook portion; and an external circuit connection piece formed between the wire connection portion and the hook portion. A fastener, such as bolt and screw, is attached to the insertion hole, and the terminal can be positioned and attached to a board via the fastener. The external circuit connection piece can directly be positioned and attached to the board.

Preferably, the terminal block is provided with an inner cover for engaging with the hook portion and restricting a movement range of the terminal in the third axis. The terminal can be prevented from coming off from the terminal, and the movement of the terminal to the terminal block in the third axis can be restricted, only by attaching the inner cover.

The terminal block may be movable in the third axis of the bobbin, and the terminal may be formed integrally with the terminal block. In this structure, it is possible to simplify the step of attaching the terminal to the terminal block, and the coil devices are easily manufactured.

The terminal may comprise a plurality of the terminals, the terminal block may comprise a plurality of the terminal blocks, and the plurality of the terminals may be attached to the plurality of the terminal blocks, respectively. In this structure, the terminals can be moved relatively to the bobbin in an independent manner for each of the terminals, and the terminals and connection targets can precisely be positioned and connected.

Preferably, the terminal block is provided with an outer cover covering the inner cover, an end of the terminal block in the first axis, and an end of the terminal block in the second axis. When the outer cover is made of insulating member, the improvement in insulating properties can be expected.

Preferably, the outer cover covers an end of the terminal block in the third axis so as to expose the wire connection portion. In this structure, the surroundings of the loose engagement convex portion and the loose engagement concave portion can be covered by the outer cover, and it is possible to prevent the loose engagement convex portion and the loose engagement concave portion from being deformed due to external force or so and to effectively prevent the terminal block from coming off from the bobbin.

DETAILED DESCRIPTION OF INVENTION

Hereinafter, the present invention is explained based on embodiments shown in the figures.

First Embodiment

Figure 1A:
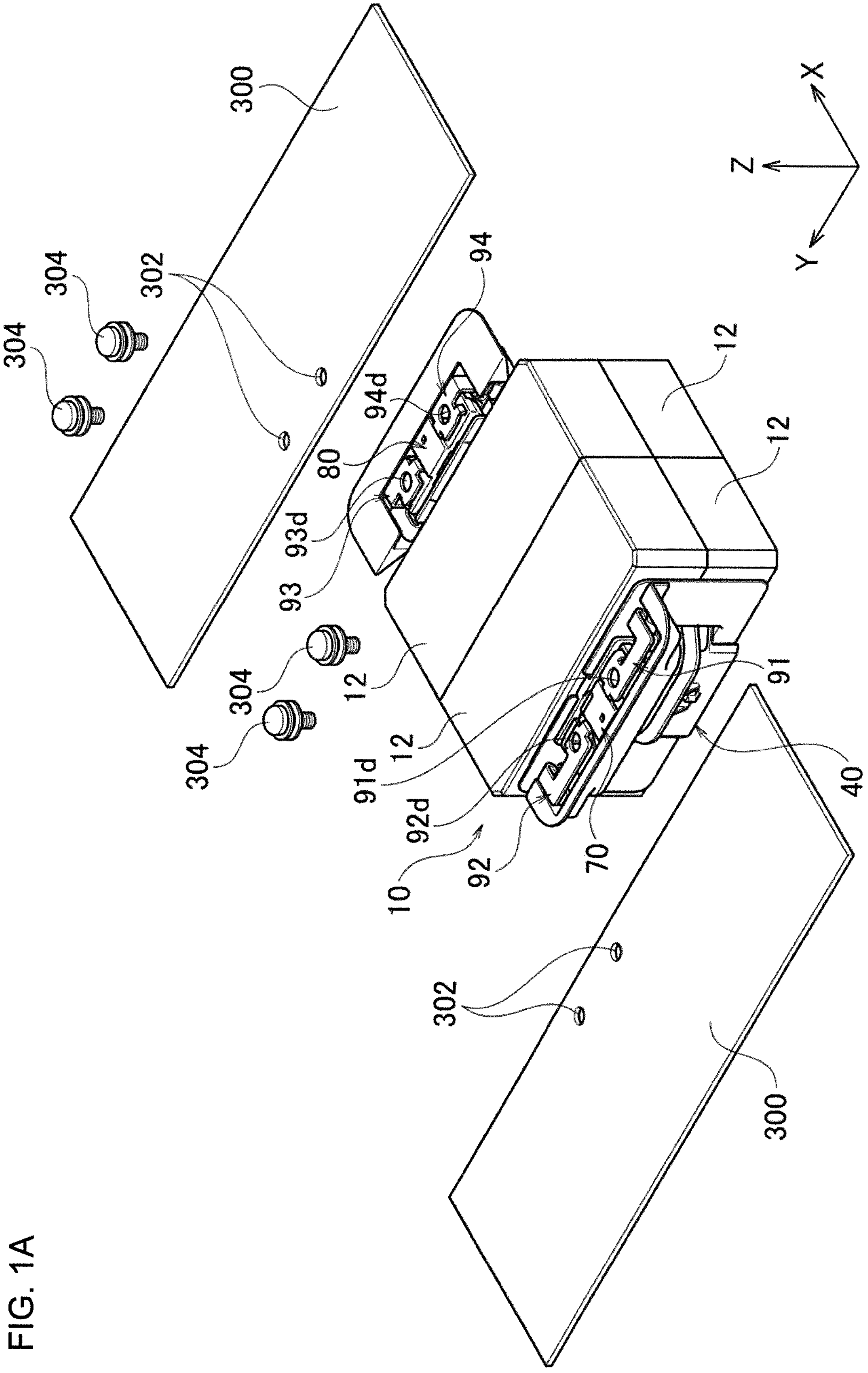
FIG. 1A is a perspective view of a coil device according to First Embodiment of the present invention.

As shown in FIG. 1A, a coil device 10 according to an embodiment of the present invention is used by being attached to a board, such as a circuit board 300. An installation surface of the coil device 10 is located above in the Z-axis direction. The coil device 10 includes a first terminal block 70 and a second terminal block 80 on both sides in the X-axis. The coil device 10 can be used as, for example, a transformer.

A pair of terminal fittings 91 and 92 is attached to both sides of the first terminal block 70 in the Y-axis direction. A pair of terminal fittings 93 and 94 is attached to both sides of the second terminal block 80 in the Y-axis direction. The terminal fittings (terminals) 91 to 94 are integrally formed of a conductive plate material, such as a metal plate, by press working or the like.

In the present embodiment, the X-axis, the Y-axis, and the Z-axis of the figures substantially perpendicularly intersect each other. The Z-axis is a direction perpendicular to the installation surface of the coil device 10, and the X-axis is a direction in which the pair of terminal fittings 91 and 92 and the pair of terminal fittings 93 and 94 are located on opposite sides of each other.

Figure 2A:
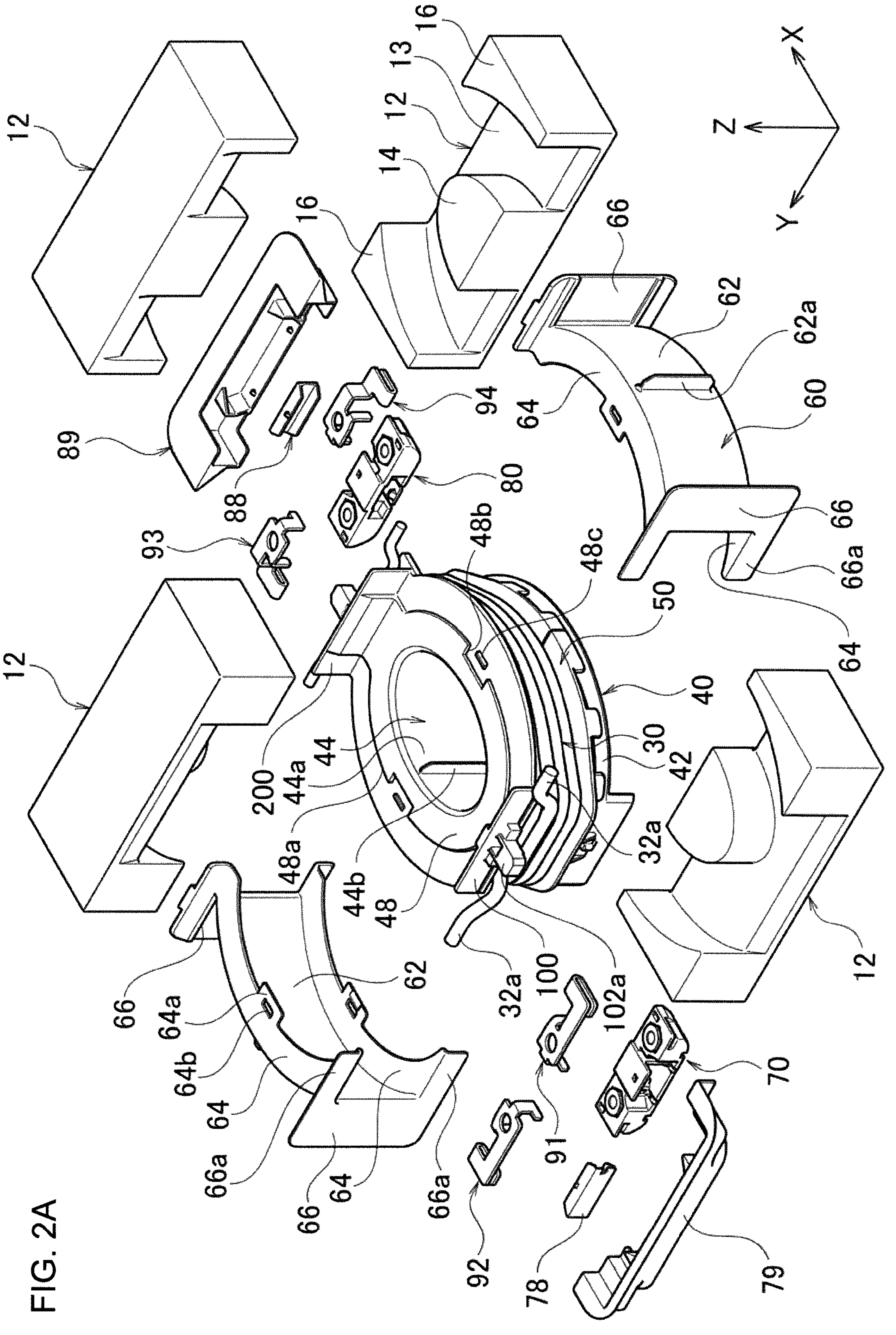
FIG. 2A is an exploded perspective view of the coil device shown in FIG. 1A.

As shown in FIG. 2A, the coil device 10 includes four cores 12, a bobbin 40, the pair of terminal blocks 70 and 80, and two core covers 60 and 60. The four cores 12 are assembled to form a magnetic path through which a magnetic flux generated by the coil mentioned below passes. The cores 12 have a symmetrical shape and are connected to each other so as to sandwich the core covers 60 and the bobbin 40 from the vertical direction (Z-axis direction in the figure).

Each of the cores 12 has a substantially E-shaped longitudinal cross section (cut surface including the Y-axis and the Z-axis). Each of the cores 12 is made of a soft magnetic material, such as ferrite and metallic magnetic material, and includes a flat plate-shaped base 13 extending in the Y-axis direction, side legs 16 and 16 protruding from both ends of the base 13 in the Y-axis direction to the Z-axis direction, and a middle leg 14 protruding from an intermediate position of the base 13 in the Y-axis direction to the Z-axis direction.

In the present embodiment, the middle leg 14 of each core 12 enters a first through hole 44*a* formed in a first hollow cylinder portion 44 of the bobbin 40. A gap is formed between the cores 12 and 12 adjacent to each other in the X-axis direction by separation convex portions 44*b* formed on an inner peripheral wall of the first hollow cylinder portion 44. When a highly thermally conductive resin, such as potting resin, enters the gap, the heat dissipation of the heat generated inside the coil device 10 is improved.

The gap formed by the separation convex portions 44*b* corresponds to the thickness of the separation convex portions 44*b* in the X-axis direction. The separation convex portions 44*b* are formed along the Z-axis in the through hole 44*a* at a central part in the X-axis direction and on both sides in the Y-axis direction. The thickness of the separation convex portions 44*b* in the X-axis direction is not limited, but is preferably 0.05-5 mm, more preferably 0.1-3 mm.

Figure 2B:
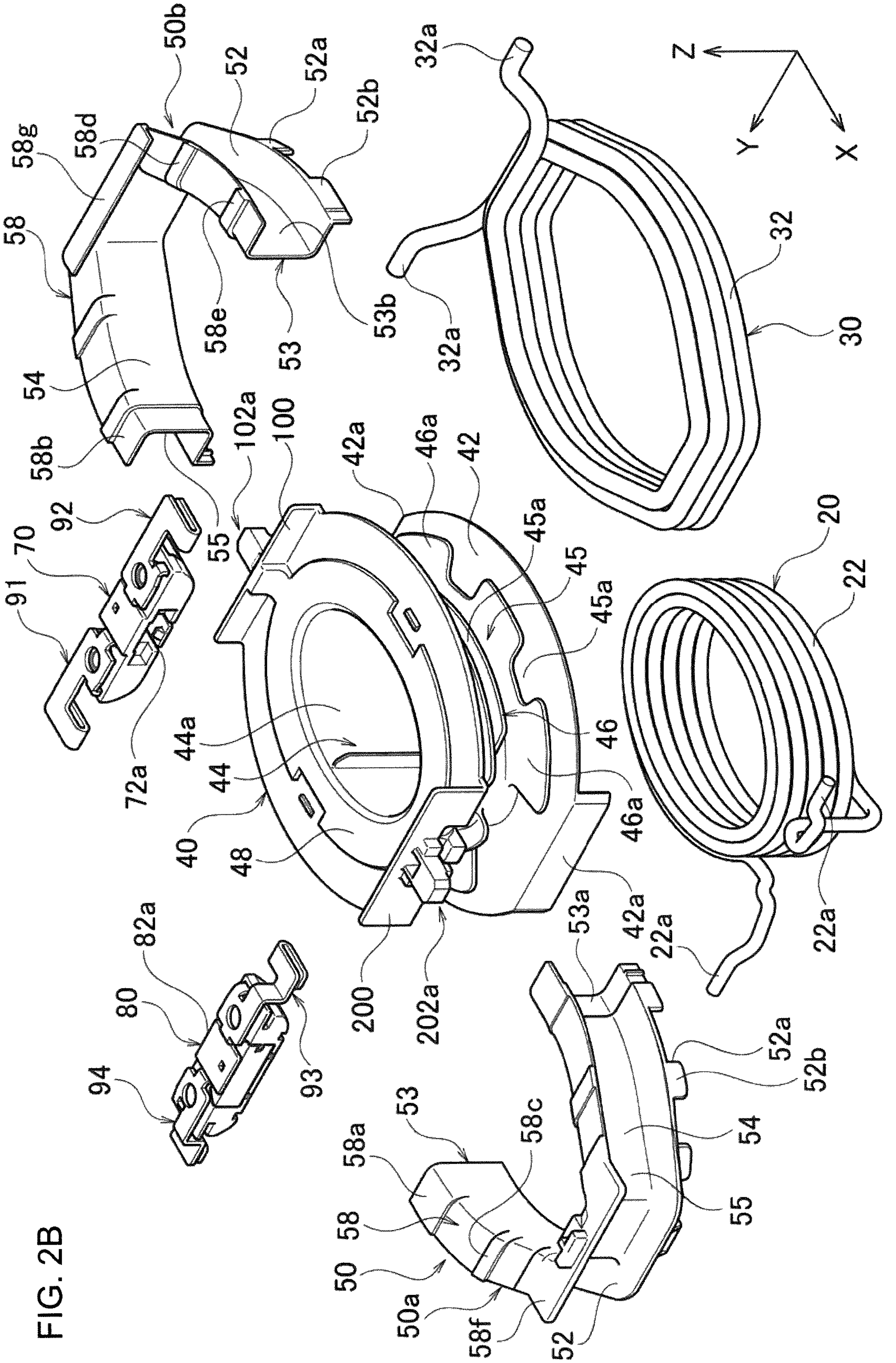
FIG. 2B is an exploded perspective view of a bobbin shown in FIG. 1A.
Figure 3:
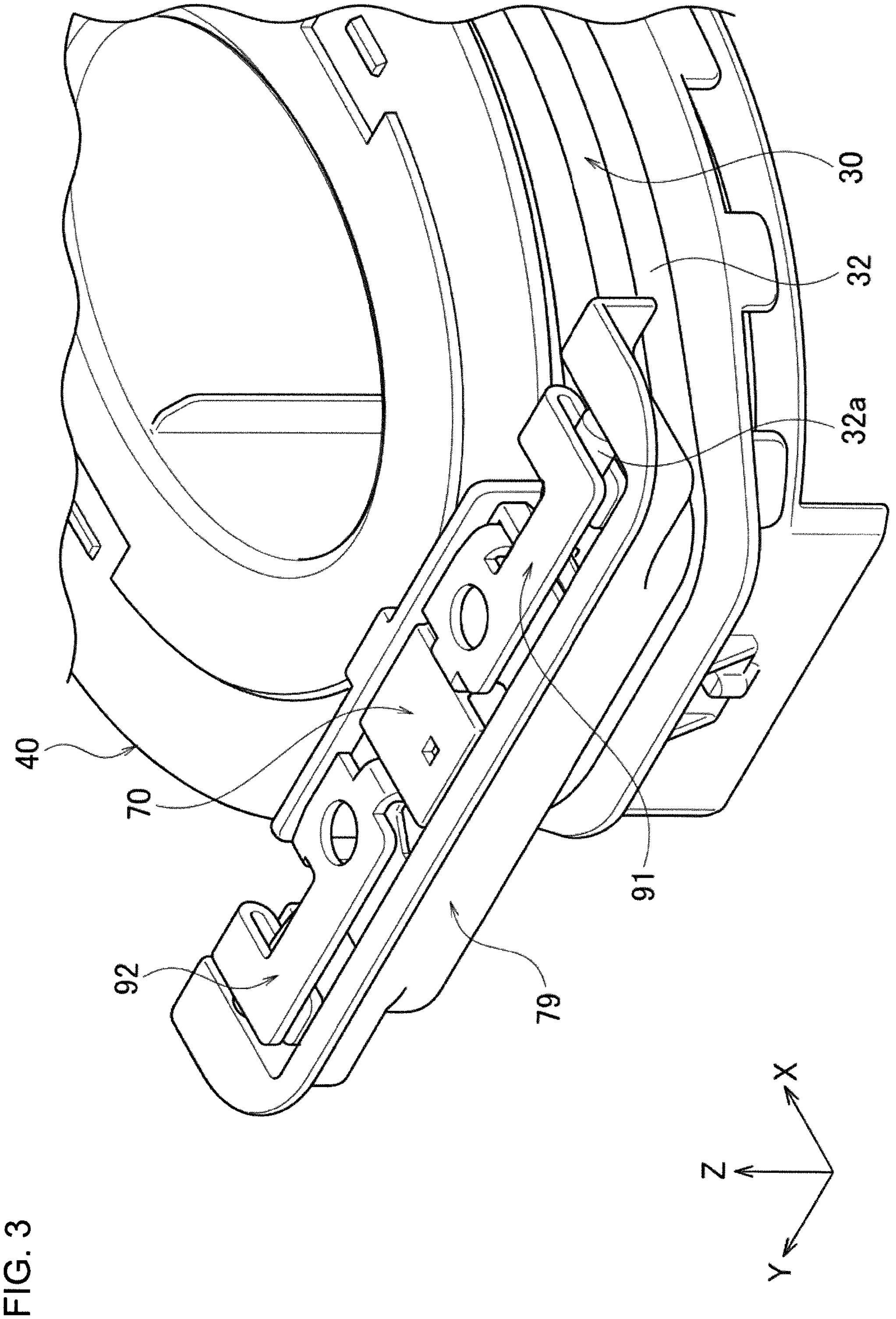
FIG. 3 is an enlarged perspective view of a main part of a terminal block attached to the bobbin of the coil device shown in FIG. 1A.

As shown in FIG. 2B, the bobbin 40 includes a substantially elliptical flat plate-shaped bobbin board 42 at the lower end of the bobbin 40 in the Z-axis direction. The first hollow cylinder portion 44 is integrally formed at a substantially central part of the bobbin board 42 so as to extend upward in the Z-axis direction.

A bobbin upper flange portion 48 is integrally formed at the upper part of the first hollow cylinder portion 44 in the Z-axis direction so as to protrude in the radial direction from the first hollow cylinder portion 44 on a Y-axis-X-axis plane. Insulation walls 100 and 200 are integrally formed along the Y-axis direction at both ends of the bobbin upper flange portion 48 in the X-axis direction so as to protrude upward in the Z-axis direction.

In the present embodiment, a loose engagement convex portion 102*a* (202*a*) is formed at a substantially central part in the Y-axis direction of the outer wall in the X-axis direction of the insulation wall 100 (200) so as to protrude in the X-axis direction. A loose engagement concave portion 72*a* (82*a*) of the terminal block 70 (80) is attached to the loose engagement convex portion 102*a* (202*a*). The terminal fittings 91 and 92 as terminals are attached to the terminal block 70, and the terminal fittings 93 and 94 as terminals are attached to the terminal block 80. In the present embodiment, it is preferred that the terminal blocks 70 and 80 are formed separately from the bobbin 40 and are made of different resin materials, but the terminal blocks 70 and 80 may be made of the same resin material.

As shown in FIG. 2B, a first winding portion 45 is formed on the outer peripheral part of the first hollow cylinder portion 44 located between the bobbin upper flange portion 48 and the bobbin board 42. In the first winding portion 45, a plurality of winding partition flanges 46 separating the wire winding portions adjacent to each other in a winding axis (Z-axis) of a first wire 22 constituting an inner coil 20 is formed integrally with the first hollow cylinder portion 44 substantially in parallel to the bobbin board 42 (and the bobbin upper flange portion 48) at predetermined intervals in the winding axis.

Preferably, the bobbin board 42, the first hollow cylinder portion 44, the bobbin upper flange portion 48, and the winding partition flanges 46 of the bobbin 40 are formed integrally by injection molding or so. The first through hole 44*a* penetrating in the Z-axis direction is formed inside the first hollow cylinder portion 44 of the bobbin board 42.

As shown in FIG. 2A, the middle legs 14 of the cores 12 enter the first through hole 44*a* from above and below in the Z-axis direction, and the tips of the middle legs 14 butt against each other at a substantially central part of the through hole 44*a* in the Z-axis direction. At the substantially central part of the through hole 44*a* in the Z-axis direction, the tips of the middle legs 14 inserted from above and below the Z-axis may not be contacted with each other to form a gap with a predetermined interval.

As shown in FIG. 2B, a bobbin cover 50 is structured by a pair of half-split bodies 50*a* and 50*b* capable of being split into two pieces in the X-axis direction and is combined by split connection portions 53 parallel to the winding axis (Z-axis), and a second winding portion 55 is formed on the outer peripheral part of the cover 50 in the combined state. After the first wire 22 is wound around the first winding portion 45 of the bobbin 40 to form the inner coil 20, the bobbin cover 50 is attached to the outer periphery of the bobbin 40 and is combined by the split connection portions 53.

The bobbin cover 50 includes a second hollow cylinder portion 54 covering the inner coil 20 from outside, and a cover lower flange portion 52 and a cover upper flange portion 58 are arranged along the circumferential direction at a predetermined interval in the Z-axis direction on the outer peripheral part of the second hollow cylinder portion 54. The lower flange portion 52 and the upper flange portion 58 are arranged in parallel to the plane of the XY axes and extend in parallel to the installation surface.

The second winding portion 55 is formed between the lower flange portion 52 and the upper flange portion 58. A second wire 32 constituting an outer coil 30 serving as, for example, a secondary coil is normally wound (or α-wound) in the second winding portion 55. "normally wound" is a normal winding in which a wire is wound from one end to the other end of a winding axis. "α-winding" is mentioned below.

As shown in FIG. 2A, the pair of core covers 60 is attached to the outer circumference of the bobbin cover 50 provided with the outer coil 30 from both sides in the Y-axis direction. Each of the core covers 60 are made of an insulating member, such as synthetic resin, and includes a cover body 62. The outer circumferential surface of the cover body 62 serves as a guide surface for guiding the side legs 16 of the core 12. The outer coil 30 is located on the inner circumferential surfaces of the cover bodies 62.

Attachment edges 64 and 64 are integrally formed at both ends of each cover body 62 in the Z-axis direction. The attachment edges 64 on the upper side in the Z-axis engage with the upper surface of the bobbin upper flange portion 48, and the attachment edges 64 on the lower side in the Z-axis engage with the lower surface of the bobbin board 42. The core covers 60 are attached to the bobbin 40.

Each cover body 62 has an inner circumferential surface shape corresponding to the outer circumferential surface shape of each core cover 60. Insulation plate portions 66 are integrally formed at both ends of each cover body 62 in the X-axis direction. Engagement convex portions 66*a* protruding inward in the Y-axis direction are formed above and below each insulation plate portion 66 in the Z-axis direction. The engagement convex portions 66*a* on the upper side in the Z-axis engage with the inner surface of the insulation walls 100 and 200 of the bobbin 40, and the engagement convex portions 66*a* on the lower side in the Z-axis engage with the lower surface of the bobbin board 42 at both ends of the bobbin board 42 in the X-axis direction.

As a result, the insulation plate portions 66 of each core cover 60 are combined with the insulation walls 100 and 200 and the bobbin board 42 and improve the insulation between the cores 12 and the outer coil 30 shown in FIG. 2B. The inner surfaces of the insulation plate portions 66 (on the center side of the coil device 10) may be in contact with the cores 12 and may have shapes corresponding to the outer shapes of the cores 12.

In the present embodiment, as shown in FIG. 2B, the winding partition flanges 46 each having an elliptical ring shape are formed on planes substantially parallel to the XY axes so that winding sections are formed at predetermined intervals in the Z-axis direction on the outer circumferential part of the first hollow cylinder portion 44 having an elliptical cylinder shape. In the present embodiment, a plurality of winding partition flanges 46 is formed substantially in parallel at predetermined intervals in the Z-axis direction, but the number of winding partition flanges 46 is not limited. The first winding portion 45 is a portion where the winding partition flanges 46 are formed.

The width in the winding axis (Z-axis) of each of the winding sections separated by the winding partition flanges 46 is configured so that only one wire 22 can enter. That is, each winding-section width w1 (not shown) preferably satisfies d1<w1<(2×d1), more preferably d1<w1<(1.2×d1), where d1 is a wire diameter of the wire 22 (not shown). If each winding-section width w1 is too large for the wire diameter d1, a winding disorder is likely to occur, and the demand for compactness of the coil device is violated.

Preferably, the winding sections have the same winding-section width, but may have slightly different winding-section widths. The winding-section width between the bobbin upper flange portion 48 and the winding partition flange 46 at the uppermost position may be larger than that between the winding partition flanges 46. Likewise, the winding-section width between the bobbin board 42 and the winding partition flange 46 located at the lowest position may be larger than that between the winding partition flanges 46. In the present embodiment, the total winding number for each winding section is not limited.

In the present embodiment, the circumference of the winding partition flange 46 closest to the bobbin board 42 is partly intermittently provided with a partition convex piece 46*a* for positioning by being inserted into the lower surface of the cover lower flange portion 52 of the bobbin cover 50. In addition to the partition convex piece 46*a*, flow clearances for axially flowing a highly thermally conductive resin are formed in a notch shape between the outer circumferential surface of the winding partition flange 46 and the inner circumferential surface of the bobbin cover 50.

Preferably, the partition convex piece 46*a* protrudes from the outer circumferential surface of the winding partition flange 46 even at the positions of the split connection portions 53 of the bobbin cover 50. The protrusion height (radial height) of the partition convex piece 46*a* determines a radial width of each flow clearance.

In the split connection portions 53 of the bobbin cover 50, outer connection pieces 53*b* of the half-split body 50*b* are inserted into the radial outside of the inner connection pieces 53*a* of the half-split body 50*a*. Then, the half-split bodies 50*a* and 50*b* are connected to form the bobbin cover 50.

The bobbin cover 50 includes the second winding portion 55 for winding the second wire 32 different from the first wire 22 around its outer circumference and clearance holding pieces 52*a* (non-winding portion) disposed below the second winding portion 55 in its axial direction. The clearance holding pieces 52*a* (non-winding portions) include openings 52*b* or notches communicating between the inside and the outside of the bobbin cover 50. The clearance holding pieces 52*a* are formed to extend downward in the Z-axis direction from the outer peripheral edge of the cover lower flange portion. The lower ends of the clearance holding pieces 52*a* can be in contact with the upper surface of the bobbin board 42.

The openings 52*b* are formed in each of the half-split bodies 50*a* and 50*b* located on both sides in the X-axis direction and are formed at positions corresponding to the flow clearances of the partition convex piece 46*a* arranged on the winding partition flange 46 of the bobbin 40. At both ends of the bobbin cover 50 in the X-axis direction, the clearance holding pieces 52*a* are not formed on the outer peripheral edge of the cover lower flange portion 52, and a highly thermally conductive resin or so can freely enter the clearances between the cover lower flange portion 52 and the bobbin board 42.

Stepped connection upper flange portions 58*a* being higher upward in the Z-axis direction than other portions are formed on the cover upper flange portion 58 located at the connection portions 53*a* of the half-split body 50*a*. In addition, connection upper flange portions 58*b* located below the connection upper flange portions 58*a* in the Z-axis direction and connectable by being inserted into below the connection upper flange portions 58*a* are formed on the cover upper flange portion 58 located at the connection portions 53*b* of the half-split body 50*b*.

Stopper convex portions 58*e* capable of being in contact with the connection tips of the connection upper flange portions 58*a* are formed on the cover upper flange portions 58 located at the connection portions 53*b* of the half-split body 50*b*. The stopper convex portions 58*e* protrude upward in the Z axis from the cover upper flange portions 58. Preferably, the protrusion height of the stopper convex portions 58*e* from the upper surfaces of the cover upper flange portions 58 is substantially the same as that of the connection upper flange portions 58*a* in the Z-axis direction. The upper surfaces of the stopper convex portions 58*e* and the upper surfaces of the connection upper flange portions 58*a* contact with the lower surface of the bobbin upper flange portion 48 of the bobbin 40, and an air outlet is formed between the upper surface of most of the cover upper flange portion 58 other than the split connection portions 53 and the lower surface of the bobbin upper flange portion 48.

The first wire 22 shown in FIG. 2B may be made of a single wire or a stranded wire, but is preferably made of an insulating coated conductive wire. The outer diameter d1 (not shown) of the first wire 22 is not limited, but is preferably, for example, φ1.0 to φ3.0 mm when a large electric current flows. The second wire 32 may be the same as the first wire 22, but may be different from the first wire 22.

In the present embodiment, the inner coil 20 made of the first wire 22 constitutes a primary coil of a transformer, and the outer coil 30 made of the second wire 32 wound around the bobbin cover 50 constitutes a secondary coil. Thus, in the present embodiment, the wire diameter of the second wire 32 constituting the outer coil 30 is larger than that of the first wire 22, but their wire diameters are not limited and may be the same or different from each other. The materials of the first wire 22 and the second wire 32 may be the same or different from each other.

In the bobbin 40 of the present embodiment, at least one communication groove for communicating the adjacent winding sections is formed in each of the winding partition flanges 46. In the present embodiment, a circumferential position of at least either of a pair of notch edges formed on the winding partition flanges 46 for determining a circumferential width of each communication groove is different between the adjacent winding partition flanges 46 in the Z-axis direction (winding axis), but may be the same. Incidentally, the circumferential direction is a direction along an elliptical outer peripheral surface of the hollow cylinder portion 44.

In the bobbin 40 of the present embodiment, for example, the first wire 22 is α-wound from a central part of the first winding portion 45 in the Z-axis direction. That is, the central part 22*b* of the first wire 22 is disposed to pass through the communication groove located at the central part of the first winding portion 45 in the Z-axis direction, and a lower winding portion from the central part to the end of the first wire 22 (one winding portion) passes through the winding section one step below the center. In addition, an upper winding portion from the central part to the end of the first wire 22 (the other winding portion) passes through the winding section located one step above the winding section through which the lower winding portion is passes.

After that, the lower winding portion is wound clockwise when viewed from above in the Z-axis direction by one or more times in the same winding section, and the upper winding portion is wound counterclockwise when viewed from above in the Z-axis direction by one or more times in the same winding section. Then, the lower winding portion moves from the wound winding section to a winding section one step below in the Z-axis direction via the communication groove and is similarly wound in the same direction in this winding section. The upper winding portion moves from the wound winding section to a winding section one step above in the Z-axis direction via the communication groove and is similarly wound in the same direction in this winding section.

The first wire is α-wound around the first winding portion 45 by repeating the above-mentioned operation. In the present embodiment, the first winding portion 45 is divided into a first main winding portion 45*a* located between the partition convex piece 46*a* and the bobbin upper flange portion 48 and a first sub-winding portion 45*b* located between the partition convex piece 46*a* and the bobbin board 42. In the first main winding portion 45*a*, the first wire 22 is α-wound in the radial direction by one layer or two or more layers. In the first sub-winding portion 45*b*, the first wire 22 is α-wound in the radial direction by the number of winding layers equal to that in the first main winding portion 45*a* (first main winding layer number) or larger than that in the first main winding portion 45*a* (first sub-winding layer number).

The position of the outermost circumferential layer of the first wire 22 wound around the first sub-winding portion 45*b* is located outside the cylinder wall of the second winding portion 55. In this structure, a flange-shaped coil portion of the first wire 22 wound around the first sub-winding portion 45*b* and the outer coil portion 30 of the second wire 32 wound around the second winding portion 55 can overlap with each other in the axial direction. Incidentally, FIG. 2B illustrates a case where the number of axial winding layers in the first main winding portion 45*a* is equal to that in the first main winding portion 45*a* (first main winding layer number). Thus, the flange-shaped coil portion of the first wire 22 wound around the first sub-winding portion 45*b* and the outer coil portion 30 of the second wire 32 wound around the second winding portion 55 do not overlap with each other in the axial direction.

Figure 8:
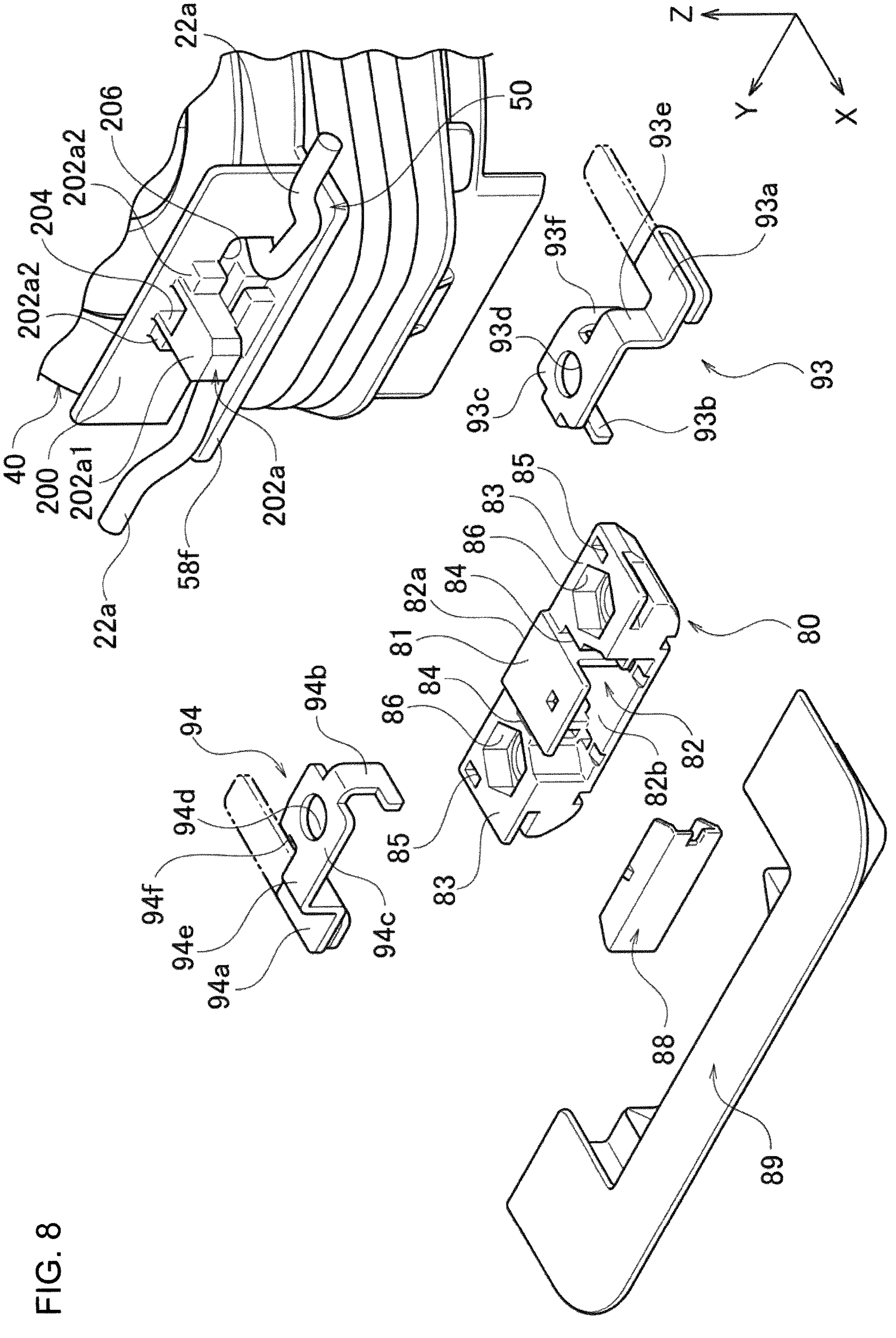
FIG. 8 is an exploded perspective view of a terminal block located on the opposite side of the terminal block shown in FIG. 5A.

A lead portion (one end of the wire 22) 22*a* from the flange-shaped coil portion located at the lowermost end of the lower winding portion of the α-wound first wire 22 is pulled out from a taking-out groove 206 formed on the insulation wall 200 of the bobbin 40 shown in FIG. 8 onto a pedestal 58*f* and is pulled out to the outside of the bobbin cover 50. The lead portion 22*a* drawn out to the outside of the bobbin cover 50 is sandwiched and joined with a wire connection portion 93*a* of the terminal fitting 93.

The lead portion 22*a* from the upper winding portion of the α-wound first wire 22 shown in FIG. 2B is pulled out from a taking-out groove 206 formed on the insulation wall 200 of the bobbin 40 shown in FIG. 8 onto a pedestal 58*f* and is pulled out to the outside of the bobbin cover 50. The lead portion 22*a* drawn out to the outside of the bobbin cover 50 is sandwiched and joined a wire connection portion 94*a* of the terminal fitting 94.

Incidentally, as shown in FIG. 2B, the pedestal 58*f* is formed as a part of the cover upper cylinder portion 58 at the end of the bobbin cover 50 on one side in the X-axis direction. A pedestal 58*g* is formed as a part of the cover upper cylinder portion 58 at the other end of the bobbin cover 50 on the other side in the X-axis direction, but is shorter than the pedestal 58*f* in the X-axis direction. In the present embodiment, the "outside" is the side away from the central axis of the bobbin 40, and the "inside" is the side approaching the central axis of the bobbin.

In the bobbin cover 50 shown in FIG. 2B, the second wire 32 constituting the outer coil 30 serving as a secondary coil is normally wound around the second winding portion 55. "normally wound" means a winding method in which the wire 32 is sequentially wound around the outer circumferential surface of the winding portion 55 from one end to the other end in the Z-axis direction. In the present embodiment, the wire 32 is normally wound in the radial direction by one layer or two or more layers. If the wire 32 is normally wound by two layers, the first layer is completely wound, and the second layer is subsequently wound on the first layer.

Figure 5A:
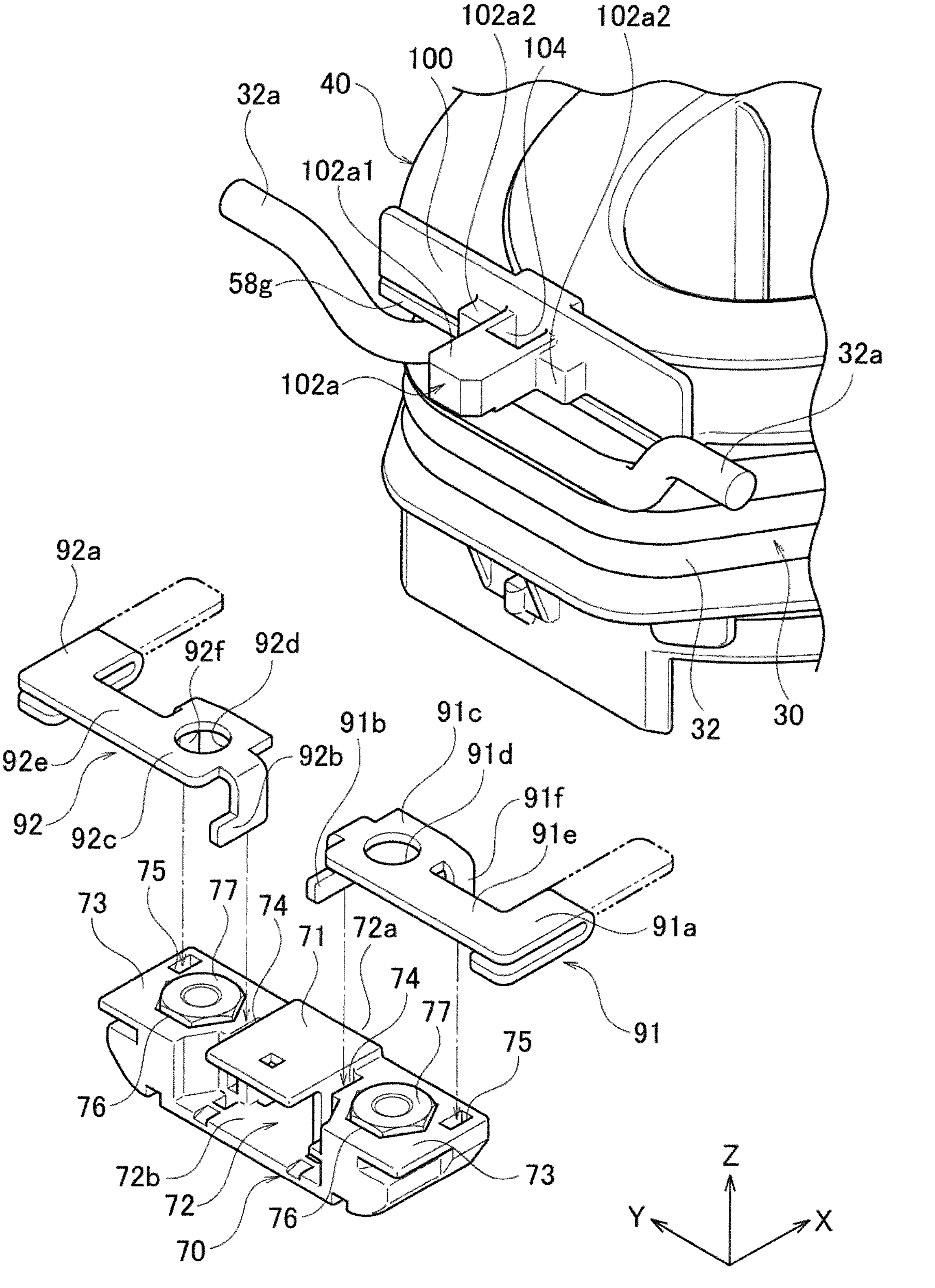
FIG. 5A is an enlarged exploded perspective view of a main part of a bobbin from which an inner cover, the terminal block, and a terminal fitting shown in FIG. 4 are detached.

As shown in FIG. 5A, the lead portions 32*a* and 32*a* of the second wire 30 constituting the outer coil 30 are pulled out to mutually opposite sides in the Y-axis direction below the loose engagement convex portion 102*a* formed on the bobbin 40 in the Z-axis direction. One lead portion 32*a* is sandwiched and joined by the wire connection portion 91*a* of the terminal fitting 91, and the other lead portion 32*a* is sandwiched and joined by the wire connection portion 92*a* of the terminal fitting 92.

Figure 5B:
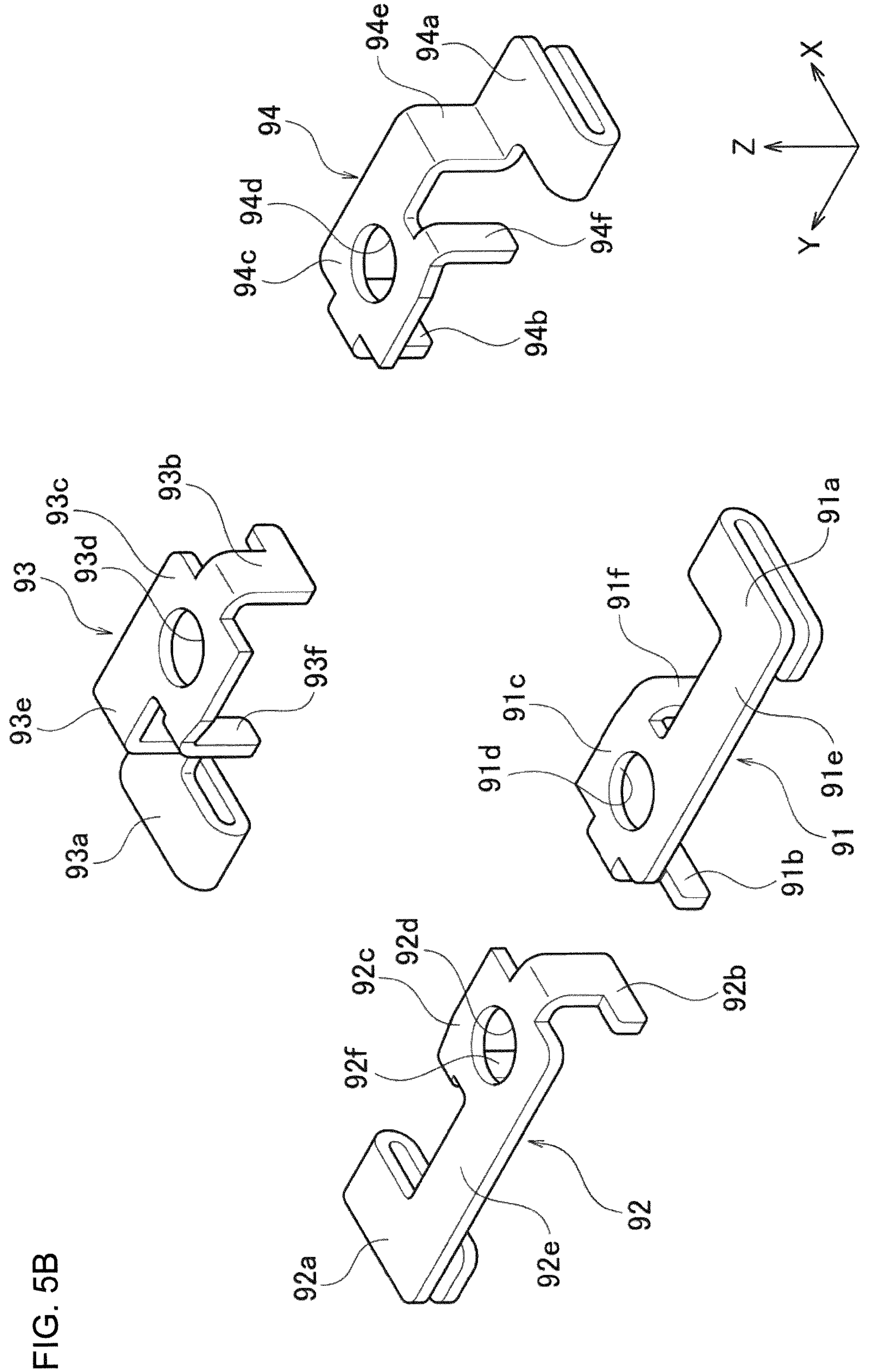
FIG. 5B is an enlarged perspective view of only the terminal fitting shown in FIG. 2.

As shown in FIG. 5A, the terminal fittings 91 and 92 are attached to the terminal block 70. As shown in FIG. 8, the terminal fittings 93 and 94 are attached to the terminal block 80. In the present embodiment, as shown in FIG. 5B, four terminal fittings 91 to 94 are arranged. The pair of terminal fittings 91 and 92 has shapes that are line-symmetrical to the X-axis and the Z-axis, and the other pair of terminal fittings 93 and 94 have shapes that are line-symmetrical to the X-axis and the Z-axis.

As shown in FIG. 5A, the terminal fitting 91 (92) includes the wire connection portion 91*a* (92*a*) for sandwiching and joining the lead portion 32*a* of the wire 32. In addition, the terminal fitting 91 (92) includes a hook portion 91*b* (92*b*) formed at a different position from the wire connection portion 91*a* (92*a*). The hook portion 91*b* (92*b*) is movably inserted into the terminal groove 74 (74) in the Z-axis direction formed on the terminal block 70.

The hook portion 91*b* (92*b*) is formed to protrude downward in the Z-axis direction from an end of a flat attachment portion 91*c* (92*c*) in the Y-axis direction, and the lower end tip of the hook portion 91*b* (92*b*) is formed in a hook shape. An insertion hole 91*d* (92*d*) is formed in a central part of the attachment portion 91*c* (92*c*). The insertion hole 91*d* (92*d*) is roughly positioned to a bolt hole of a nut 77 (77) mounted on an attachment hole 76 (76) formed on the terminal block 70. Then, the terminal fittings 91 and 92 are attached to the terminal block 70. The inner diameter of the attachment hole 76 (76) may be sufficiently larger than that of the bolt hole of the nut 77 (77).

The attachment portion 91*c* (92*c*) and the wire connection portion 91*a* (92*a*) are integrally connected by a joint portion 91*e* (92*e*). The joint portion 91*e* (92*e*) is integrally formed to be flush with the plane of the attachment portion 91*c* (92*c*). The width of the joint portion 91*e* (92*e*) in the X-axis direction is smaller than that of the attachment portion 91*c* (92*c*) in the X-axis direction.

An insertion convex portion 91*f* (92*f*) protruding downward in the Z-axis direction from the plane of the attachment portion 91*c* (92*c*) is formed at the end opposite to the hook portion 91*b* (92*b*) of the attachment portion 91*c* (92*c*), whose width in the X-axis direction is larger than that of the joint portion 91*e* (92*e*). The insertion convex portion 91*f* (92*f*) is inserted into an engagement groove 75 (75) formed on the upper surface of the terminal block 70 on its both ends in the Y-axis direction.

As shown in FIG. 8, the terminal fitting 93 (94) includes the wire connection portion 93*a* (94*a*) for sandwiching and joining the lead portion 22*a* of the wire 22. In addition, the terminal fitting 93 (94) includes a hook portion 93*b* (94*b*) formed at a position different from the wire connection portions 93*a* (94*a*). The hook portion 93*b* (94*b*) is movably inserted into the terminal groove 84 (84) in the Z-axis direction formed on the terminal block 80.

The hook portion 93*b* (94*b*) is formed to protrude downward in the Z-axis direction from an end of a flat attachment portion 93*c* (94*c*) in the Y-axis direction, and a lower end tip of the hook portion 93*b* (94*b*) is formed in a hook shape. An insertion hole 93*d* (94*d*) is formed in a central part of the attachment portion 93*c* (94*c*). The insertion hole 93*d* (94*d*) is roughly positioned to a bolt hole of a nut (not shown) mounted on an attachment hole 86 (86) formed on the terminal block 80. The terminal fittings 93 and 94 are attached to the terminal block 80.

The attachment portion 93*c* (94*c*) and the wire connection portion 93*a* (94*a*) are integrally connected by a joint portion 93*e* (94*e*). The joint portion 93*e* (94*e*) is provided with a stepped bending portion. The height of the wire connection portion 93*a* (94*a*) in the Z-axis direction is lower than the plane of the attachment portion 93*c* (94*c*). The width of the joint portion 93*e* (94*e*) in the X-axis direction is smaller than that of the attachment portion 93*c* (94*c*) in the X-axis direction.

An insertion convex portion 93*f* (94*f*) protruding downward in the Z-axis direction from the plane of the attachment portion 93*c* (94*c*) is formed at the end opposite to the hook portion 93*b* (94*b*) of the attachment portion 93*c* (94*c*), whose width in the X-axis direction is larger than that of the joint portion 93*e* (94*e*). The insertion convex portion 93*f* (94*f*) is inserted into an engagement groove 85 (85) formed on the upper surface of the terminal block 80 on its both ends in the Y-axis direction.

As shown in FIG. 5A, the terminal block 70 includes a base body 71. The base body 71 includes a through hole 72 penetrating the base body 71 in the X-axis direction. Terminal attachment portions 73 and 73 are integrally formed on both sides of the base body 71 in the Y-axis direction. The attachment hole 76 (76) is formed at a substantially central part of an upper surface of the terminal attachment portion 73 (73). The nut 77 (77) can be mounted in the attachment hole 76 (76).

The terminal groove 74 (74) is formed in a boundary between the terminal attachment portion 73 (73) and the base body 71. The hook portion 91*b* (92*b*) of the terminal fitting 91 (92) is inserted into the terminal groove 74 (74) so as to be movable in the Z-axis direction. The engagement groove 75 (75) is formed at the end in the Y-axis direction on the upper surface of the terminal attachment portion 73 (73). The insertion convex portion 91*f* (92*f*) of the terminal fitting 91 (92) is inserted into the engagement groove 75 (75). As a result, the terminal fitting 91 (92) is restricted from moving in the X-axis direction and the Y-axis direction with respect to the terminal block 70 and is allowed to move only in the Z-axis direction with respect to the terminal block 70.

In the present embodiment, the wire connection portions 91*a* and 92*a* of the terminal fittings 91 and 92 are located outside both ends of the terminal block 70 in the Y-axis direction, and the upper surface of the wire connection portion 91*a* (92*a*) is substantially flush with the upper surface of the attachment portion 91*c* (92*c*).

Figure 7:
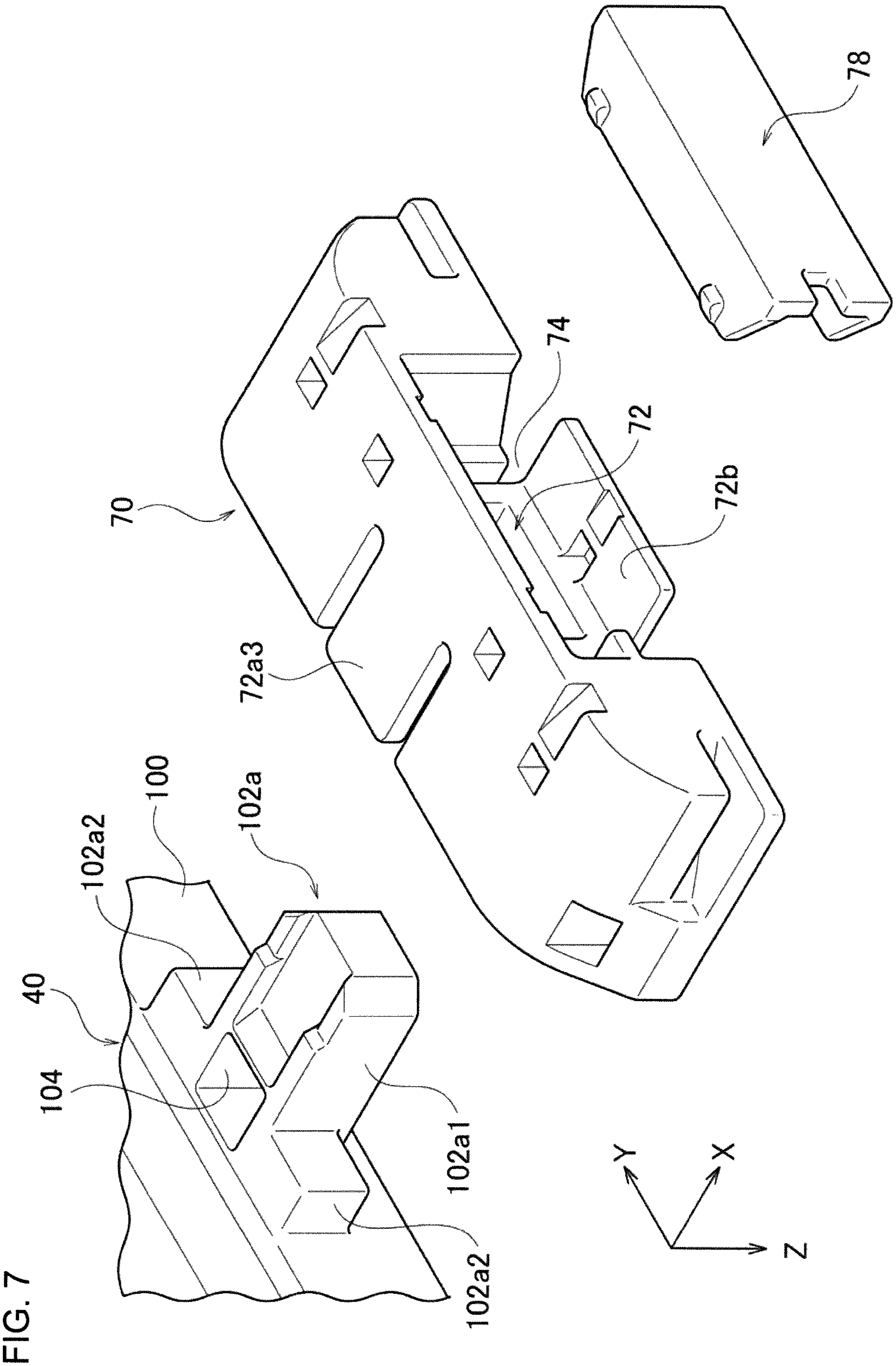
FIG. 7 is an exploded perspective view illustrating a relation between the bobbin, the terminal block, and the inner cover.

The loose engagement concave portion 72*a* for inserting the loose engagement convex portion 102*a* formed on the bobbin 40 is formed on the side where the through hole 72 formed in the base body 71 faces the bobbin 40. In addition, an attachment concave portion 72*b* is formed on the opposite side of the side where the through hole 72 faces the bobbin 40. An inner cover 78 shown in FIG. 7 is attached to the attachment concave portion 72*b*.

The inner cover 78 is attached to the attachment concave portion 72*b* of the terminal block 70 after the hook portion 91*b* (92*b*) of the terminal fitting 91 (92) shown in FIG. 5A is inserted into the terminal groove 74 (74) of the terminal block 70. As a result, the hook portion 91*b* (92*b*) having a hook tip shape of the terminal fitting 91 (92) engages with the inner cover 78 shown in FIG. 7, prevents the terminal fitting 91 (92) from coming off from the terminal block 70, and restricts a movement range of the terminal fitting 91 (92) to the terminal block 70 in the Z-axis direction.

Figure 4:
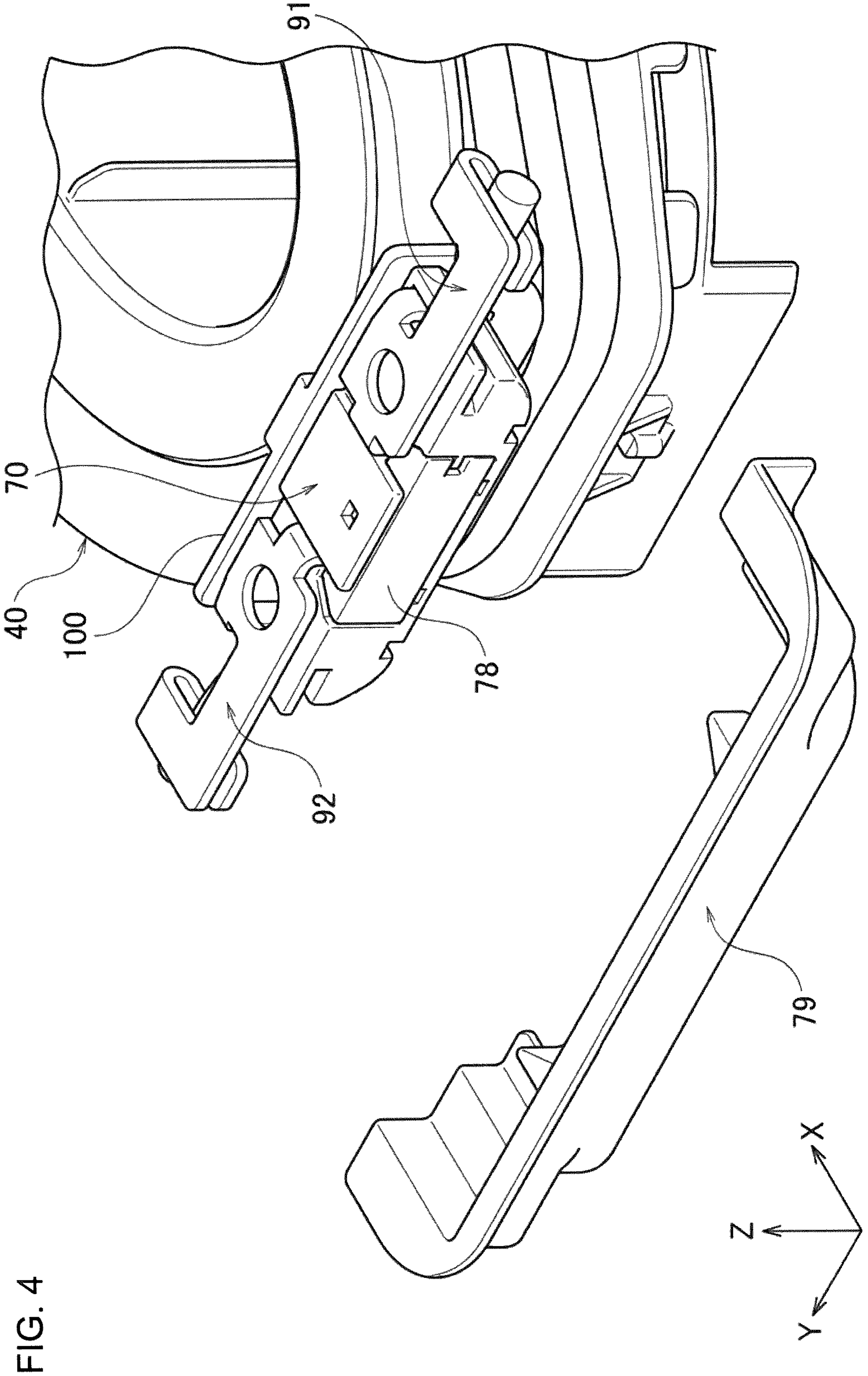
FIG. 4 is an enlarged exploded perspective view of a main part of a terminal block from which an outer cover shown in FIG. 3 is detached.

An outer cover 79 shown in FIG. 4 is attached to the outside of the inner cover 78. The outer cover 79 covers the terminal block 70 to which the inner cover 78 is attached from outside in the X-axis and the Y-axis together with the terminal fittings 91 and 92 and also covers their lower parts in the Z-axis, but does not cover their upper parts in the Z-axis. The outer cover 79 is attached to, for example, the terminal block 70 and is relatively movable to the bobbin 40 in the X-axis direction and the Y-axis direction together with the terminal block 70.

As shown in FIG. 5A, the loose engagement convex portion 102*a* protruding outward in the X-axis direction from a substantially central part of the insulation wall 100 of the bobbin 40 in the Y-axis direction includes a main convex portion 102*a*1 and a pair of sub convex portions 102*a*2 and 102*a*2 formed on both sides of the main convex portion 102*a*1 in the Y-axis direction. The thickness of the sub convex portion 102*a*2 (102*a*2) in the Z-axis direction is smaller than that of the main convex portion 102*a*1 in the Z-axis direction. The protrusion height of the sub convex portion 102*a*2 (102*a*2) in the X-axis direction is smaller than that of the main convex portion 102*a*1 in the X-axis direction.

A retaining hole 104 is formed on the base of the main convex portion 102*a*1 connected to the insulation wall 100. As shown in FIG. 7, the retaining hole 104 penetrates the main convex portion 102*a*1 in the Z-axis direction. A stopper convex portion 72*a*4 formed at a tip of a support piece 72*a*3 shown in FIG. 6 is inserted into the retaining hole 104 shown in FIG. 7, and the terminal block 70 is thereby prevented from coming off from the loose engagement convex portion 102*a* of the bobbin 40.

Figure 6:
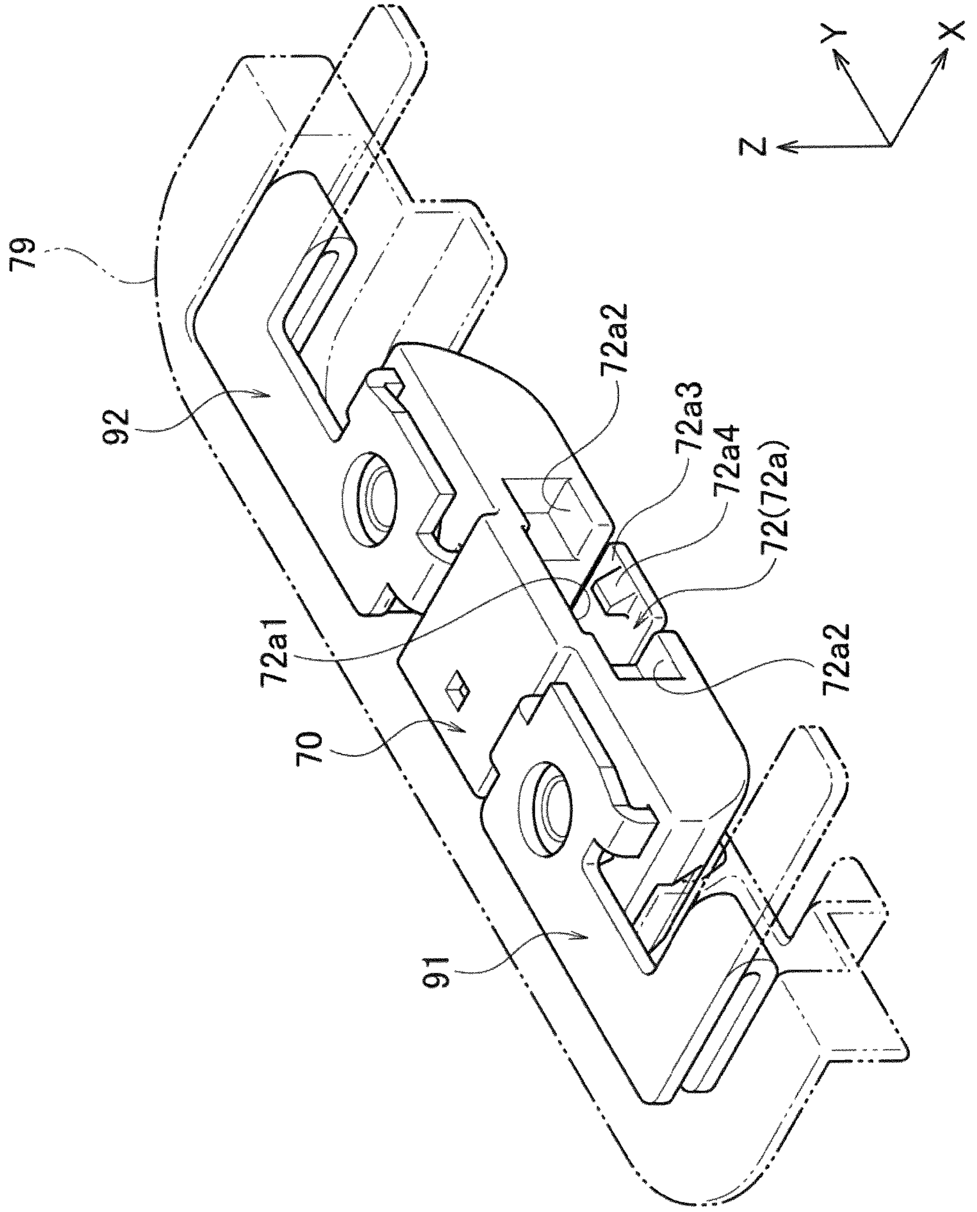
FIG. 6 is a perspective view of the terminal block shown in FIG. 5A when observed from a different angle.

As shown in FIG. 6, the loose engagement concave portion 72*a*, which is one opening of the through hole 72, includes a main concave portion 72*a*1 located at the center in the Y-axis direction and a pair of sub concave portions 72*a*2 and 72*a*2 located on both sides in the Y-axis direction. The width of the sub concave portion 72*a*2 (72*a*2) in the Z-axis direction is smaller than that of the main concave portion 72*a*1 in the Z-axis direction.

The sub convex portions 102*a*2 and 102*a*2 of the bobbin 40 shown in FIG. 7 engage with the sub concave portions 72*a*2 and 72*a*2 shown in FIG. 6 so as to be movable in the X-axis direction and the Y-axis direction, and the main convex portion 102*a*1 shown in FIG. 7 is inserted into the main concave portion 72*a*1 shown in FIG. 6 so as to be movable in the X-axis direction and the Y-axis direction. The inner surfaces of the sub concave portion 72*a*2 (72*a*2) substantially parallel to the X-axis and the Y-axis shown in FIG. 6 serve as guide surfaces (sliding surfaces) with the sub convex portion 102*a*2 (102*a*2).

In the present embodiment, a gap between the sub convex portion 102*a*2 (102*a*2) and the sub concave portion 72*a*2 (72*a*2) in the Z-axis direction is smaller than that between the main convex portion 102*a*1 and the main concave portion 72*a*1 in the Z-axis direction. The terminal block 70 is held movably in the X-axis direction and the Y-axis direction with respect to the bobbin 40 along the guide surfaces where the sub convex portion 102*a*2 (102*a*2) and the sub concave portion 72*a*2 (72*a*2) contact with each other. That is, the loose engagement convex portion 102*a* is inserted movably in the X-axis direction and the Y-axis direction within a predetermined range in the loose engagement concave portion 72*a*.

In the present embodiment, as shown in FIG. 6, the inner wall constituting the loose engagement concave portion 72*a* is partly structured by the support piece 72*a*3 elastically deformable to open the width of the opening entrance of the loose engagement concave portion 72*a* in the Z-axis direction. The tip side of the support piece 72*a*3 is provided with the stopper convex portion 72*a*4 shown in FIG. 6 serving as a retainer by engaging with the retaining hole 104 of the loose engagement convex portion 102*a* shown in FIG. 7. To elastically deform the support piece 72*a*3 in a cantilever beam manner, slits are formed on both sides of the support piece 72*a*3 in the Y-axis direction.

The engagement between the stopper convex portion 72*a*4 shown in FIG. 6 and the retaining hole 104 shown in FIG. 7 prevents the terminal block 70 from coming off the bobbin 40, but allows a free sliding movement of the terminal block 70 with respect to the bobbin 40 in the X-axis direction and the Y-axis direction.

The terminal block 80, an inner cover 88, and an outer cover 89 shown in FIG. 2A are structured respectively similarly to the terminal block 70, the inner cover 78, and the outer cover 79. In particular, the inner cover 88 and the outer cover 89 are respectively substantially the same as the inner cover 78 and the outer cover 79 and are not thereby explained.

Hereinafter, the relation between the terminal block 80 and the bobbin 40 is mainly explained.

As shown in FIG. 8, the terminal block 80 includes a base body 81. The base body 81 includes a through hole 82 penetrating the base body 81 in the X-axis direction. Terminal attachment portions 83 and 83 are integrally formed on both sides of the base body 81 in the Y-axis direction. An attachment hole 86 (86) is formed at a substantially central part of an upper surface of the terminal attachment portion 83 (83). A nut (not shown) can be mounted in the attachment hole 86 (86).

The terminal groove 84 (84) is formed in a boundary between the terminal attachment portion 83 (83) and the base body 81. The hook portion 93*b* (94*b*) of the terminal fitting 93 (94) is inserted into the terminal groove 84 (84) so as to be movable in the Z-axis direction. The engagement groove 85 (85) is formed at the end in the Y-axis direction on the upper surface of the terminal attachment portion 83 (83). The insertion convex portion 93*f* (94*f*) of the terminal fitting 93 (94) is inserted into the engagement groove 85 (85). As a result, the terminal fitting 93 (94) is restricted from moving in the X-axis direction and the Y-axis direction with respect to the terminal block 80, and the terminal fitting 93 (94) is allowed to move only in the Z-axis direction with respect to the terminal block 80.

In the present embodiment, the wire connection portions 93*a* and 94*a* of the terminal fittings 93 and 94 are located outside both ends of the terminal block 80 in the Y-axis direction, and the upper surface of the wire connection portion 93*a* (94*a*) is disposed lower than the upper surface of the attachment portion 93*c* (94*c*) in a stepped manner in the Z-axis direction.

The loose engagement concave portion 82*a* for inserting the loose engagement convex portion 202*a* formed on the bobbin 40 is formed on the side where the through hole 82 formed in the base body 71 faces the bobbin 40. In addition, an attachment concave portion 82*b* is formed on the opposite side of the side where the through hole 82 faces the bobbin 40. An inner cover 88 is attached to the attachment concave portion 88*b*.

The inner cover 88 is attached to the attachment concave portion 82*b* of the terminal block 80 after the hook portion 93*b* (94*b*) of the terminal fitting 93 (94) is inserted into the terminal groove 84 (84) of the terminal block 80. As a result, the hook portion 93*b* (94*b*) having a hook tip shape of the terminal fitting 93 (94) engages with the inner cover 88, prevents the terminal fitting 93 (94) from coming off from the terminal block 80, and restricts a movement range of the terminal fitting 93 (94) to the terminal block 80 in the Z-axis direction.

An outer cover 89 is attached to the outside of the inner cover 88. The outer cover 89 covers the terminal block 80 to which the inner cover 88 is attached from outside in the X-axis and the Y-axis together with the terminal fittings 93 and 94 and also covers their lower parts in the Z-axis, but does not cover their upper parts in the Z-axis. The outer cover 89 is attached to, for example, the terminal block 80 and is relatively movable to the bobbin 40 in the X-axis direction and the Y-axis direction together with the terminal block 80.

The loose engagement convex portion 202*a* protruding outward in the X-axis direction from a substantially central part of the insulation wall 200 of the bobbin 40 in the Y-axis direction includes a main convex portion 202*a*1 and a pair of sub convex portions 202*a*2 and 202*a*2 formed on both sides of the main convex portion 202*a*1 in the Y-axis direction. The thickness of the sub convex portion 202*a*2 (202*a*2) in the Z-axis direction is smaller than that of the main convex portion 202*a*1 in the Z-axis direction. The protrusion height of the sub convex portion 202*a*2 (202*a*2) in the X-axis direction is smaller than that of the main convex portion 202*a*1 in the X-axis direction.

A retaining hole 204 is formed on the base of the main convex portion 202*a*1 connected to the insulation wall 200. The retaining hole 204 penetrates the main convex portion 202*a*1 in the Z-axis direction. A stopper convex portion 82*a*4 formed at a tip of a support piece 82*a*3 shown in FIG. 9 is inserted into the retaining hole 204, and the terminal block 80 is thereby prevented from coming off from the loose engagement convex portion 202*a* of the bobbin 40.

Figure 9:
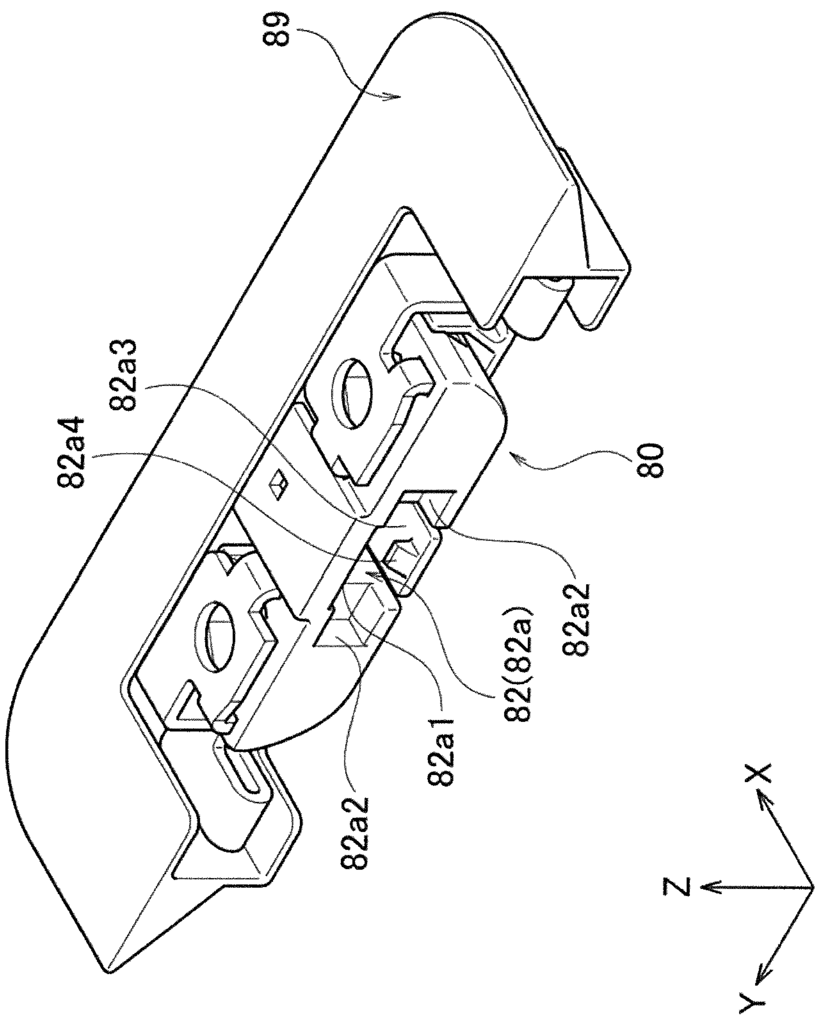
FIG. 9 is a perspective view of the terminal block shown in FIG. 8 when observed from a different angle.

As shown in FIG. 9, the loose engagement concave portion 82*a*, which is one opening of the through hole 82, includes a main concave portion 82*a*1 located at the center in the Y-axis direction and a pair of sub concave portions 82*a*2 and 82*a*2 located on both sides in the Y-axis direction. The width of the sub concave portion 82*a*2 (82*a*2) in the Z-axis direction is smaller than that of the main concave portion 82*a*1 in the Z-axis direction.

The sub convex portions 202*a*2 and 202*a*2 of the bobbin 40 shown in FIG. 8 engage with the sub concave portions 82*a*2 and 82*a*2 so as to be movable in the X-axis direction and the Y-axis direction, and the main convex portion 202*a*1 shown in FIG. 8 is inserted into the main concave portion 82*a*1 shown in FIG. 9. The inner surfaces of the sub concave portion 82*a*2 (82*a*2) substantially parallel to the X-axis and the Y-axis shown in FIG. 9 serve as guide surfaces (sliding surfaces) with the sub convex portion 202*a*2 (202*a*2).

In the present embodiment, a gap between the sub convex portion 202*a*2 (202*a*2) and the sub concave portion 82*a*2 (82*a*2) in the Z-axis direction is smaller than that between the main convex portion 202*a*1 and the main concave portion 82*a*1 in the Z-axis direction. The terminal block 80 is held movably in the X-axis direction and the Y-axis direction with respect to the bobbin 40 along the guide surfaces where the sub convex portion 202*a*2 (202*a*2) and the sub concave portion 82*a*2 (82*a*2) contact with each other. That is, the loose engagement convex portion 202*a* is inserted movably in the X-axis direction and the Y-axis direction within a predetermined range in the loose engagement concave portion 82*a*.

In the present embodiment, as shown in FIG. 9, the inner wall constituting the loose engagement concave portion 82*a* is partly structured by the support piece 82*a*3 elastically deformable to open the width of the opening entrance of the loose engagement concave portion 82*a* in the Z-axis direction. The tip side of the support piece 82*a*3 is provided with the stopper convex portion 82*a*4 shown in FIG. 9 serving as a retainer by engaging with the retaining hole 204 of the loose engagement convex portion 202*a* shown in FIG. 8. To elastically deform the support piece **82*a*3 in a cantilever beam manner, slits are formed on both sides of the support piece 82*a*3** in the Y-axis direction.

The engagement between the stopper convex portion **82*a*4 shown in FIG. 9 and the retaining hole 204 shown in FIG. 8 prevents the terminal block 80 from coming off the bobbin 40, but allows a free sliding movement of the terminal block 80 with respect to the bobbin 40** in the X-axis direction and the Y-axis direction.

In the present embodiment, the terminal blocks 70 and 80 are formed separately from the bobbin 40. For example, the terminal blocks 70 and 80 can be made of a resin different from the bobbin 40, such as a resin having better moldability or heat dissipation than the bobbin 40. Specifically, the terminal blocks 70 and 80 can be made of a resin material, such as PET, PBK, and PPS.

The coil device 10 according to the present embodiment is manufactured by assembling the members shown in FIG. 2A and FIG. 2B and respectively winding the wires 22 and 32 around the bobbin 40 and the bobbin cover 50. The coil device 10 according to the present embodiment may be housed in a case (not shown) that can be filled with, for example, potting resin, but the case is not always necessary.

A method of manufacturing of the coil device 10 is described below. In the manufacture of the coil device 10, the bobbin 40 shown in FIG. 2B is initially prepared. The bobbin 40 is made of any material, such as an insulating material of resin.

Next, the first wire 22 is wound around the outer circumference of the first hollow cylinder portion 44 of the bobbin 40 to form the inner coil 20. The first wire 22 used for forming the inner coil 20 is not limited, but a litz wire or so is favorably used. In the inner coil 20, a flange-shaped coil portion whose outer diameter is larger than any other portion of the inner coil 20 may be formed by α-winding at the lower end of the inner coil 20 in the Z-axis direction.

Next, the bobbin cover 50 is attached to the bobbin 40 on which the inner coil 20 is formed. The second wire 32 constituting the outer coil 30 is wound around the outer circumference of the second hollow cylinder portion 54 of the bobbin cover 50. The flange-shaped coil portion is located inside the clearance holding pieces **52*a* of the cover lower flange portion 52 of the bobbin cover 50**.

The lead portions **22*a* and 22*a* are pulled out to the mutually opposite sides in the Y-axis direction on the pedestal 58*f* of the bobbin cover 50, and the lead portions 32*a* and 32*a* are pulled out from under the pedestal 58*g* to the mutually opposite sides in the Y-axis direction. After that, the terminal blocks 70 and 80 are moved from the outside in the X-axis direction and attached to the outside of the insulation wall 100 (200) of the bobbin 40**.

When the terminal fitting 91 (92) and the terminal fitting 93 (94) are attached to the terminal block 70 (80), the lead portions **22*a* and 32*a* are subsequently connected to the wire connection portions 91*a*-94*a* of the terminal fittings 91-94. The lead portions 22*a* (32*a*) are connected to the wire connection portions 91*a*-94*a* of the terminal fittings 91-94** by any method, such as soldering, welding, resistance welding, ultrasonic welding, laser welding, caulking, heat bonding, and heat welding.

In the present embodiment, the lead portions **22*a* (32*a*) may be connected in advance to the wire connection portions 91*a*-94*a* of the terminal fittings 91-94 before the terminal block 70 (80) is attached to the outside of the insulation wall 100 (200) of the bobbin 40. In that case, the terminal block 70 (80) is subsequently attached to the outside of the insulation wall 100 (200) of the bobbin 40, the terminal fittings 91-94 are subsequently attached to the terminal blocks 70 and 80, and the inner cover 78 (88) is subsequently attached to the terminal block 70 (80). After that, the outer cover 79 (89) is attached to the terminal block 70 (80**) as necessary.

Before or after that, the core covers 60 shown in FIG. 2A are attached to both sides of the bobbin 40 in the Y-axis direction, and the cores 12 are thereafter attached from above and below in the Z-axis direction. That is, the tips of the middle legs 14 and 14 and the tips of the side legs 16 and 16 of the cores 12 butt against each other. A gap may be formed between the tips of the middle legs 14 and 14.

The cores 12 are made of any material, such as a soft magnetic material of metal and ferrite. The cores 12 may be fixed to the bobbin cover 50 and the bobbin 40 by adhesion using an adhesive or by wrapping the outer circumference with a tape-like member, but may simply be attached to the bobbin cover 50 and the bobbin 40. In the present embodiment, most of the coil device 10 assembled in such a manner may be housed in a case (not shown). The inside of the case may be filled with a highly thermally conductive resin, such as a potting resin, in a state where the coil device 10 is housed.

Heat dissipation plates may be arranged on the cores 12 so as to be in contact with the upper surface and the side surfaces in the Y-axis direction of the cores 12, and the side legs of the heat dissipation plates extending downward from both ends in the Y-axis direction may be immersed in a highly conductive resin stored in the case. In this structure, the heat of the upper parts of the cores 12 is transmitted to the highly thermally conductive resin stored in the case and can efficiently be dissipated. Preferably, the heat dissipation plates are made of a highly thermally conductive material, such as a metal of aluminum.

Incidentally, the case is preferably filled with the highly thermally conductive resin before the coil device 10 is housed into the case, but the resin may be filled after the coil device 10 is housed into the case.

The coil device 10 according to the present embodiment can be used as a vertical type coil device in which a winding axis of a coil is disposed perpendicularly to a mounting substrate surface, and it is thereby easy to cool the core 12 inserted into the hollow portion of the bobbin 40.

In the present embodiment, as shown in FIG. 2B, the bobbin cover 50 can be divided by the split connection portions 53 parallel to the winding axis, and the bobbin cover 50 can thereby easily be disposed on the outer circumference of the bobbin 40.

In the coil device 10 according to the present embodiment, since the wire 22 is wound so that only one wire winding portion exists along the winding axis in each winding section, it is easy to prevent the variation of the winding number of the wire 22 per layer in the radial direction, and this contributes to the stabilization of the leakage characteristics (coupling between coils). That is, it is easy to strictly control the coupling coefficient between the outer coil 30 constituting the secondary coil and the inner coil 20 constituting the primary coil, and the coil device 10 according to the present embodiment can also favorably be used as a leakage transformer.

In the present embodiment, as shown in FIG. 2B, the clearance holding pieces **52*a* are intermittently arranged at the outer peripheral edge of the cover lower flange portion 52 of the bobbin cover 50. Thus, a flange-shaped coil portion having a large number of winding layers in the radial direction can easily be formed at the lower end of the first coil 20** in the Z-axis direction.

In the present embodiment, flow clearances are uniformly formed between the outer peripheral edge of the winding partition flange 46 and the inner circumferential surface of the bobbin cover 50. In this structure, the distance between the coils 20 and 30 of the wires wound inside and outside the bobbin cover 50 is easily constant, and the coil characteristic values are less varied.

In particular, in the coil device 10 according to the present embodiment, the bobbin cover 50 includes the clearance holding pieces 52*a*, and the openings 52*b* or the notches are formed in the clearance holding pieces 52*a*. Thus, a highly thermally conductive resin, such as a potting resin, enters the inside of the bobbin cover 50 via the openings 52*b* or the notches and enters between the bobbin cover 50 and the bobbin 40. As a result, the first wire 22 wound around the first winding portion 45 of the bobbin 40 contacts with the highly thermally conductive resin, and the heat generated from the first wire 22 is transmitted to the highly thermally conductive resin and favorably dissipated. Thus, the coil device 10 according to the present embodiment is excellent in heat dissipation even if the coil device 10 is miniaturized.

In the present embodiment, the bobbin cover 50 includes the cover lower flange portion 52 and the cover upper flange portion 58. The clearance holding pieces 52*a* are arranged below the cover lower flange portion 52. In addition, the cover upper flange portion 58 is disposed below the bobbin upper flange portion 48 in the axial direction, and an outlet gap capable of discharging the inner air of the bobbin cover 50 to the outside is formed between the bobbin upper flange portion 48 and the cover upper flange portion 58. The outlet gap is formed by the contact between the lower surface of the bobbin upper flange portion 48 and the connection upper flange portions 58*a*, step convex portions 58*c* and 58*d*, and the stopper convex portions 58*e* formed on the upper surface of the cover upper flange portion 58.

In this structure, when the highly thermally conductive resin enters the bobbin cover 50 from under the cover lower flange portion 52, the inner air of the bobbin cover 50 is easily discharged from the outlet gap, and the resin flows more smoothly.

In the present embodiment, the first wire 22 disposed on the inner circumferential side is the primary coil of the transformer, but on the other hand, may be a secondary coil (inner coil 20) on which a higher voltage acts. In that case, the insulation is facilitated by arranging the secondary coil (inner coil 20) on which a high voltage acts inside a primary coil (outer coil 30) on which a relatively low voltage acts.

In the present embodiment, the terminal blocks 70 and 80 are formed separately from the bobbin 40. Thus, when the specifications of the bobbin 40 are changed, the terminal blocks 70 and 80 corresponding to the changed specifications are prepared and attached to the bobbin 40. That is, the overall design of the bobbin does not need to be changed, and it is possible to flexibly respond to changes in specifications.

In the coil device 10 according to the present embodiment, the coupling between coils can be adjusted by a gap in the radial direction between the inner coil 20 of the first wire 22 wound around the first main winding portion 45*a* and the outer coil 30 of the second wire 32 wound around the second winding portion 55. In the coil device 10 according to the present embodiment, the coupling between coils can also be adjusted by a gap in the Z-axis direction between the flange-shaped coil portion (not shown) of the first wire 22 wound around the first sub-winding portion 45*b* and the outer coil 30 of the second wire 32 wound around the second winding portion 55

If the number of winding layers of the first wire 22 wound around the first sub-winding portion 45*b* is increased, the overlapping area between the flange-shaped coil portion and the outer coil 30 viewed from the axial direction increases, and the leakage characteristic can be adjusted. In the coil device 10 according to the present embodiment, the leakage characteristics can be adjusted in both of the radial gap and the axial gap.

In the coil device 10 according to the present embodiment, the total turn number of the first wire 22 can be increased by increasing the number of winding layers of the first wire 22 wound around the first sub-winding portion 45*b* of the first winding portion 45, and the axial size of the bobbin 40 can be smaller. Thus, the low profile of the coil device 10 can be achieved.

In the present embodiment, the winding partition flanges 46 are formed at predetermined intervals in the Z-axis direction in the first winding portion 45. In this structure, the first wire 22 is easily α-wound. Each of the winding partition flanges 46 separating between the first main winding portion 45*a* and the first sub-winding portion 45*b* is provided with the partition convex piece 46*a* (see FIG. 2B) as a convex portion protruding outward from the outer peripheral edge of the winding partition flange 46 formed within the range of the first main winding portion 45*a*. The partition convex piece 46*a* can also function as a positioning member with the bobbin cover 50.

In the present embodiment, the clearance holding pieces 52*a* are intermittently formed along the circumferential direction at the outer peripheral edge of the cover lower flange portion 52 of the bobbin cover 50, and the first sub-winding portion 45*b* is located inside the clearance holding pieces 52*a* to form the flange-shaped coil portion. In this structure, the first wire 22 is easily wound around the outer circumference of the first sub-winding portion 45*b* with a large number of turns.

In the present embodiment, the first wire 22 is continuously α-wound around the first main winding portion 45*a* and the first sub-winding portion 45*b*. With the α-winding, the first wire 22 is easily wound, and it is possible to reduce the axial length of the inner coil 20 formed by the first wire 22. In addition, the first wire 22 is easily wound around the outer circumference of the first sub-winding portion 45*b* with a large number of turns.

In particular, in the coil device 10 according to the present embodiment, as shown in FIG. 2A and FIG. 2B, the terminal blocks 70 and 80 for holding the terminals structured by, for example, the terminal fittings 91-94 are attached to the bobbin 40 so as to be movable both in the X-axis direction and the Y-axis direction of the bobbin 40. Thus, the insertion holes 91*d*-94*d* of the terminal fittings 91-94 and attachment holes 302 of the circuit board 300 can accurately be positioned only by relatively moving the terminal blocks 70 and 80 to the bobbin 40 in the X-axis direction and the Y-axis direction after roughly positioning a board, such as the circuit board 300 shown in FIG. 1A, and the coil device 10. Thus, it is easy to accurately position and connect a circuit pattern of the circuit board 300 and the terminal fittings 91-94 using a fastener, such as screws 304.

In the coil device 10 according to the present embodiment, the coil device 10 does not need to be manufactured by accurately aligning the positions of the terminal fittings 91-94 of the terminal blocks 70 and 80 with the positions of the attachment holes 302 of the circuit board 300. This facilitates the manufacture and assembling of each component constituting the coil device 10 and contributes to reduction in manufacturing cost.

In the present embodiment, the terminal fittings 91-94 are independently attached to the terminal blocks 70 and 80 so as to be movable in the Z-axis direction. In this structure, it is easy to slightly adjust the positions of the terminal fittings 91-94 and the attachment holes 302 of the circuit board 300 in an independent manner even in the Z-axis direction. As a result, the coil device 10 according to the present embodiment does not need to be manufactured by accurately aligning the attachment positions of the terminal fittings 91-94 to the terminal blocks 70 and 80 with the circuit board 300 even in the Z-axis direction. This further facilitates the manufacture and assembling of each component constituting the coil device 10 and further contributes to reduction in manufacturing cost.

In the present embodiment, the bobbin 40 is provided with the loose engagement convex portions 102*a* and 202*a* protruding in the X-axis direction, and the terminal block 70 (80) is provided with the loose engagement concave portion 72*a* (82*a*) for inserting the loose engagement convex portion 102*a* (202*a*). In addition, the loose engagement convex portion 102*a* (202*a*) is inserted movably in the X-axis direction and the Y-axis direction within a predetermined range in the loose engagement concave portion 72*a* (82*a*). In this structure, the terminal block 70 (80) for holding the terminal fittings 91-94 can be attached to the bobbin 40 so as to be movable both in the X-axis direction and the Y-axis direction of the bobbin 40.

In the present embodiment, as shown in FIG. 6 and FIG. 9, the inner wall constituting the loose engagement concave portion 72*a* (82*a*) is partly structured by the support piece 72*a*3 (82*a*3) elastically deformable to open the width of the opening entrance of the loose engagement concave portion 72*a* (82*a*) in the Z-axis direction. In addition, the support piece 72*a*3 (82*a*3) is provided with the stopper convex portion 72*a*4 (82*a*4) (see FIG. 6 and FIG. 9) serving as a retainer by engaging with the retaining hole 104 (204) of the loose engagement convex portion 102*a* (202*a*) shown in FIG. 7 and FIG. 8.

In the present embodiment with such a structure, the loose engagement convex portion 102*a* (202*a*) is attached to the loose engagement concave portion 72*a* (82*a*) so as to be movable in the X-axis direction and the Y-axis direction, and the terminal block 70 (80) is prevented from coming off from the bobbin 40 at the same time, only by inserting the loose engagement convex portion 102*a* (202*a*) into the loose engagement concave portion 72*a* (82*a*). Thus, the terminal blocks 70 and 80 are more easily attached to the bobbin 40.

In the present embodiment, as shown in FIG. 7 and FIG. 8, the loose engagement convex portion 102*a* (202*a*) includes the main convex portion 102*a*1 (202*a*1) and the sub convex portions 102*a*2 (202*a*2). As shown in FIG. 6 and FIG. 9, the loose engagement concave portion 72*a* (82*a*) is provided with the main concave portion 72*a*1 (82*a*1) for inserting the sub convex portions 102*a*2 (202*a*2) shown in FIG. 7 and FIG. 8 are inserted and the sub concave portions 72*a*2 (82*a*2) for inserting the sub convex portions 102*a*2 (202*a*2). The gap between the sub convex portions 102*a*2 (202*a*2) and the sub concave portions 72*a*2 (82*a*2) in the Z-axis direction is smaller than that between the main convex portion 102*a*1 (202*a*1) and the main concave portion 72*a*1 (82*a*1) in the Z-axis direction.

In this structure, the terminal block 70 (80) is held movably in the X-axis direction and the Y-axis direction to the bobbin 40 along the guide surfaces where the sub convex portions 102*a*2 (202*a*2) and the sub concave portions 72*a*2 (82*a*2) contact with each other. In addition, the terminal block 70 (80) can smoothly move along the guide surfaces in the X-axis direction and the Y-axis direction with respect to the bobbin 40 without rattling. In addition, since the gap between the main convex portion 102*a*1 (202*a*1) and the main concave portion 72*a*1 (82*a*1) in the Z-axis direction is relatively large, the loose engagement convex portion 102*a* (202*a*) can relatively easily be inserted into the loose engagement concave portion 72*a* (82*a*).

In the present embodiment, two sub convex portions 102*a*2 (202*a*2) are formed on both sides of the main convex portion 102*a*1 (202*a*1), and two sub concave portions 72*a*2 (82*a*2) are formed on both sides of the main concave portion 72*a*1 (82*a*1). The protrusion height of the main convex portion 102*a*1 (202*a*1) in the X-axis direction is larger than that of the sub convex portions 102*a*2 (202*a*2) in the X-axis direction. In this structure, the loose engagement convex portion 102*a* (202*a*) is easily inserted into the loose engagement concave portion 72*a* (82*a*), and it is possible to reduce the friction on the guide surfaces where the sub convex portions 102*a*2 (202*a*2) and the sub concave portions 72*a*2 (82*a*2) contact with each other.

In the present embodiment, as shown in FIG. 5B, the terminal fittings 91-94 respectively include the wire connection portions 91*a*-94*b* for fixing and connecting the lead portion 22*a* (32*a*), which is the end of the wire 22 (32) shown in FIG. 2B, and the hook portions 91*b*-94*b*. In this structure, it is easy to connect the lead portions 22*a* (32*a*) of the wire 22 (32) to the terminal fittings 91-94 and is also easy to movably attach the terminal fittings 91-94 in the Z-axis direction to the terminal block 70 (80).

The terminal fittings 91-94 respectively include the insertion holes 91*d*-94*d* formed between the wire connection portions 91*a*-94*b* and the hook portions 91*b*-94*b*. Fasteners, such as bolts and the screws 304 shown in FIG. 1A, are attached to the insertion holes 91*d*-94*d*, and the terminal fittings 91-94 can be positioned and attached to the circuit board 300 via the fasteners.

In the present embodiment, the terminal blocks 70 and 80 are provided with the inner covers 78 and 88 (see FIG. 2A) for engaging with the hook portions 91*b*-94*b* of the terminal fittings 91-94 and restricting a movement range of the terminal fittings 91-94 in the Z-axis direction. The terminal fittings 91-94 can be prevented from coming off from the terminal blocks 70 and 80, and the movements of the terminal fittings 91-94 to the terminal blocks 70 and 80 in the Z-axis direction can be restricted, only by attaching the inner covers 78 and 88.

In addition, the terminal block 70 (80) is provided with the outer cover 79 (89) covering the inner cover 78 (88), the end of the terminal block 70 (80) in the X-axis direction, and the ends of the terminal fittings 91 to 94 in the Y-axis direction. When the outer cover 79 (89) is made of insulating member, the improvement in insulating properties can be expected.

Second Embodiment

Figure 1B:
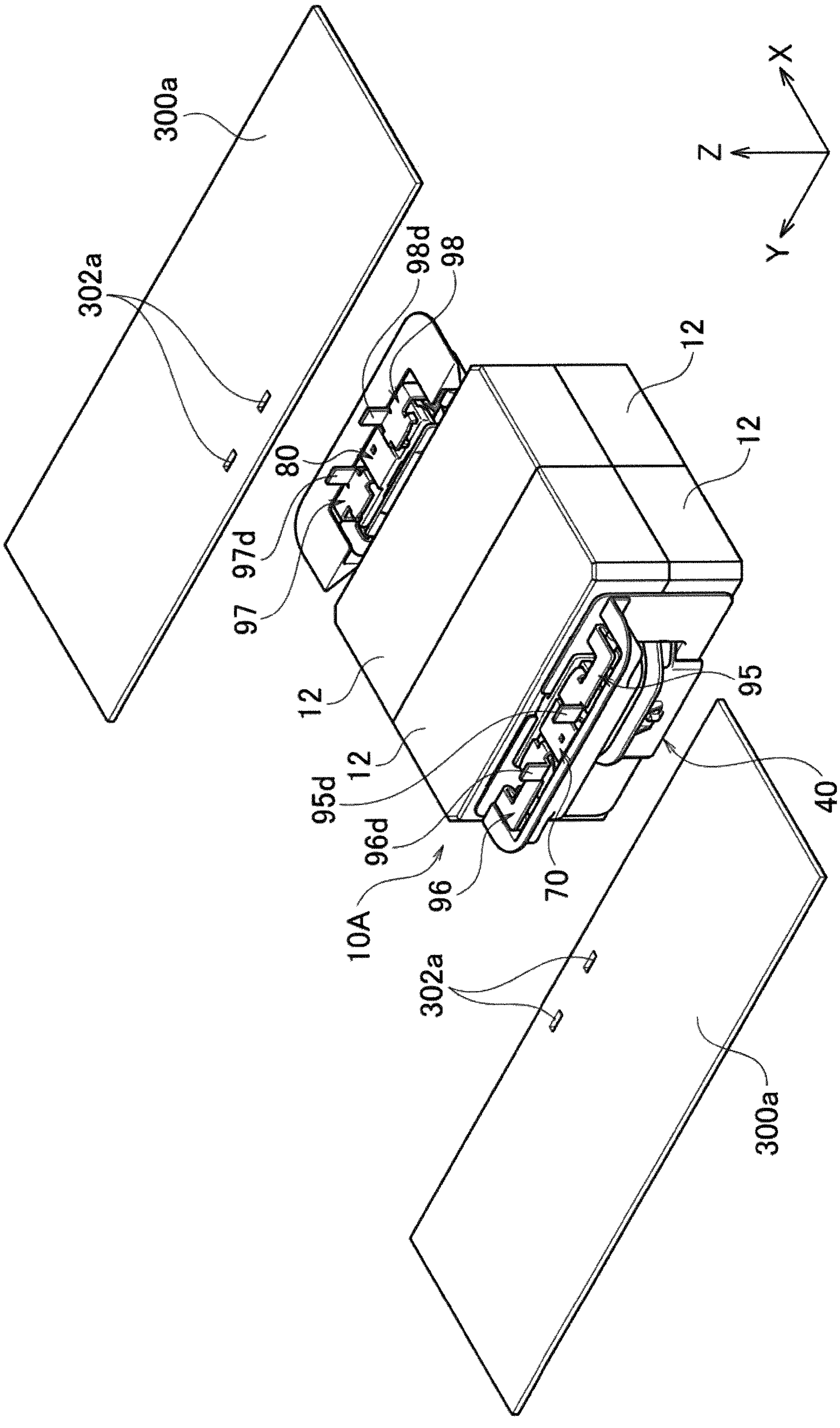
FIG. 1B is a perspective view of a coil device according to Second Embodiment of the present invention.
Figure 5C:
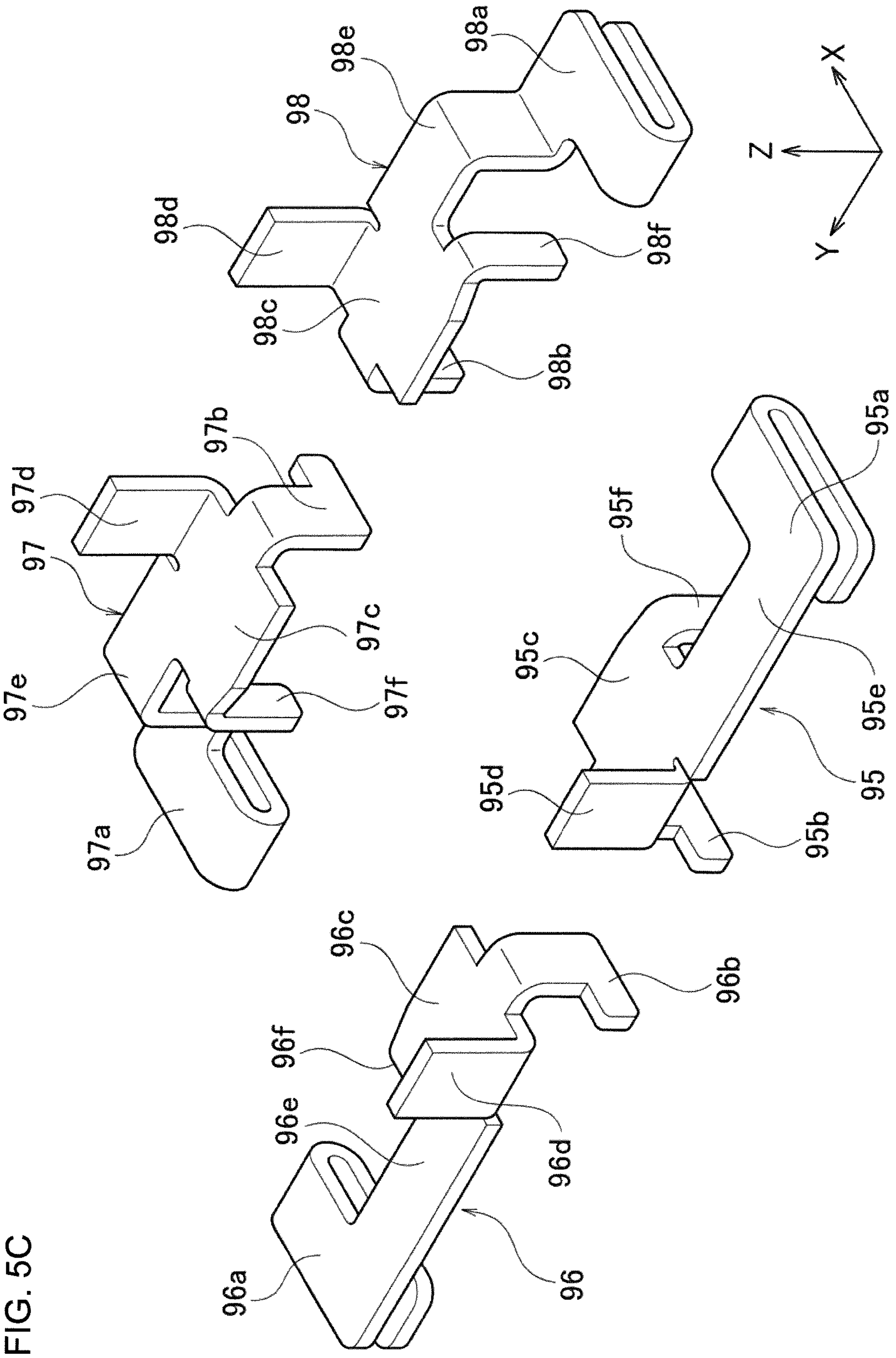
FIG. 5C is an enlarged perspective view of only a terminal fitting used for the coil device of the embodiment shown in FIG. 1B.

Except for the following respects, a coil device 10A according to Second Embodiment shown in FIG. 1B and FIG. 5C has similar structure and effect to the coil device 10 according to First Embodiment. In FIG. 1B and FIG. 5C, the members common with those of the coil device 10 according to First Embodiment are given a similar reference numeral and are not partly explained.

In the coil device 10A according to the present embodiment, terminal fittings 95-98 are slightly differently structured from the terminal fittings 91-94 of the coil device 10 according to First Embodiment, and the terminal blocks 70 and 80 are accordingly partly differently structured.

In the present embodiment, the members shown by reference numerals 95-98 of the terminal fittings shown in FIG. 5C correspond to those shown by reference numerals 91-94 of the terminal fittings shown in FIG. 5B and are substantially common with each other. Unlike the attachment portions 91*c*-94*c* shown in FIG. 5B, however, attachment portions 95*c*-98*c* according to the present embodiment shown in FIG. 5C do not include the attachment holes 91*d*-94*d*. Instead, the attachment portions 95*c*-98*c* according to the present embodiment shown in FIG. 5C are respectively provided with external circuit connection pieces 95*d*-98*d* standing upward in the Z-axis direction from the planes of the attachment portions 95*c*-98*c*.

The external circuit connection pieces 95*d*-98*d* formed on the terminal fittings 95-98 can be inserted into four slit-shaped attachment holes 302*a* formed on a circuit board 300*a* shown in FIG. 1B (corresponding to the circuit board 300 shown in FIG. 1A). The external circuit connection pieces 95*d*-98*d* inserted in the attachment holes 302*a* are connected by soldering, conductive adhesive, or the like so as to be connected with circuit patterns formed on the circuit board 300*a*.

In the present embodiment, as shown in FIG. 5C, the terminal fittings 95-98 are not provided with the attachment holes 91*d*-94*d* shown in FIG. 5B, and the terminal block 70 shown in FIG. 5A and the terminal block 80 shown in FIG. 8 do not need to be provided with the attachment holes 76 and 86, such as the nut 77. The other structure of the terminal blocks 70 and 80 are substantially the same between First Embodiment and Second Embodiment. The structure of the bobbin 40 and other members are also substantially the same between First Embodiment and Second Embodiment.

The coil device 10A according to the present embodiment also demonstrates a similar effect to the coil device 10 according to First Embodiment. That is, the coil device 10A according to the present embodiment is also easily positioned with a board, such as the circuit board 300*a* shown in FIG. 1B, and is easy for manufacture and assembling of each component.

Third Embodiment

Figure 10:
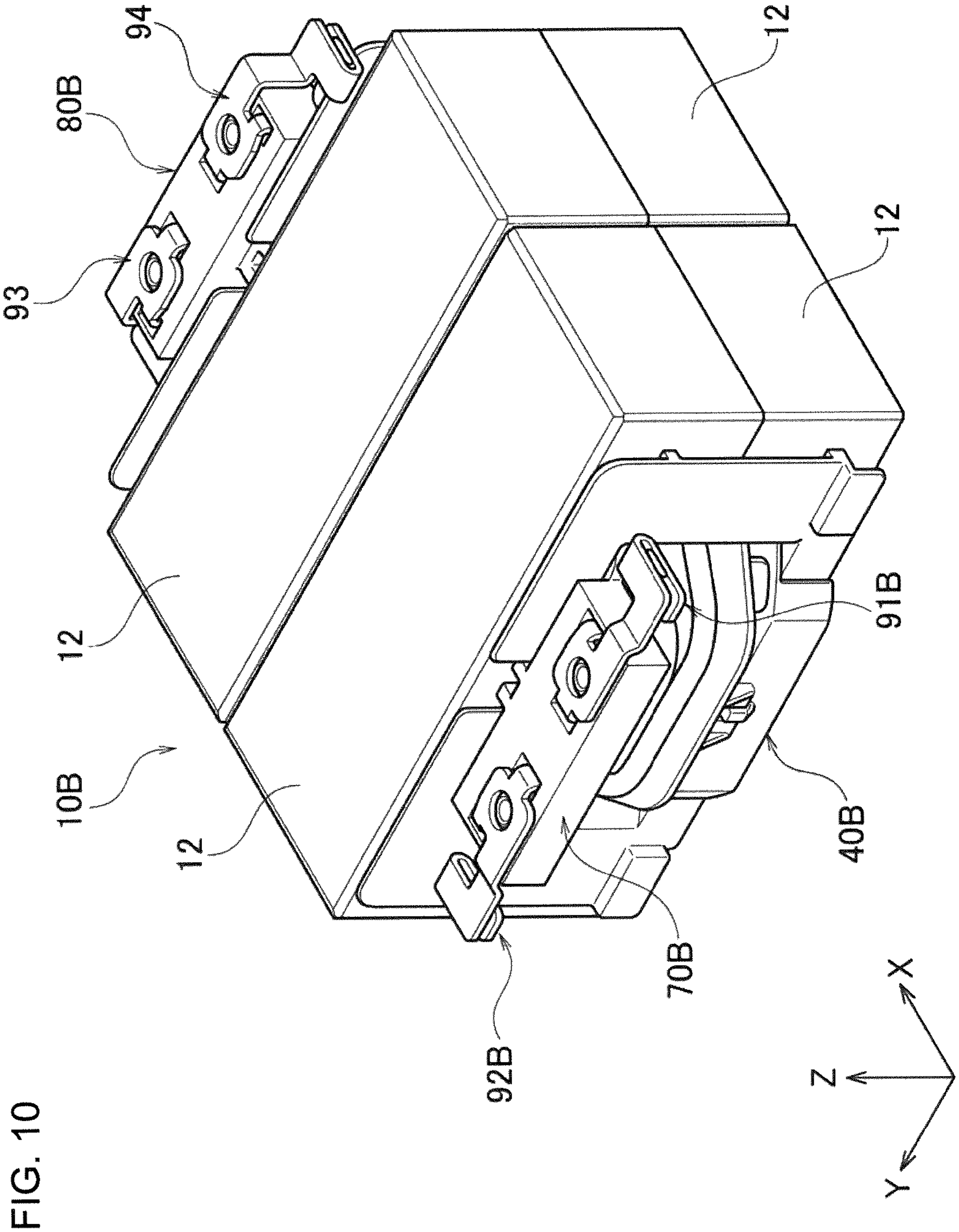
FIG. 10 is a perspective view of a coil device according to Third Embodiment of the present invention.
Figure 11:
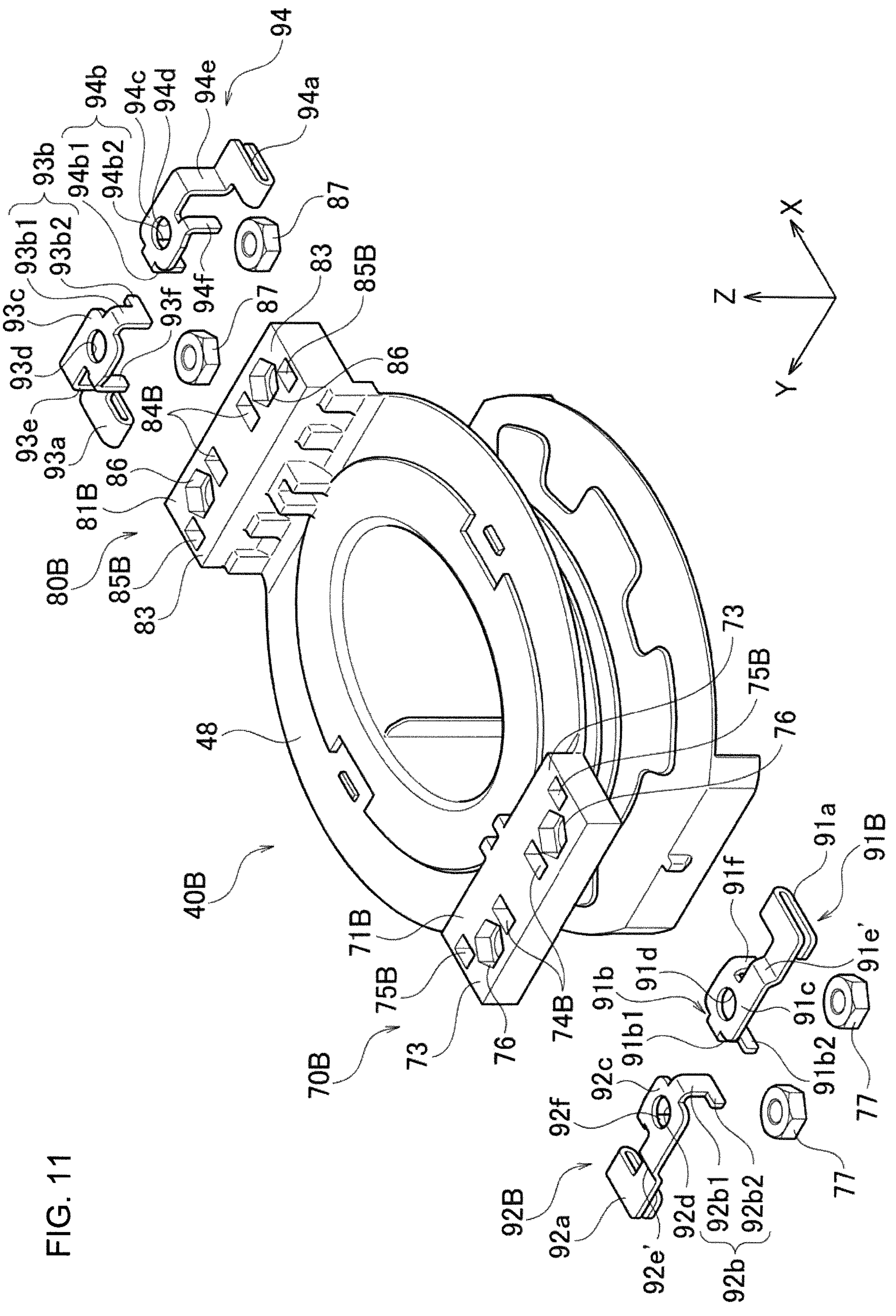
FIG. 11 is an exploded perspective view of a main part of the coil device shown in FIG. 10.
Figure 12:
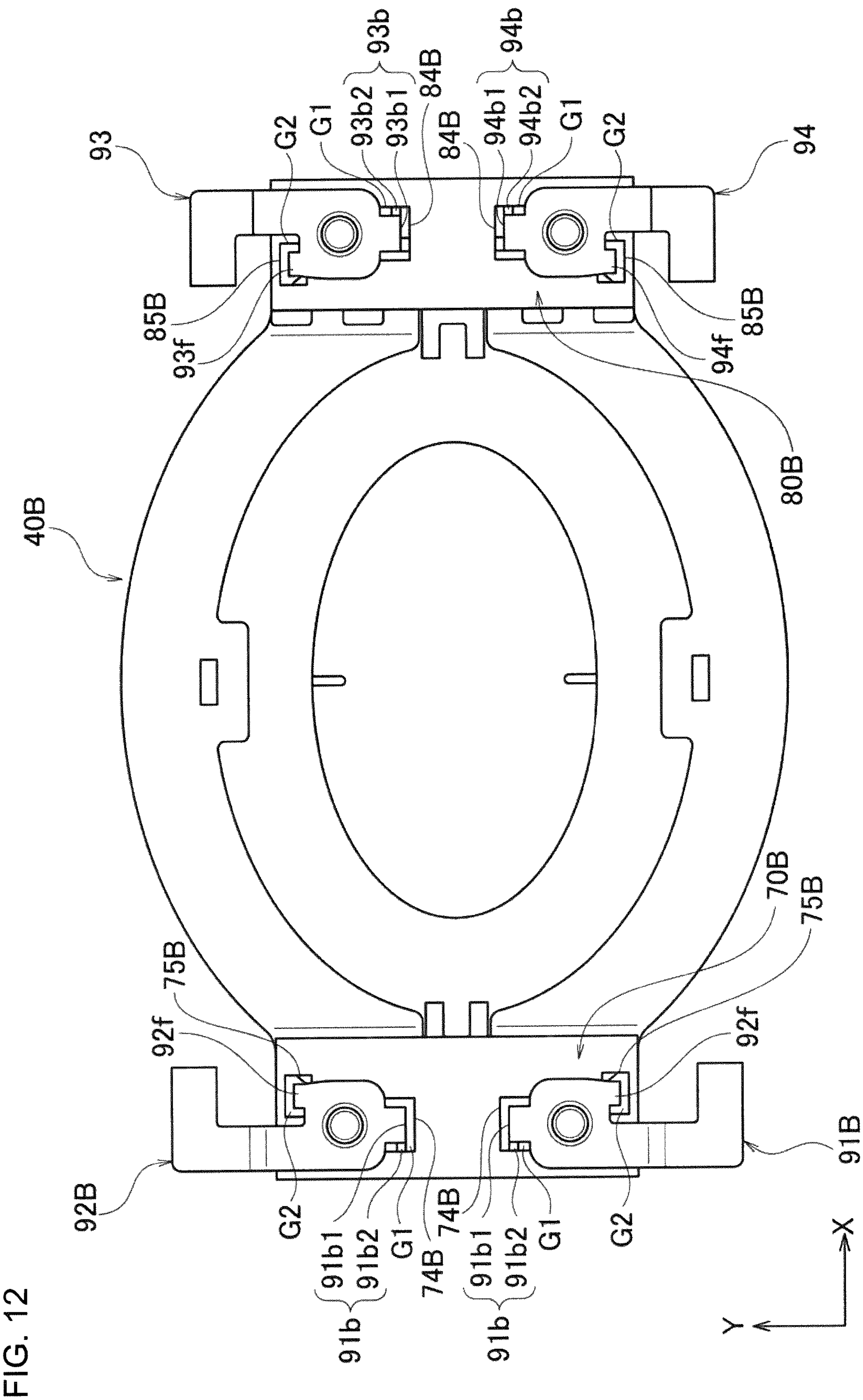
FIG. 12 is a plane view when terminals are attached to the bobbin shown in FIG. 11.

Except for the following respects, a coil device 10B according to Third Embodiment shown in FIG. 10 to FIG. 12 has similar structure and effect to the coil device 10 according to First Embodiment. In FIG. 10 to FIG. 12, the members common with those of the coil device 10 according to First Embodiment are given a similar reference numeral and are not partly explained.

As shown in FIG. 10, the coil device 10B is different from the coil device 10 according to First Embodiment in that the coil device 10B includes a bobbin 40B, terminal blocks 70B and 80B, and terminal fittings 91B and 92B.

As shown in FIG. 11, the terminal fitting 91B (92B) is different from the terminal fitting 91 (92) (FIG. 5B) according to First Embodiment in that a connection portion 91*e*' (92*e*') of the terminal fitting 91B (92B) is provided with a stepped bent portion. The shape of the terminal fitting 91B (92B) is substantially the same as that of the terminal fitting 93 (94). The height of the wire connection portion 91*a* (92*a*) in the Z-axis direction is lower than the plane of the attachment portion 91*c* (92*c*).

The bobbin 40B is different from the bobbin 40 (FIG. 2A) according to First Embodiment in that the bobbin 40B is provided with the terminal blocks 70B and 80B. The terminal blocks 70B and 80B are formed integrally with the bobbin 40B and are respectively arranged at one end and the other end of the bobbin 40B (bobbin upper flange portion 48) in the X-axis direction.

The terminal block 70B (80B) protrudes outward in the X-axis direction with a predetermined length and has a predetermined width in the Y-axis direction. As with the terminal 70 (80) according to First Embodiment, the terminal block 70B (80B) includes the base body 71 (81), the terminal attachment portions 73 (83), and the attachment holes 76 (86), but does not include the through hole 72 (82). In addition, the terminal block 70B (80B) includes terminal grooves 74B (84B) instead of the terminal grooves 74 (84) and engagement grooves 75B (85B) instead of the engagement grooves 75 (85). The terminal grooves 74B (84B) and the engagement grooves 75B (85B) penetrate from the front surface to the back surface of the terminal block 70B (80B).

Incidentally, the hook portion 91*b* (92*b*) of the terminal fitting 91B (92B) is provided with a portion extending downward in the Z-axis direction and narrowing in the X-axis direction and a portion extending outward in the X-axis direction and widening in the X-axis direction. Hereinafter, the former portion is referred to as a narrow portion 91*b*1 (92*b*1), and the latter portion is referred to as a wide portion 91*b*2 (92*b*2). Likewise, a hook portion 93*b* (94*b*) of the terminal fitting 93 (94) is provided with a portion extending downward in the Z-axis direction and narrowing in the X-axis direction referred to as a narrow portion 93*b*1 (94*b*1) and a portion extending outward in the X-axis direction and widening in the X-axis direction referred to as a wide portion 93*b*2 (94*b*2).

The two terminal grooves 74B and 74B of the terminal block 70B are formed to have a larger groove width in each of the X-axis direction and the Y-axis direction compared to the terminal grooves 74 and 74 (FIG. 5A) according to First Embodiment. The width of the terminal groove 74B (74B) in the X-axis direction is larger than that of the hook portion 91*b* (92*b*) (narrow portion 91*b*1 (92*b*1)) of the terminal fitting 91B (92B) in the X-axis direction, and the width of the terminal groove 74B (74B) in the Y-axis direction is larger than that of the hook portion 91*b* (92*b*) (narrow portion 91*b*1 (92*b*1)) of the terminal fitting 91B (92B) in the Y-axis direction (plate thickness of the terminal fitting 91B (92B)). Thus, as shown in FIG. 12, when the hook portion 91*b* (92*b*) is inserted in the terminal groove 74B (74B), a gap G1 is formed between the hook portion 91*b* (92*b*) and the inner wall of the terminal groove 74B (74B).

The two engagement grooves 75B and 75B of the terminal block 70B are formed to have a larger groove width in each of the X-axis direction and the Y-axis direction compared to the engagement grooves 75 and 75 according to First Embodiment. The width of the engagement groove 75B (75B) in the X-axis direction is larger than that of the insertion convex portion 91*f* (92*f*) of the terminal fitting 91B (92B) in the X-axis direction, and the width of the engagement groove 75B (75B) in the Y-axis direction is larger than that of the insertion convex portion 91*f* (92*f*) of the terminal fitting 91B (92B) in the Y-axis direction (plate thickness of the terminal fitting 91B (92B)). Thus, when the insertion convex portion 91*f* (92*f*) is inserted in the engagement groove 75B (75B), a gap G2 is formed between the insertion convex portion 91*f* (92*f*) and the inner wall of the engagement groove 75B (75B).

Thus, the hook portion 91*b* (92*b*) is movable both in the X-axis direction and the Y-axis direction within the gap G1 in the terminal groove 74B (74B), and the insertion convex portion 91*f* (92*f*) is movable both in the X-axis direction and the Y-axis direction within the gap G2 in the engagement groove 75B (75B). In the present embodiment, the terminal fittings 91B and 92B are consequently movable both in the X-axis direction and the Y-axis direction of the bobbin 40B. As with First Embodiment, the terminal fittings 91B and 92B are also movable in the Z-axis direction of the bobbin 40B.

Incidentally, the width of the wide portion 91*b*2 (92*b*2) of the hook portion 91*b* (92*b*) in the X-axis direction is larger than that of the terminal groove 74B (74B) in the X-axis direction. This makes it possible to prevent the hook portions 91*b* (92*b*) from coming off from the terminal grooves 74B and 74B. A part of each wide portion 91*b*2 (92*b*2) is disposed in a groove (not shown) formed inside the terminal block 70B and is movable in each of the X-axis, the Y-axis, and the Z-axis in this groove. Incidentally, a retainer of the terminal fittings 91B and 92B for the terminal block 70B may be disposed on the insertion convex portion 91*f* (92*f*) or on both of the hook portion 91*b* (92*b*) and the insertion convex portion 91*f* (92*f*).

In the illustrated example, the widths of the gaps G1 and G2 in the X-axis direction are the same, but may be different from each other. In addition, the widths of the gaps G1 and G2 in the Y-axis direction are the same, but may be different from each other. The width of the gap G1 (G2) in each of the X-axis direction and the Y-axis direction is appropriately determined based on an expected movement amount of the terminal fitting 91B (92B) in the X-axis direction and the Y-axis direction for the bobbin 40B.

The above-mentioned structure is similarly provided in the terminal block 80B. The hook portion 93*b* (94*b*) is movable both in the X-axis direction and the Y-axis direction within the gap G1 in the terminal groove 84B (84B). The insertion convex portion 93*f* (94*f*) is movable both in the X-axis direction and the Y-axis direction within the gap G2 in the engagement groove 75B (75B). In the present embodiment, the terminal fitting 93 (94) is also consequently movable both in the X-axis direction and the Y-axis direction of the bobbin 40B. As with First Embodiment, the terminal fittings 93 and 94 are also movable in the Z-axis direction of the bobbin 40B.

In the present embodiment, the terminal blocks 70B and 80B are integrally formed with the bobbin 40B and do not thereby relatively move to the bobbin 40B in the X-axis direction or the Y-axis direction, but the positions of the terminal blocks 70B and 80B are fixed. On the other hand, the terminal fittings 91B, 92B, 93, and 94 themselves move relatively to the bobbin 40B both in the X-axis direction and the Y-axis direction. In the present embodiment, since the terminal fittings 91B, 92B, 93, and 94 are movable both in the X-axis direction and the Y-axis direction of the bobbin 40B, the insertion holes 91*d*-94*d* of the terminal fittings 91B, 92B, 93, and 94 and attachment holes 302 of the circuit board 300 can accurately be positioned only by relatively moving the terminal blocks 91B, 92B, 93, and 94 to the bobbin 40B after roughly positioning a substrate, such as the circuit board 300 shown in FIG. 1A, and the coil device 10B. Thus, it is easy to accurately position and connect a circuit pattern of the circuit board 300 and the terminal fittings 91B, 92B, 93, and 94 using a fastener, such as screws 304.

Fourth Embodiment

Figure 13:
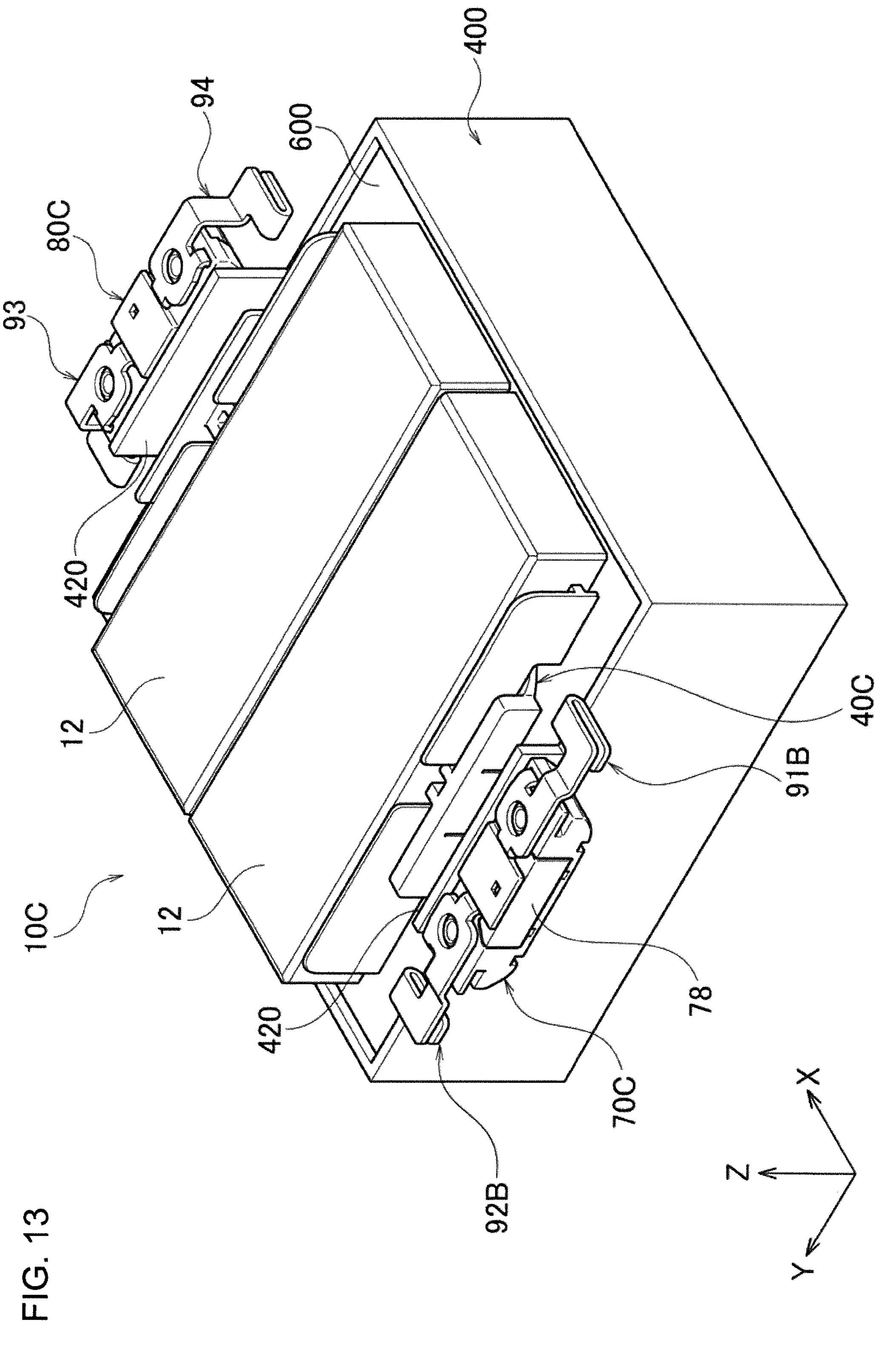
FIG. 13 is a perspective view of a coil device according to Fourth Embodiment of the present invention.
Figure 14:
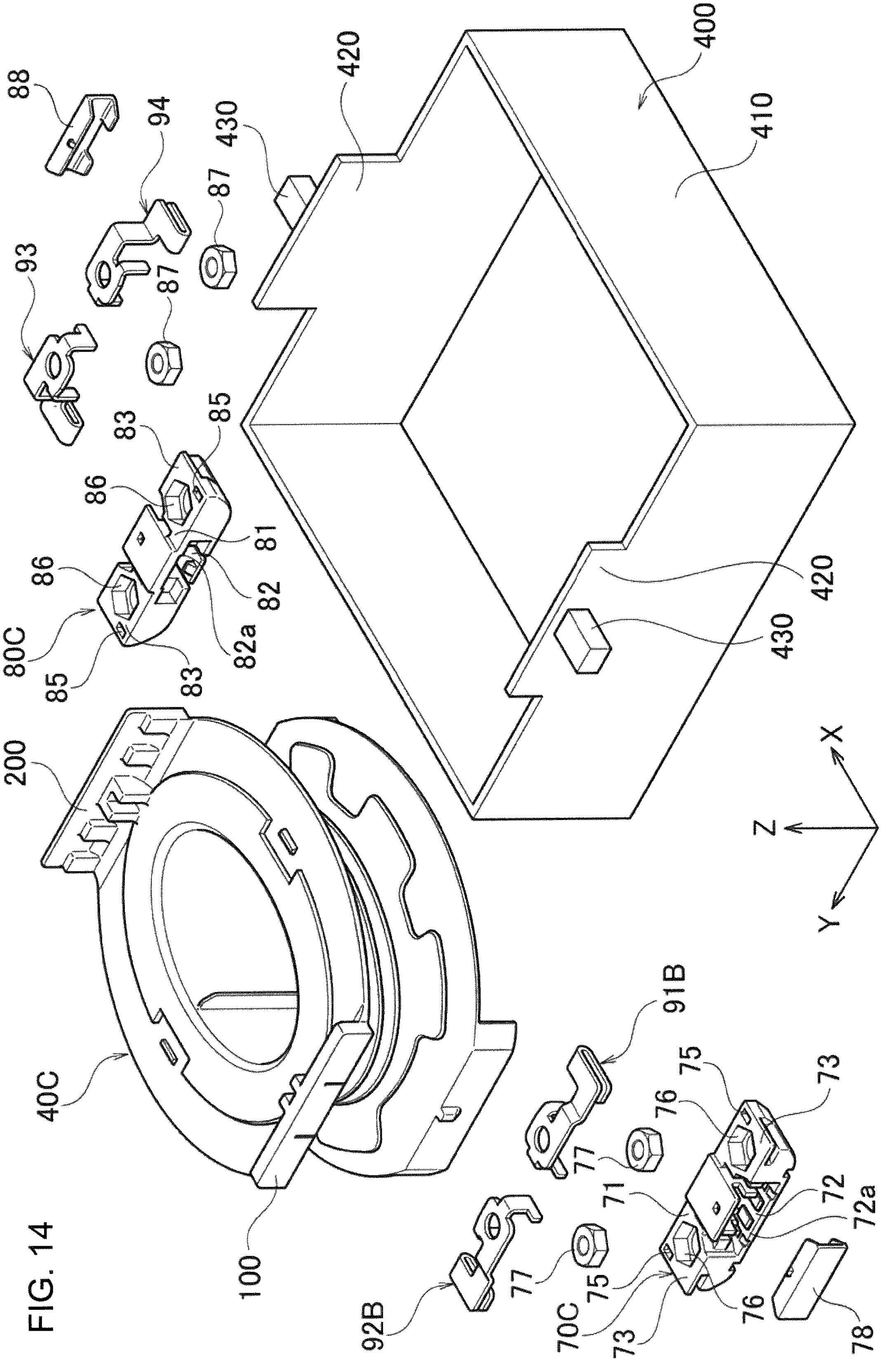
FIG. 14 is an exploded perspective view of a main part of the coil device shown in FIG. 13.
Figure 15:
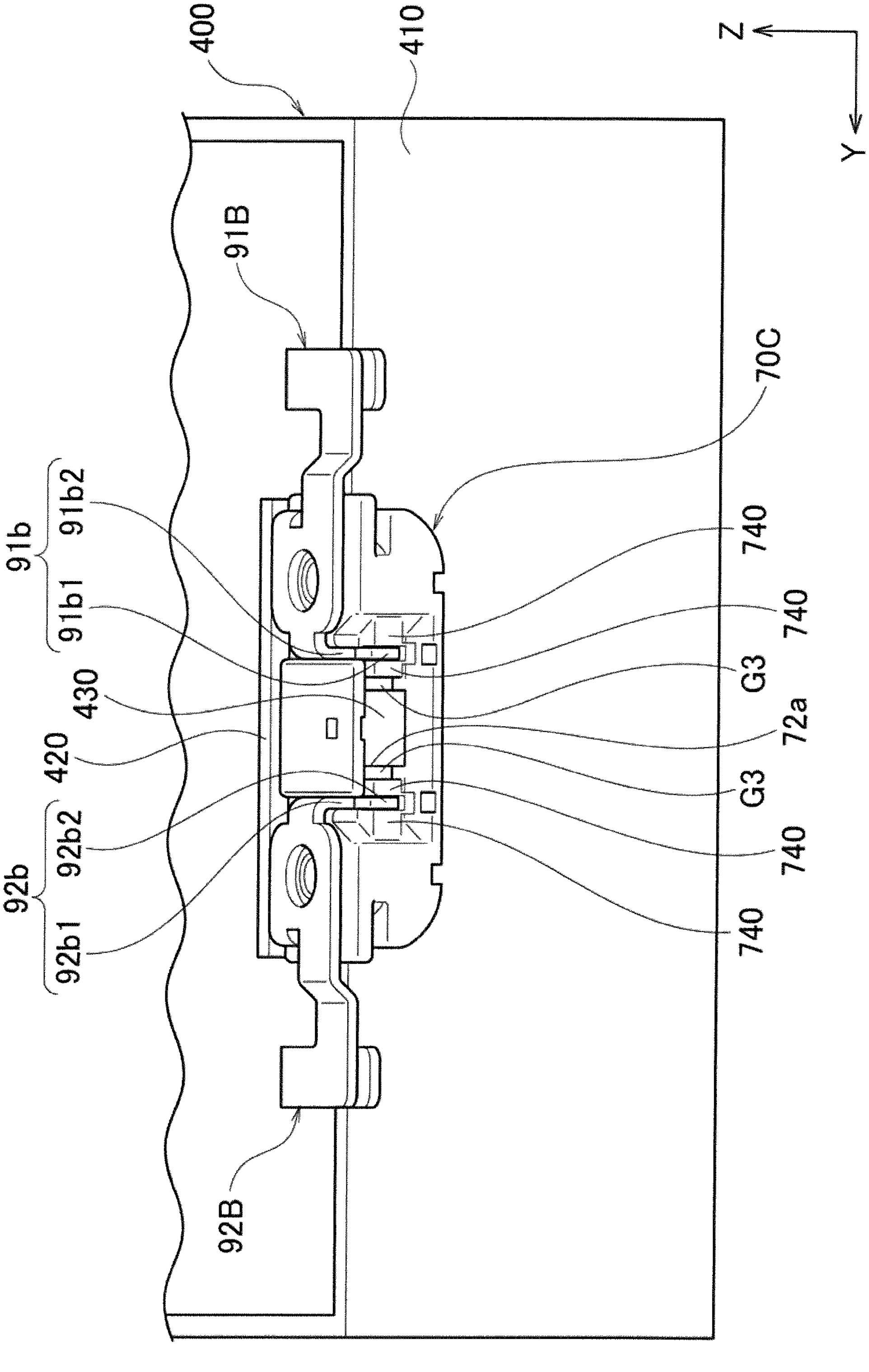
FIG. 15 is an enlarged perspective view of a terminal block and the like shown in FIG. 14.

Except for the following respects, a coil device 10C according to Fourth Embodiment shown in FIG. 13 to FIG. 15 has similar structure and effect to the coil device 10 according to First Embodiment. In FIG. 13 to FIG. 15, the members common with those of the coil device 10 according to First Embodiment are given a similar reference numeral and are not partly explained.

As shown in FIG. 13, the coil device 10C according to Fourth Embodiment is different from the coil device 10 according to First Embodiment in that the coil device 10C includes a bobbin 40C and terminal blocks 70C and 80C and further includes a case 400. As shown below, the coil device 10C according to the present embodiment is structured so that the terminal blocks 70C and 80C are movable both in the X-axis direction and the Y-axis direction of the case 400.

As shown in FIG. 14, the bobbin 40C is different from the bobbin 40 according to First Embodiment in that the insulation wall 100 (200) is not provided with the loose engagement convex portion 102*a* (202*a*).

The case 400 is a container for containing the bobbin 40C, the core 12, and the like and is filled with a resin 600. The case 400 includes a side portion 410, two terminal-block attachment portions 420 and 420, and two loose engagement convex portions 430 and 430.

The side portion 410 constitutes a side wall of the case 400 and surrounds all four parts of the case 400. The terminal-block attachment portions 420 and 420 are formed at ends of the side portion 410 in the X-axis direction and are integrally formed so as to protrude upward along the Y-axis. The loose engagement convex portion 430 (430) is formed at a substantially central part of the terminal-block attachment portion 420 (420) in the Y-axis direction and protrudes outward in the X-axis direction from the outer wall in the X-axis direction. The loose engagement convex portion 430 (430) has a substantially prismatic shape, and the loose engagement concave portion 72*a* (82*a*) of the terminal block 70C (80C) is attached to the loose engagement convex portion 430 (430).

As shown in FIG. 15, the terminal block 70C is different from the terminal block 70 according to First Embodiment (FIG. 5A) in that the terminal block 70C includes a pair of grip portions 740 and 740 formed on one side in the Y-axis direction and a pair of grip portions 740 and 740 formed on the other side in the Y-axis direction. The hook portion 91*b* (wide portion 91*b*2) of the terminal fitting 91B is inserted into one holding portions 740 and 740 and sandwiched, and the terminal fitting 91B is thereby fixed to the terminal block 70C in a stable state. The hook portion 92*b* (wide portion 92*b*2) of the terminal fitting 92B is inserted into the other holding portions 740 and 740 and sandwiched, and the terminal fitting 92B is thereby fixed to the terminal block 70C in a stable state. The terminal block 80C is structured similarly, and the above-mentioned pair of grip portions is disposed on each of one side and the other side of the terminal block 80C in the Y-axis direction.

The width of the loose engagement concave portion 72*a* in the Y-axis direction is larger than that of the loose engagement convex portion 430 (430) in the Y-axis direction. Thus, when the loose engagement convex portion 430 (430) is attached to the loose engagement concave portion 72*a* (72*a*) of the terminal block 70C, a gap G3 is formed between the loose engagement convex portion 430 (430) and the inner wall of the loose engagement concave portion 72*a*. Thus, the loose engagement convex portion 430 (430) is inserted in the loose engagement concave portion 72*a* (72*a*) so as to be movable in the Y-axis direction within the gap G3, and the terminal block 70C for holding the terminal fittings 91B and 92B can be attached to the case 400 so as to be movable in the Y-axis direction of the bobbin 40C.

As with the loose engagement convex portion 102*a* (FIG. 5A) according to First Embodiment, the loose engagement convex portion 430 (430) is inserted movably in the X-axis direction, and the terminal block 70C for holding the terminal fittings 91B and 92B can be attached to the case 400 so as to be movable in the X-axis direction of the bobbin 40C.

The structure shown above is also provided in the terminal block 80C, and the terminal block 80C can also be attached to the case 400 so as to be movable both in the X-axis direction and the Y-axis direction of the case 400 or the bobbin 40C.

Effects similar to those of First Embodiment are also obtained in the present embodiment. In particular, in the present embodiment, since the terminal blocks 70C and 80C are attached to the case 400 for housing the bobbin 40C, the terminal blocks 70C and 80C move relatively to the bobbin 40C, and the insertion holes 91*d*-94*d* of the terminal fittings 91B, 92B, 93, and 94 of the terminal blocks 70C and 80C and the attachment holes 302 of the circuit board 300 can accurately be positioned, by relatively moving the terminal blocks 70C and 80C to the case 400 after roughly positioning a board, such as the circuit board 300 shown in FIG. 1A, and the coil device 10C. Thus, it is easy to accurately position and connect a circuit pattern of the circuit board 300 and the terminal fittings 91B, 92B, 93, and 94 using a fastener, such as screws 304.

Fifth Embodiment

Except for the following respects, a coil device 10D according to Fifth Embodiment shown in FIG. 16 to FIG. 19B has similar structure and effect to the coil device 10 according to First Embodiment. In FIG. 16 to FIG. 19B, the members common with those of the coil device 10 according to First Embodiment are given a similar reference numeral and are not partly explained.

Figure 16:
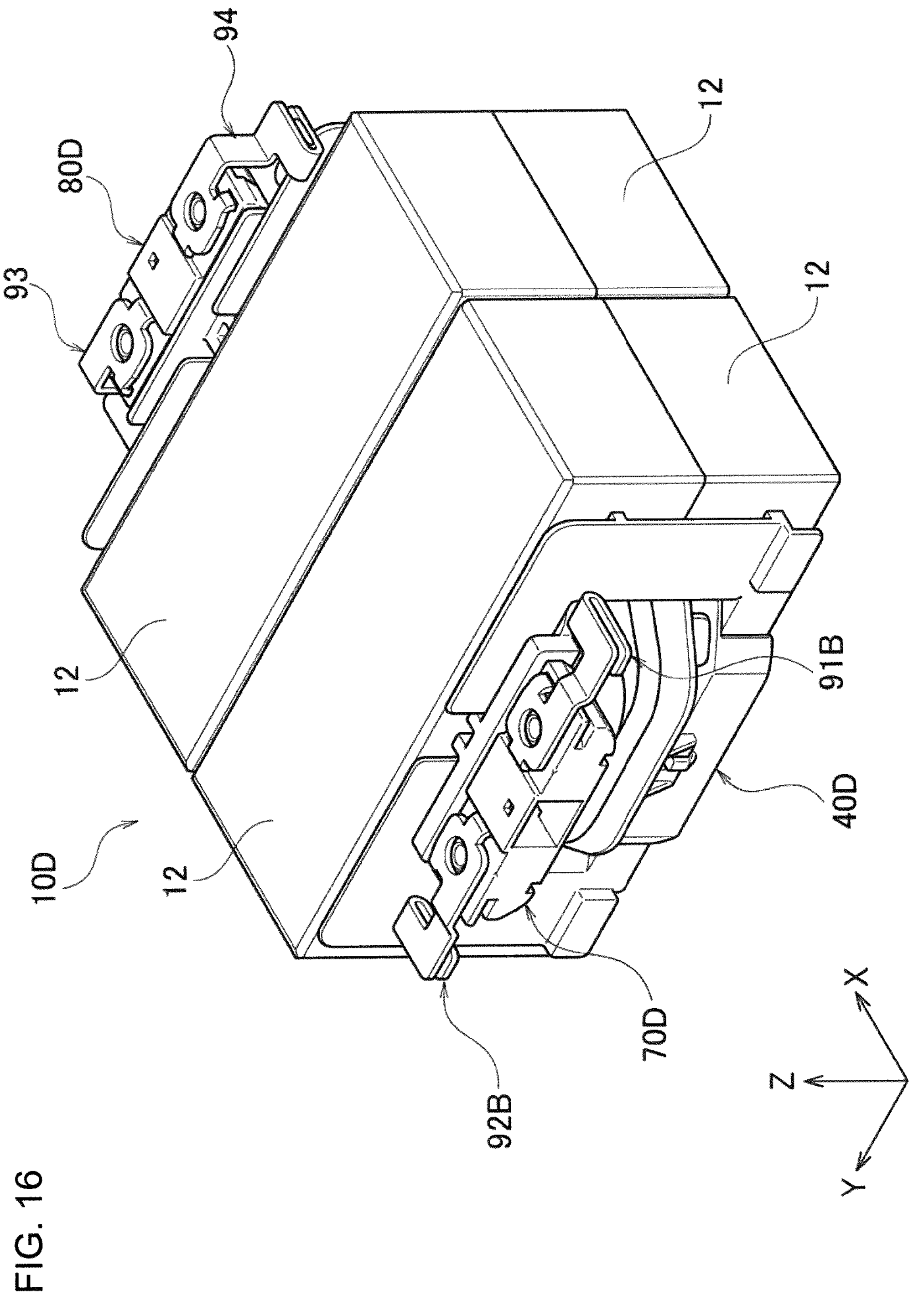
FIG. 16 is a perspective view of a coil device according to Fifth Embodiment of the present invention.

As shown in FIG. 16, the coil device 10D is different from the coil device 10 according to First Embodiment in that the coil device 10D includes a bobbin 40D and terminal blocks 70D and 80D. As shown below, the coil device 10D according to the present embodiment is structured so that the terminal blocks 70D and 80D are also movable in the Z-axis direction in addition to in the X-axis direction and the Y-axis direction of the bobbin 40D. In the figures, only conceptual features for achieving the above-mentioned structure are illustrated, and a retaining mechanism (for example, the retaining holes 104 and 204 shown in FIG. 5A or the stopper convex portions 72*a*4 and 82*a*4 shown in FIG. 6) is not illustrated.

The bobbin 40D is different from the bobbin 40 according to First Embodiment in that the loose engagement convex portion 102*a* is not provided with the sub convex portions 102*a*2 and 102*a*2, but is provided with only the main convex portion 102*a*1.

In the present embodiment, the terminal fittings 91B, 92B, 93, and 94 are press-fitted or insert-molded in the terminal blocks 70D and 80D. The hook portions 91*b*-94*b* and the insertion convex portions 91*f*-94*f* of the terminal fittings 91B, 92B, 93, and 94 are embedded in the terminal blocks 70D and 80D, and the terminal fittings 91B, 92B, 93, and 94 are integrated with the terminal blocks 70D and 80D.

Figure 18A:
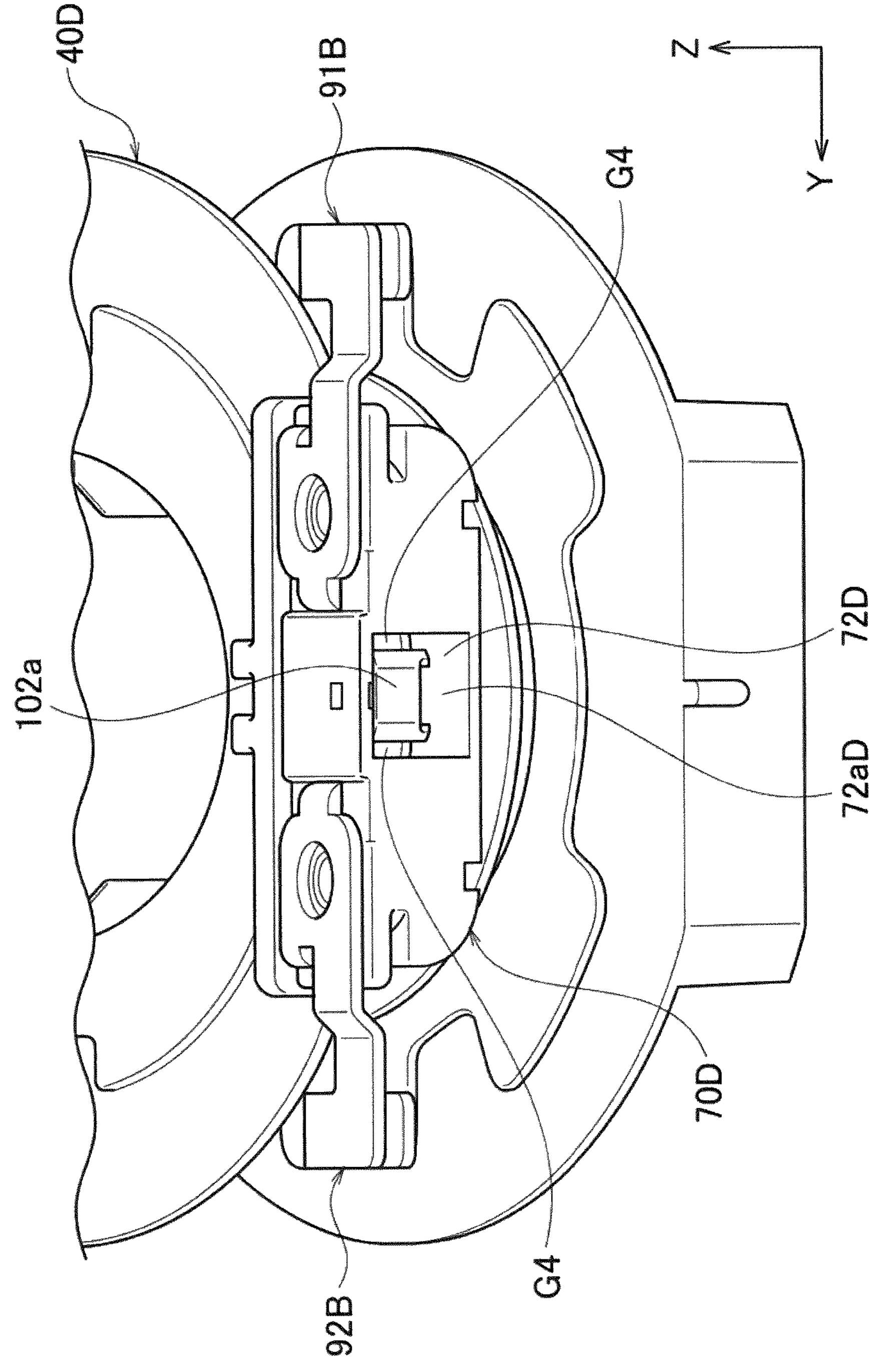
FIG. 18A is an enlarged perspective view when a terminal block is attached to a bobbin shown in FIG. 17.
Figure 18B:
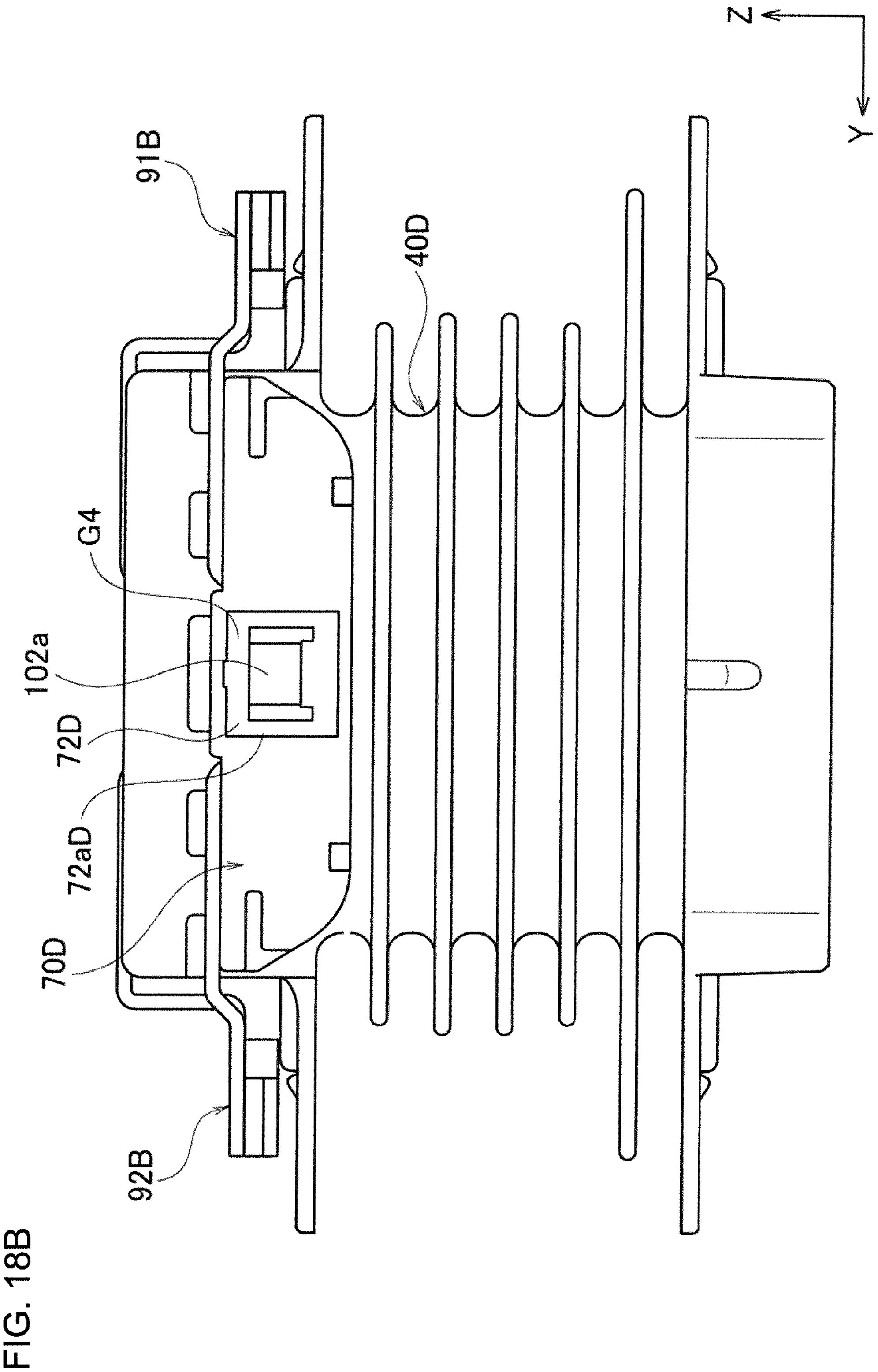
FIG. 18B is an enlarged side view when a terminal block is attached to a bobbin shown in FIG. 17.

The terminal block 70D (80D) is different from the terminal block 70 (80) according to First Embodiment in that the base body 71D (81D) is provided with a through hole 72D (82D) including a loose engagement concave portion 72*a*D (82*a*D). As shown in FIG. 18A and FIG. 18B, the width of the loose engagement concave portion 72*a*D in the Y-axis direction is larger than that of the loose engagement convex portion 102*a* in the Y-axis direction. In addition, the width of the loose engagement concave 72*a*D in the Z-axis direction is larger than that of the loose engagement convex portion 102*a* in the Z-axis direction. Thus, when the loose engagement convex portion 102*a* is attached to the loose engagement concave portion 72*a*D of the terminal block 70D, a gap G4 surrounding the loose engagement convex portion 102*a* is formed between the loose engagement convex portion 102*a* and the inner wall of the loose engagement concave portion 72*a*D. Thus, the loose engagement convex portion 102*a* is inserted in the loose engagement concave portion 72*a*D so as to be movable both in the Y-axis direction and the Z-axis direction within the gap G4, and the terminal block 70D for holding the terminal fittings 91B and 92B can be attached to the bobbin 40D so as to be movable both in the Y-axis direction and the Z-axis direction of the bobbin 40D.

As with First Embodiment, the loose engagement convex portion 102*a* is inserted movably in the X-axis direction, and the terminal block 70D for holding the terminal fittings 91B and 92B can be attached to the bobbin 40D so as to be movable in the X-axis direction of the bobbin 40D.

For example, when the coil device 10D is attached to the circuit board 300 (FIG. 1A), the loose engagement convex portion 102*a* may be fixed while floating in the inside space of the loose engagement concave portion 72*a*D without contacting its inner walls as illustrated. Instead, the loose engagement convex portion 102*a* may be fixed while being in contact with the inner wall (the inner wall on the upper side or on the lower side) of the loose engagement concave portion 72*a*D.

The structure shown above is also provided in the terminal block 80D. The terminal block 80D can also be attached to the bobbin 40D so as to be movable in the Z-axis direction in addition to in the X-axis direction and the Y-axis direction of the bobbin 40D.

Effects similar to those of First Embodiment are also obtained in the present embodiment. In particular, in the present embodiment, the attachment positions between the insertion holes 91*d*-94*d* of the terminal fittings 91B, 92B, 93, and 94 and the attachment holes 302 of the circuit board 300 can be adjusted easily slightly in the Z-axis direction by relatively moving the terminal blocks 70D and 80D in the Z-axis direction to the bobbin 40D. Thus, it is easy to accurately position and connect a circuit pattern of the circuit board 300 and the terminal fittings 91B, 92B, 93, and 94 using a fastener, such as screws 304.

In the present embodiment, the terminal blocks 70D and 80D are movable in the Z-axis direction of the bobbin 40D, and the terminals 91B, 92B, 93 and 94 are formed integrally with the terminal block 40D. Thus, it is possible to simplify the step of attaching the terminals 91B, 92B, 93, and 94 to the terminal blocks 70D and 80D, and the coil device 10D is easily manufactured.

Figure 17:
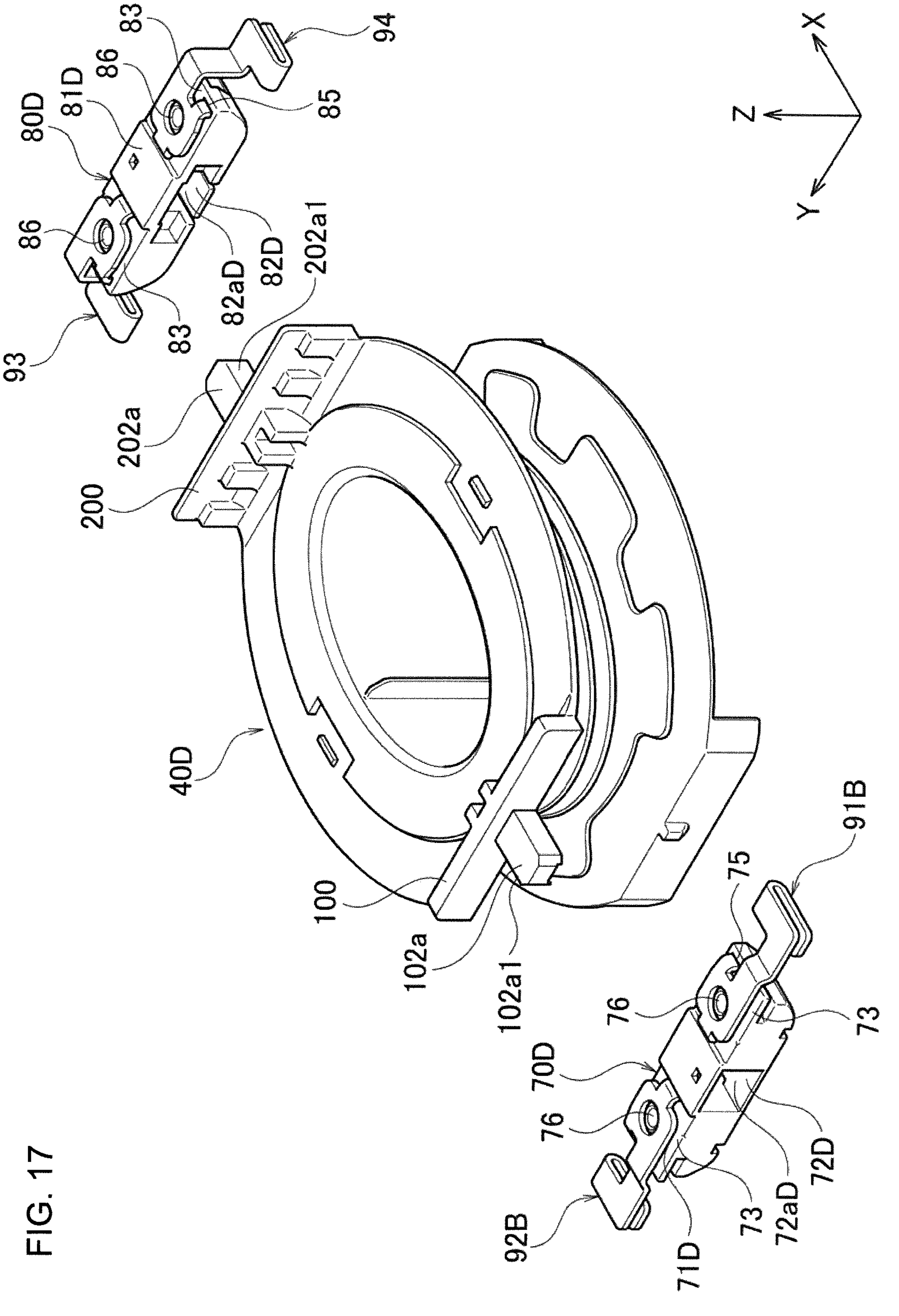
FIG. 17 is an exploded perspective view of a main part of the coil device shown in FIG. 16.
Figure 19A:
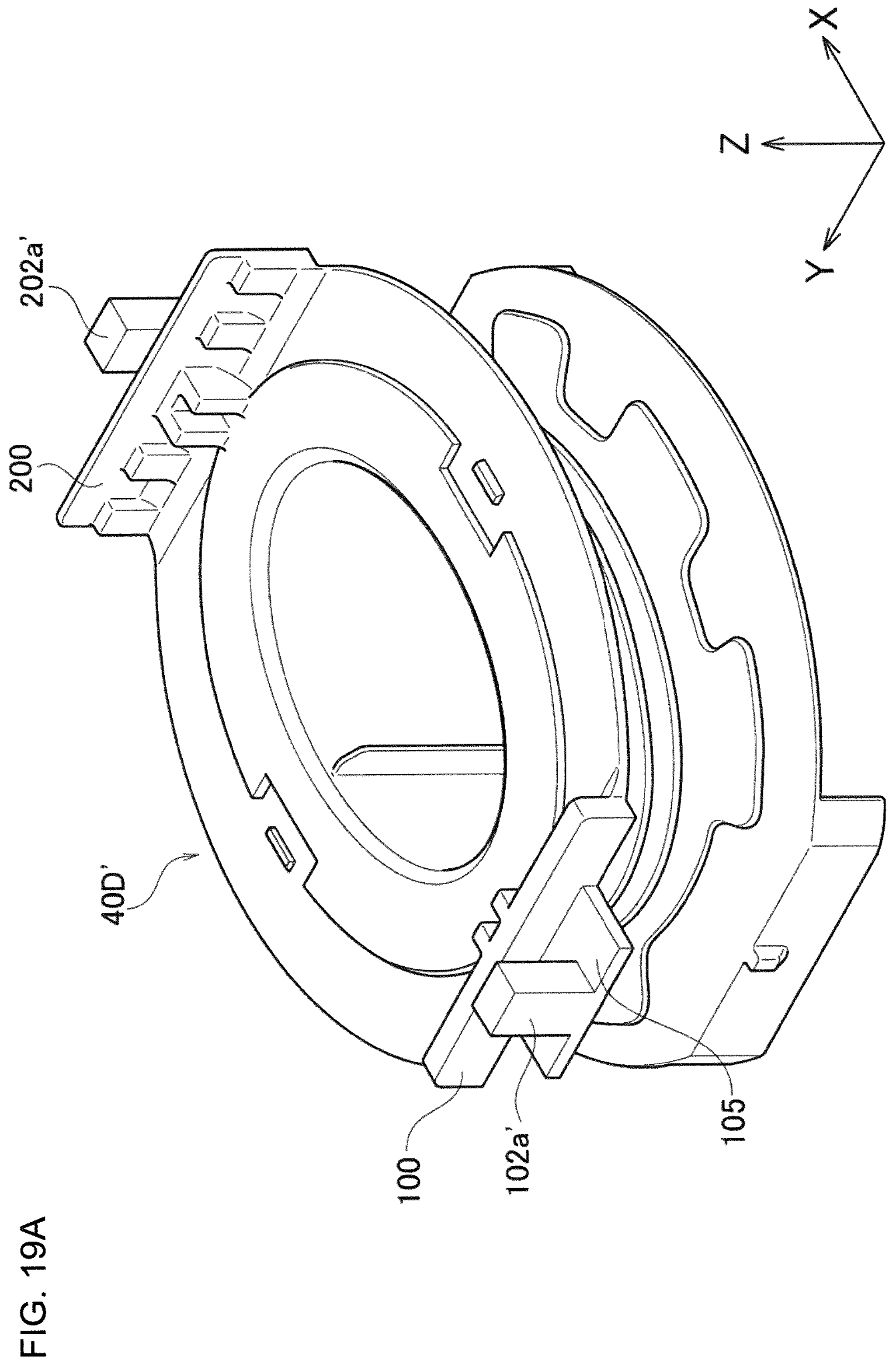
FIG. 19A is a perspective view illustrating a modified example of a bobbin shown in FIG. 17.

In the example of FIG. 17, the loose engagement convex portion 102*a* protrudes outward in the X-axis direction, but may protrude toward any other direction. This is also the case with the loose engagement convex portion 202*a*. For example, a bobbin 40D' shown in FIG. 19A is provided with a loose engagement convex portion 102*a*' protruding outward in the Z-axis direction. The loose engagement convex portion 102*a*' and the insulation wall 100 are connected by a terminal-block installation portion 105. The loose engagement convex portion 102*a*' extends from the upper surface of the terminal-block installation portion 105 in the Z-axis direction. When the loose engagement convex portion 102*a*' is inserted in the loose engagement concave portion 72*a*D of the terminal block 70D, the terminal block 70D can be installed on the terminal-block installation portion 105.

Although not illustrated in detail, the terminal block 70D (80D) can be attached to the bobbin 40D so as to be movable in the Z-axis direction by providing the terminal block 70*d* (80D) with the loose engagement concave portion 72*a* (82*a*) extending in the Z-axis direction and inserting the loose engagement convex portion 102*a*' into this loose engagement concave portion 72*a* (82*a*). When each width of this loose engagement concave portion 72*a* (82*a*) in the X-axis direction and the Y-axis direction is larger than that of the loose engagement convex portion 102*a*' in the X-axis direction and the Y-axis direction, the terminal block 70D (80D) can be attached to the bobbin 40D so as to be movable both in the X-axis direction and the Y-axis direction.

Figure 19B:
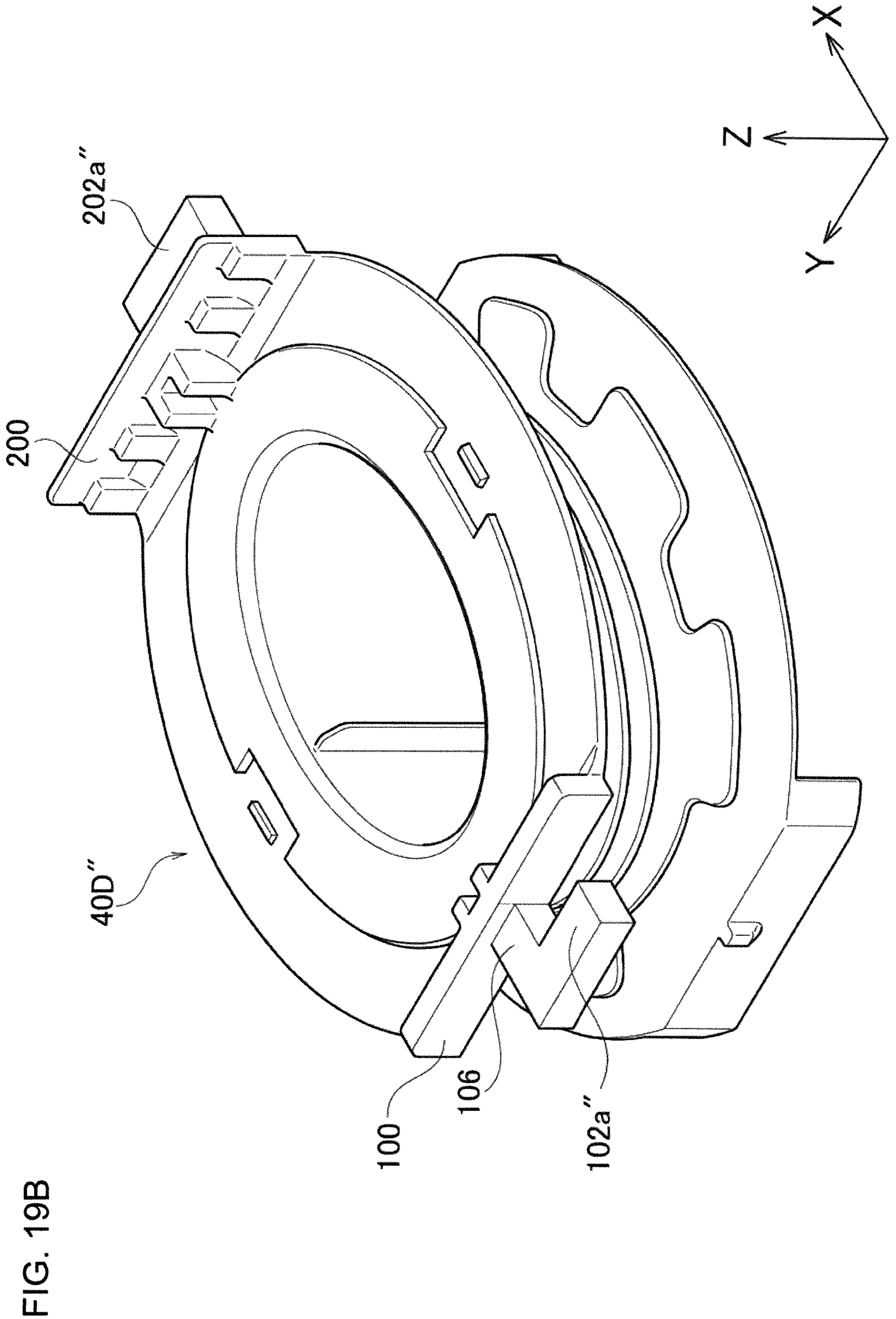
FIG. 19B is a perspective view illustrating another modified example of a bobbin shown in FIG. 17.

A bobbin 40D" shown in FIG. 19B is provided with a loose engagement convex portion 102*a*" protruding outward in the Y-axis direction. One end of the loose engagement convex portion 102*a*" in the Y-axis direction and the insulation wall 100 are connected by a connection portion 106 extending outward in the X-axis direction from the outer wall surface of the insulation wall 100 in the X-axis direction.

Although not illustrated in detail, the terminal block 70D (80D) can be attached to the bobbin 40D so as to be movable in the Y-axis direction by providing the terminal block 70D (80D) with the loose engagement concave portion 72*a* (82*a*) extending in the Y-axis direction and inserting the loose engagement convex portion 102*a*" into this loose engagement concave portion 72*a* (82*a*). When each width of this loose engagement concave portion 72*a* (82*a*) in the X-axis direction and the Z-axis direction is larger than that of the loose engagement convex portion 102*a*" in the X-axis direction and the Z-axis direction, the terminal block 70D (80D) can be attached to the bobbin 40D so as to be movable both in the X-axis direction and the Z-axis direction.

Sixth Embodiment

Figure 20:
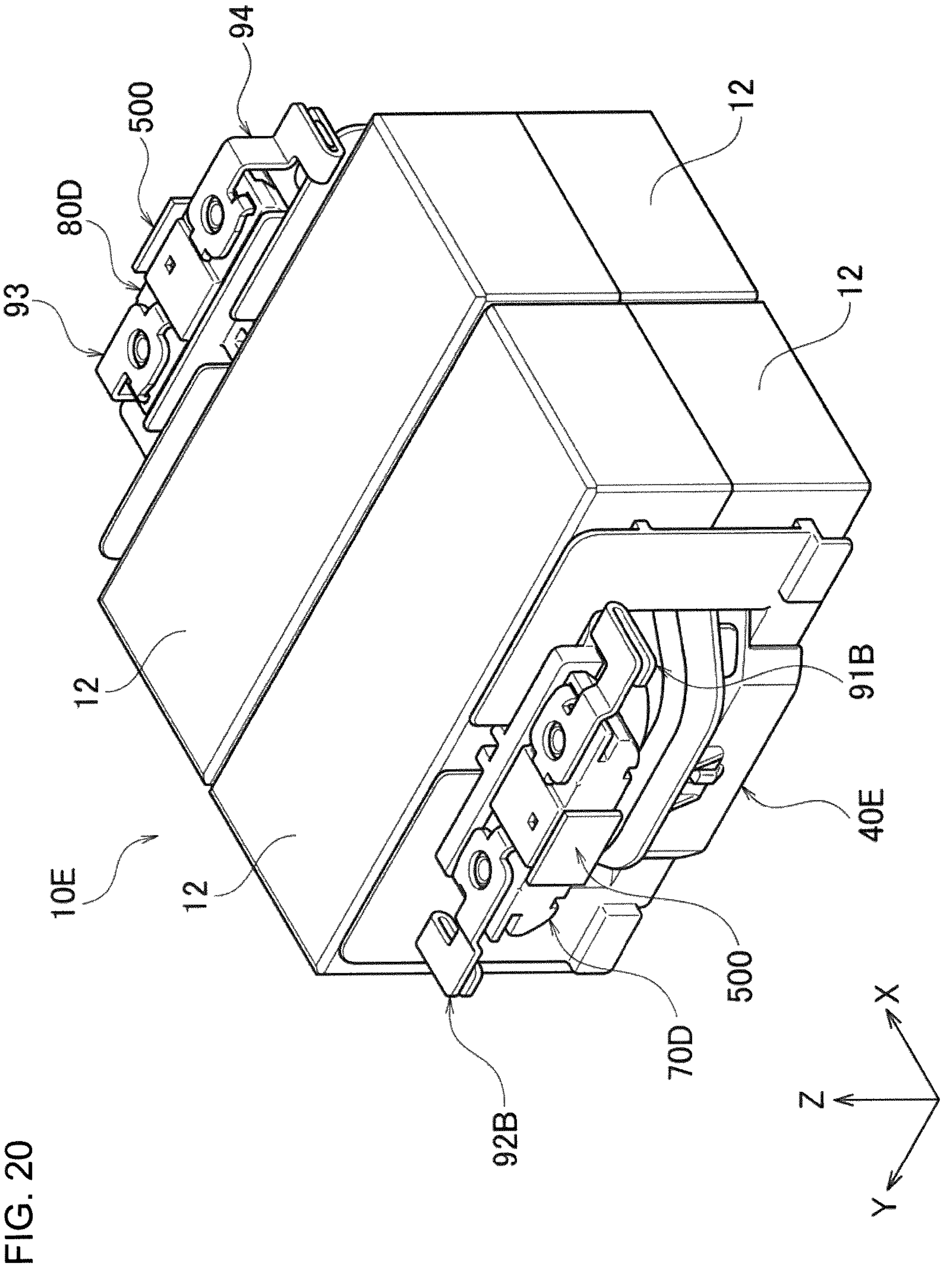
FIG. 20 is a perspective view of a coil device according to Sixth Embodiment of the present invention.
Figure 21:
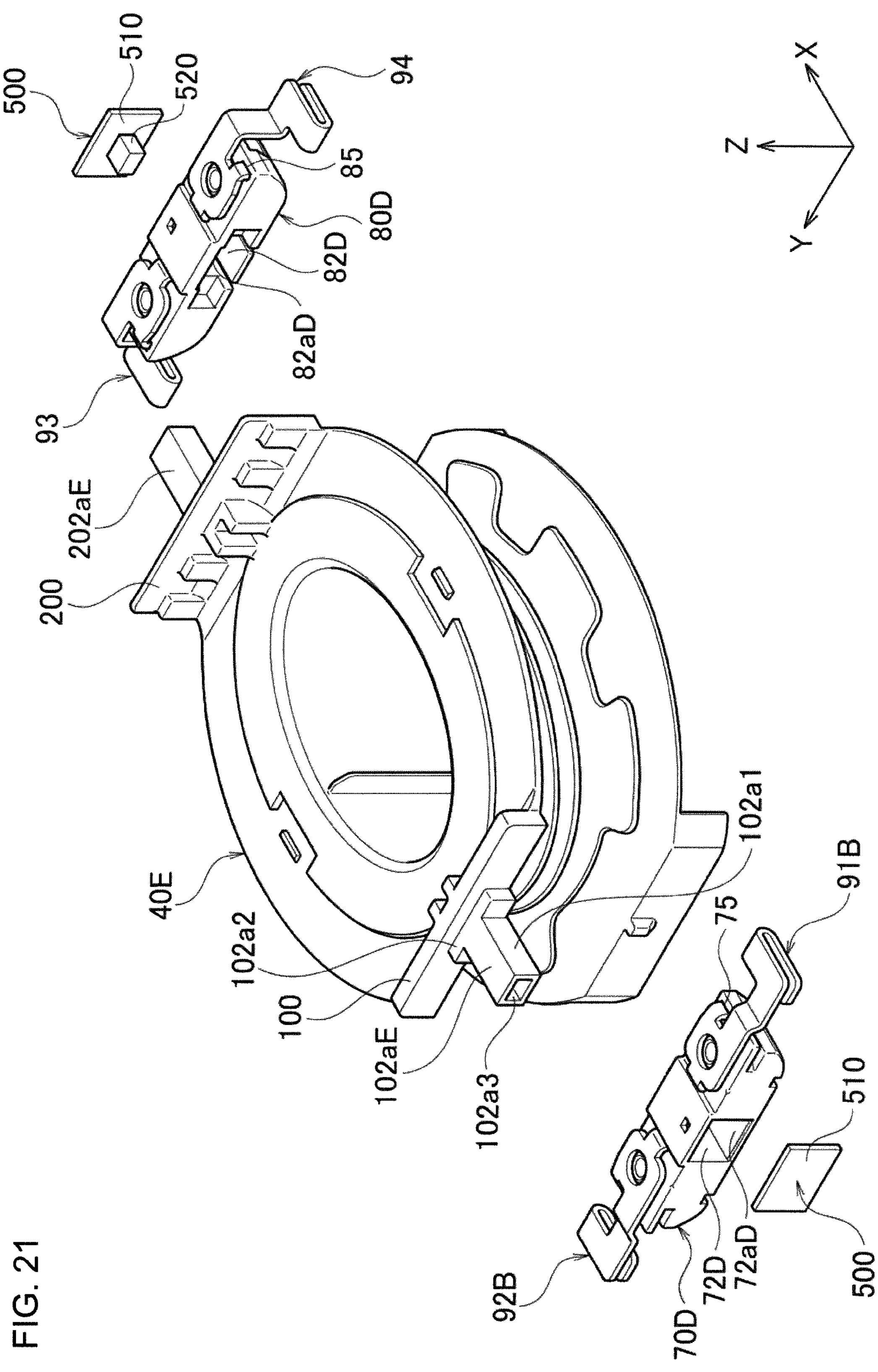
FIG. 21 is an exploded perspective view of a main part of the coil device shown in FIG. 20.
Figure 22:
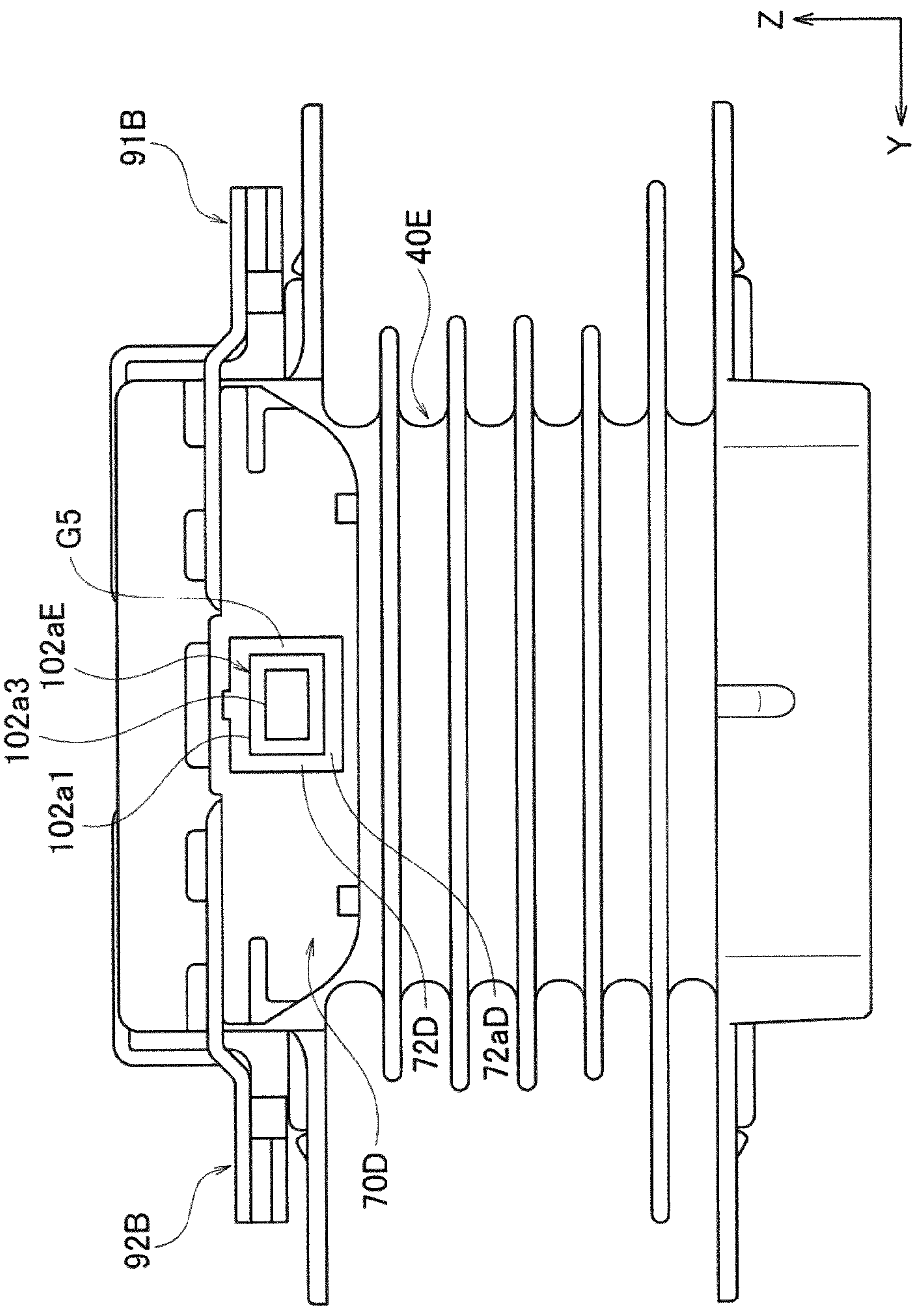
FIG. 22 is an enlarged perspective view when a terminal block is attached to a bobbin shown in FIG. 21.

Except for the following respects, a coil device 10E according to Sixth Embodiment shown in FIG. 20 to FIG. 22 has similar structure and effect to the coil device 10 according to First Embodiment. In FIG. 20 to FIG. 22, the members common with those of the coil device 10 according to First Embodiment are given a similar reference numeral and are not partly explained.

As shown in FIG. 20, the coil device 10E is different from the coil device 10 according to First Embodiment in that the coil device 10E includes a bobbin 40E and the terminal blocks 70D and 80D and further includes a stopper wall portion 500. In the coil device 10E according to the present embodiment, as shown below, the stopper wall portion 500 prevents the terminal blocks 70D and 80D from coming off from the bobbin 40E.

As shown in FIG. 21, the bobbin 40E is different from the bobbin 40 according to First Embodiment in that the bobbin 40E includes loose engagement convex portions 102*a*E and 202*a*E. The loose engagement convex portion 102*a*E is not provided with the retaining hole 104 shown in FIG. 5A, but is provided with an insertion hole 102*a*3. The insertion hole 102*a*3 extends in the longitudinal direction of the loose engagement convex portion 102*a*E (X-axis direction), and the length of the insertion hole 102*a*3 in the X-axis direction is larger than that of an engagement portion 520 of the stopper wall portion 500 mentioned below. The engagement portion 520 of the stopper wall portion 500 can be inserted into the insertion hole 102*a*3.

The stopper wall portion 500 is attached to the loose engagement convex portion 102*a*E inserted in a loose engagement concave portion 52*a*D and functions as a retainer of the terminal block 70D for the bobbin 40E. The stopper wall portion 500 includes a wall portion 510 and the engagement portion 520. The wall portion 510 has a substantially flat plate shape. The area of each surface of the wall portion 510 in the X-axis direction is larger than the opening area of the attachment portion 72*b* of the loose engagement concave portion 72*a*D.

The engagement portion 520 is formed on the inner surface of the wall portion 510 in the X-axis direction and protrudes inward in the X-axis direction. The engagement portion 520 has a solid shape. When the loose engagement convex portion 102*a*E is disposed in the loose engagement concave portion 72*a*D, the engagement portion 520 is inserted into the insertion hole 102*a*3 of the loose engagement convex portion 102*a*E and engages with the loose engagement convex portion 102*a*E.

When the engagement portion 520 is engaged with the loose engagement convex portion 102*a*E, the terminal block 70D is disposed to be sandwiched by the insulation wall 100 and the wall portion 510 (FIG. 20). The terminal block 70D is movable in the X-axis direction between the insulation wall 100 and the wall portion 510. When the terminal block 70D moves outward in the X-axis direction by a predetermined amount, the surroundings of the attachment portion 72*b* of the terminal block 70D contacts with the wall portion 510, and the terminal block 70D is prevented from moving outward from the contact position in the X-axis direction. This allows the wall portion 510 to prevent the terminal block 70D from coming off toward the outside of the bobbin 40E in the X-axis direction.

As shown in FIG. 22, the width of the loose engagement concave portion 72*a*D in the Y-axis direction is larger than that of the loose engagement convex portion 102*a*E in the Y-axis direction. In addition, the width of the loose engagement concave portion 72*a*D in the Z-axis direction is larger than that of the loose engagement convex portion 102*a*E in the Z-axis direction. Thus, when the loose engagement convex portion 102*a*E is attached to the loose engagement concave portion 72*a*D of the terminal block 70D, a gap G5 surrounding the loose engagement convex portion 102*a*E is formed between the loose engagement convex portion 102*a*E and the inner wall of the loose engagement concave portion 72*a*D. Thus, the loose engagement convex portion 102*a*E is inserted in the loose engagement concave portion 72*a*E so as to be movable both in the Y-axis direction and the Z-axis direction within the gap G5, and the terminal block 70D for holding the terminal fittings 91B and 92B can be attached to the bobbin 40E so as to be movable both in the Y-axis direction and the Z-axis direction of the bobbin 40E.

As with First Embodiment, the loose engagement convex portion 102*a*E is inserted movably in the X-axis direction, and the terminal block 70D for holding the terminal fittings 91B and 92B can be attached to the bobbin 40E so as to be movable in the X-axis direction of the bobbin 40E.

The structure shown above is also provided in the loose engagement convex portion 202*a*E. The terminal block 80D can similarly be attached to the bobbin 40E so as to be movable in each of the X-axis, the Y-axis, and the Z-axis of the bobbin 40E. In addition, the wall portion 510 can prevent the terminal block 80D from coming off from the bobbin 40E toward the outside in the X-axis direction.

In the present embodiment, effects similar to those of First Embodiment are obtained. Moreover, in the present embodiment, since the wall portion 510 engages with the loose engagement convex portion 102*a*E, the stopper wall portion 500 can prevent the terminal block 70D from coming off from the bobbin 40E while the loose engagement convex portion 102*a*E is being attached to the loose engagement concave portion 72*a*D so as to be movable in the X-axis direction and the Y-axis direction.

Instead of connecting the stopper wall portion 500 and the loose engagement convex portion 102*a*E via the engagement portion 520, the stopper wall portion 500 and the loose engagement convex portion 102*a*E may be connected with resin (e.g., pasty filler or adhesive). In this case, the stopper wall portion 500 may have any shape as long as the stopper wall portion 500 can be attached to the loose engagement convex portion 102*a*E inserted in the loose engagement concave portion 72*a*D. When the stopper wall portion 500 is attached to the loose engagement convex portion 102*a*E with resin, the stopper wall portion 500 can prevent the terminal block 70D (80D) from coming off from the bobbin 40E while the loose engagement convex portion 102*a*E is being attached to the loose engagement concave portion 72*a*D so as to be movable in the X-axis direction and the Y-axis direction.

Seventh Embodiment

Figure 23:
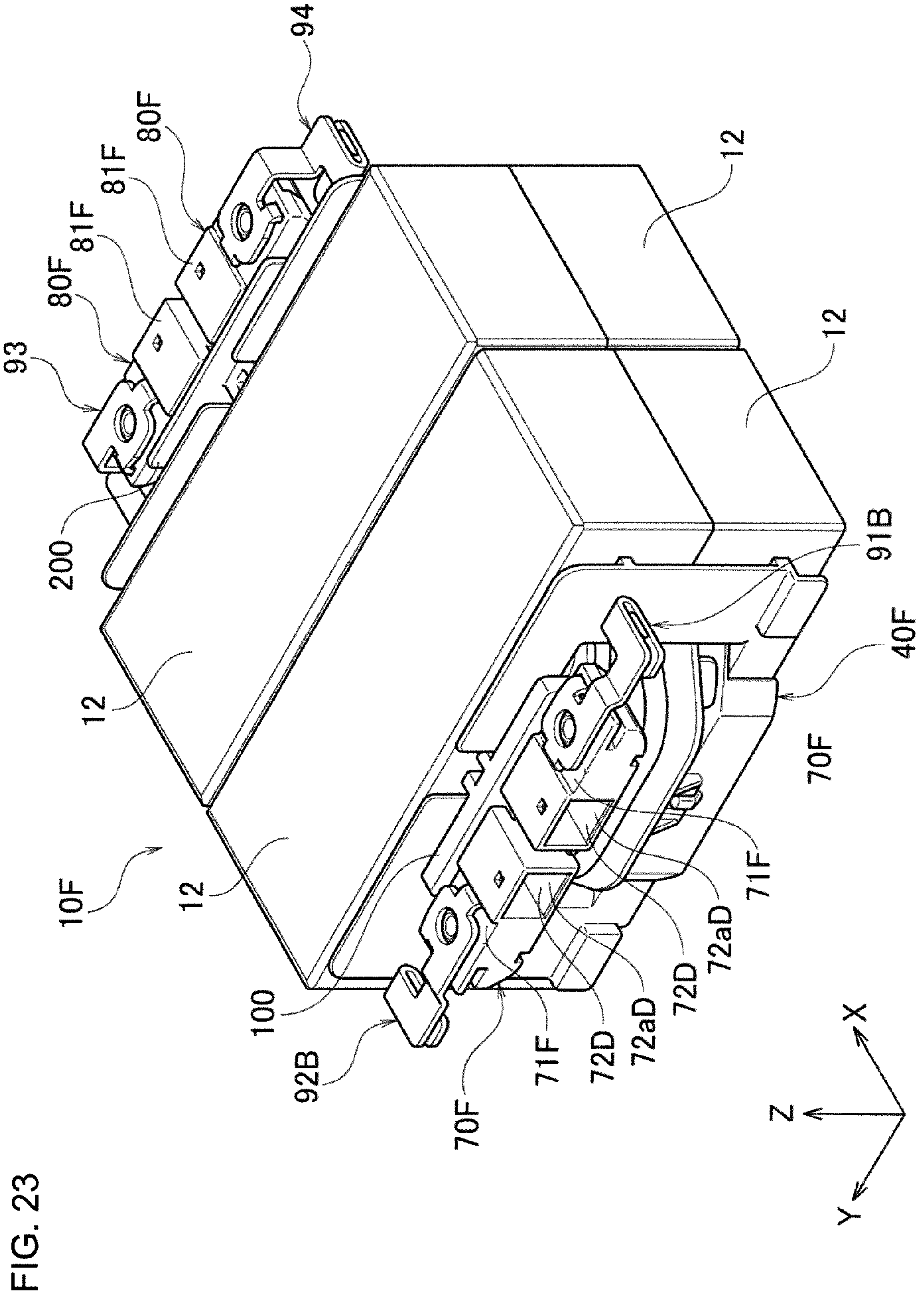
FIG. 23 is a perspective view of a coil device according to Seventh Embodiment of the present invention.
Figure 24:
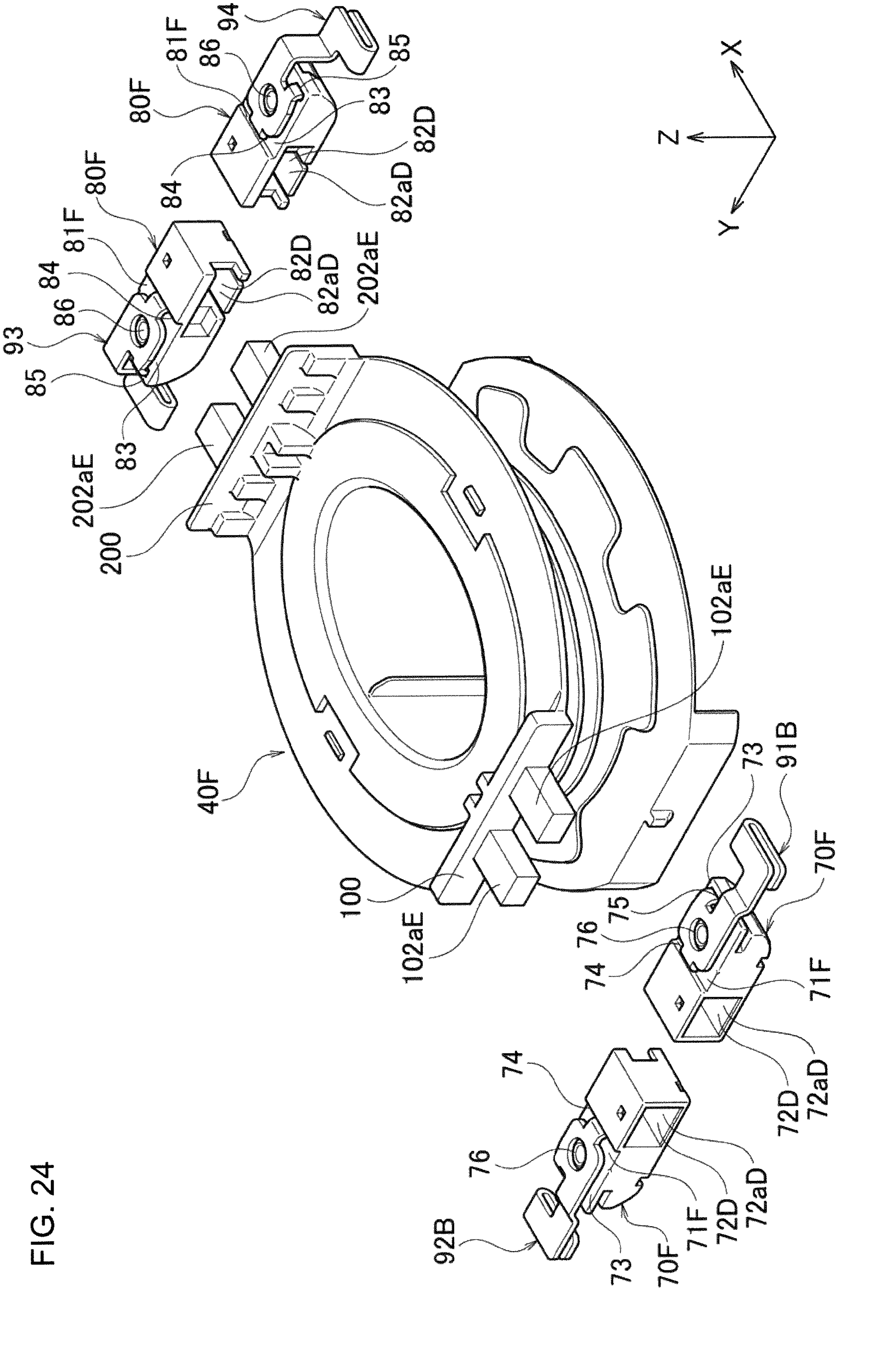
FIG. 24 is an exploded perspective view of a main part of the coil device shown in FIG. 23.
Figure 25:
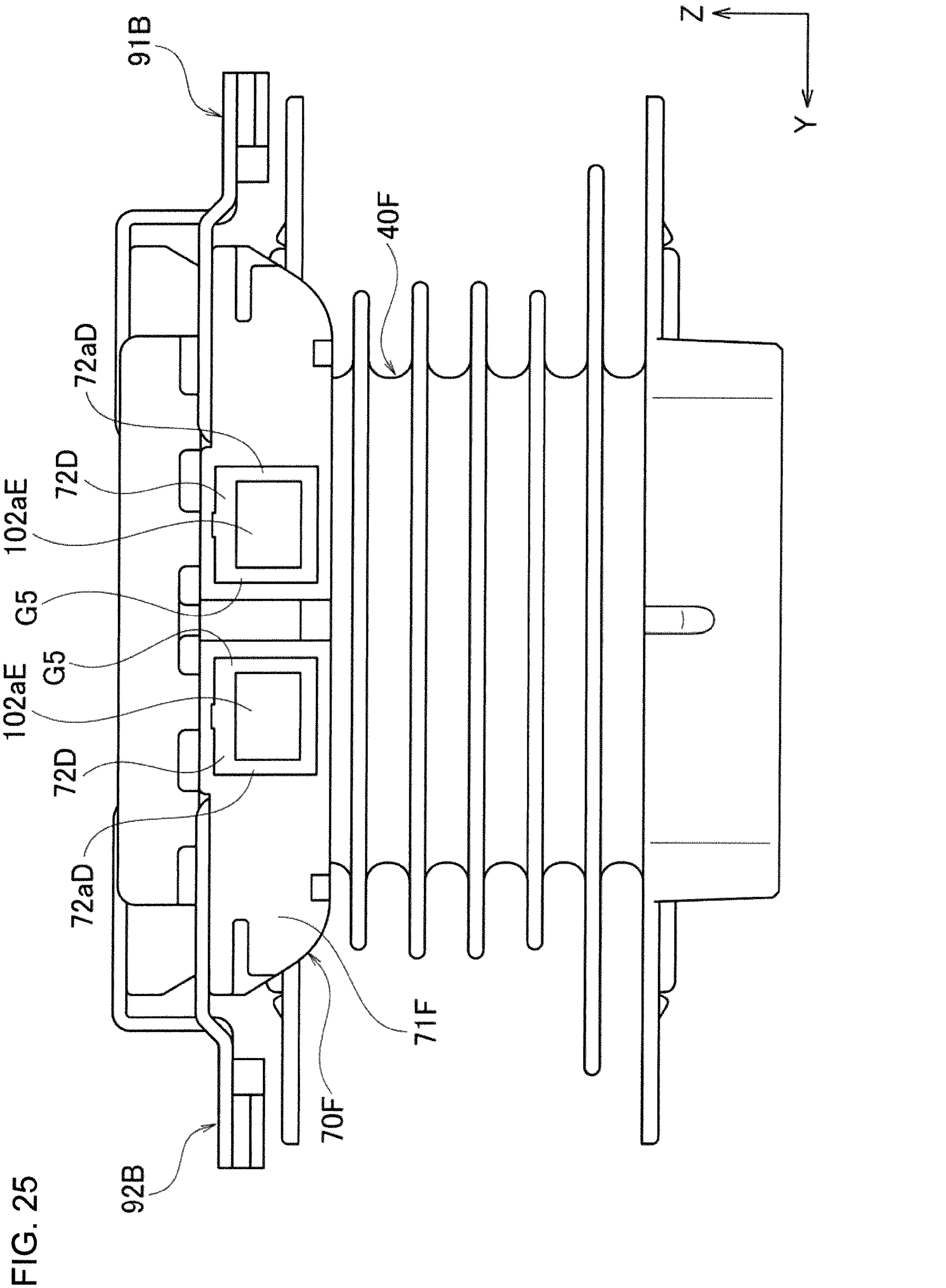
FIG. 25 is an enlarged perspective view when a terminal block is attached to a bobbin shown in FIG. 24.

Except for the following respects, a coil device 10F according to Seventh Embodiment shown in FIG. 23 to FIG. 25 has similar structure and effect to the coil device 10E according to Fifth Embodiment. In FIG. 23 to FIG. 25, the members common with those of the coil device 10E according to Fifth Embodiment are given a similar reference numeral and are not partly explained.

As shown in FIG. 23, the coil device 10F according to Seventh Embodiment is different from the coil device 10E according to Fifth Embodiment in that the coil device 10F includes a bobbin 40F, two terminal blocks 70F and 70F, and two terminal blocks 80F and 80F. In the present embodiment, a plurality of terminal fittings 91B, 92B, 93, and 94 is respectively attached to the terminal blocks 70F, 70F, 80F, and 80F, and a terminal block is disposed for each terminal fitting.

As shown in FIG. 24, the bobbin 40F is different from the bobbin 40E according to Fifth Embodiment in that the insulation wall 100 is provided with two loose engagement convex portions 102*a*E and 102*a*E, and that the insulation wall 200 is provided with two loose engagement convex portions 202*a*E and 202*a*E. The two loose engagement convex portions 102*a*E and 102*a*E are arranged at a predetermined interval in the Y-axis direction and extend outward from the insulation wall 100 in the X-axis direction so as to be substantially parallel to each other. The two loose engagement convex portions 202*a*E and 202*a*E are arranged at a predetermined interval in the Y-axis direction and extend outward from the insulation wall 200 in the X-axis direction so as to be substantially parallel to each other.

The configurations of the terminal blocks 70F and the terminal blocks 80F are the same, and the configuration of the terminal block 80F is not thereby explained below. Each of the terminal blocks 70F is provided with one each of a base body 71F, the through hole 72D, the terminal attachment portion 73, the terminal groove 74, the engagement groove 75, and the attachment hole 76.

As shown in FIG. 25, the loose engagement convex portion 102*a*E formed on one side of the insulation wall 100 in the Y-axis direction is inserted into the loose engagement concave portion 72*a*D of the terminal block 70F disposed on one side in the Y-axis direction, and the loose engagement convex portion 102*a*E formed on the other side of the insulation wall 100 in the Y-axis direction is inserted into the loose engagement concave portion 72*a*D of the terminal block 70F disposed on the other side in the Y-axis direction.

In this state, as with Fifth Embodiment, the loose engagement convex portion 102*a*E (102*a*E) is inserted in the loose engagement concave portion 72*a*D (72*a*D) so as to be movable both in the Y-axis direction and the Z-axis direction within the gap G5, and the terminal block 70F for holding the terminal fitting 91B (92B) can be attached to the bobbin 40F so as to be movable both in the Y-axis direction and the Z-axis direction of the bobbin 40F. The loose engagement convex portion 102*a*E (102*a*E) is inserted movably in the X-axis direction, and the terminal block 70F for holding the terminal fitting 91B (92B) can be attached to the bobbin 40F so as to be movable in the X-axis direction of the bobbin 40F.

The structure shown above is also provided in the terminal blocks 80F. The terminal blocks 80F can similarly be attached to the bobbin 40F so as to be movable in each of the X-axis, the Y-axis, and the Z-axis of the bobbin 40F. Incidentally, the retaining mechanism shown in First Embodiment or Fifth Embodiment can be applied to the retaining of the terminal blocks 70F and 80F for the bobbin 40F.

In the present embodiment, the plurality of terminal fittings 91B and 92B (93 and 94) is attached to each of the plurality of terminal blocks 70F (80F). Thus, the terminal fittings 91B and 92B (93 and 94) can be moved relatively to the bobbin 40F in an independent manner for each of the terminal blocks 70F (80F), and the insertion holes 91*d*-94*d* of the terminal fittings 91B, 92B, 93, and 94 and the attachment holes 302 of the circuit board 300 can accurately be positioned for each of the terminal fittings 91B, 92B, 93, and 94. Thus, it is easy to accurately position and connect a circuit pattern of the circuit board 300 and the terminal fittings 91B, 92B, 93, and 94 using a fastener, such as screws 304.

The present invention is not limited to the above-mentioned embodiments and can variously be modified within the scope of the present invention.

For example, the first wire 22 does not need to be α-wound and may be normally wound. Even with the normal winding, the effects of the present invention can be expected. The specific shape of the bobbin 40 or the specific shape of the core 12 is not limited to one shown in the above-mentioned embodiments and can variously be modified. In addition to transformers for chargers, the coil device according to the present invention can also be used for, for example, a reactor or so.

In the above-mentioned embodiments, the loose engagement convex portion and the loose engagement concave portion may be reversed. That is, the loose engagement convex portion may be formed on the terminal block 70 or 80, and the loose engagement concave portion may be formed on the bobbin 40. The winding method of the wires 22 and 32 wound inside the coil devices 10 and 10A is not limited to one shown in the above-mentioned embodiments. In the above-mentioned example, the outer coil portion 30 is wound around the outside of the inner coil portion 20, but for example, the coil device according to the present invention can also be applied to a coil device in which an upper coil portion and a lower coil portion are separated in the Z-axis. In addition, the coil device according to the present invention can also be applied to a coil device including a terminal block only on one side in the X-axis.

In the above-mentioned embodiments, the X-axis (first axis), the Y-axis (second axis), and the Z-axis (third axis) are substantially perpendicular to each other, but the angles of these axes are not limited to 90 degrees and may be any other angles.

The features of Third Embodiment may be applied to First Embodiment, Second Embodiment, and Fourth to Seventh Embodiments, and the terminal fittings 91-94 in addition to the terminal blocks 70 and 80 may also be movable both in the X-axis direction and the Y-axis direction of the bobbin 40.

The features of Fourth Embodiment may be applied to First to Third Embodiments and Fifth to Seventh Embodiments, and the terminal blocks 70 and 80 may be movable both in the X-axis direction and the Y-axis direction of the case 400.

The features of Fifth Embodiment may be applied to First Embodiment, Second Embodiment, and Fourth Embodiment, and the terminal blocks 70 and 80 may be movable in each of the X-axis direction, the Y-axis direction, and the Z-axis direction of the bobbin 40.

The features of Sixth Embodiment may be applied to Fifth Embodiment and Seventh Embodiment, and the stopper wall portion 500 may prevent the terminal blocks 70 and 80 from coming off from the bobbin 40.

The features of Seventh Embodiment may be applied to First Embodiment to Sixth Embodiment, and each of the terminals 91-94 may be provided with a terminal block.

In the above-mentioned embodiments, the wires 22 and 32 may be made of various wires, such as round wires and flat wires. When a flat wire is used, edgewise or flatwise wire can be used. Instead of the wires 22 and 32, a plate-shaped conductor made of, for example, a copper plate may be used.

In the above-mentioned embodiments, the circuit board 300 is exemplified as a connection target (installation target) of the coil device 10 shown in FIG. 1A, but the coil device 10 may be attached to a connector or so. In Second Embodiment, for example, the external circuit connection pieces 95*d*-98*d* may be inserted into a connector.

In First Embodiment and Third Embodiment to Seventh Embodiment, the insertion holes 91*d*-94*d* may be formed by screw holes that are screwed with the screws 304 shown in FIG. 1A. In Second Embodiment, the coil device 10A may be fixed to the circuit board 300*a* by forming screw holes in the external circuit connection pieces 95*d*-98*d* and screwing the screws 304 with the screw holes.

In First Embodiment, the outer covers 79 and 89 may also cover the ends of the terminal blocks 70 and 80 in the Z-axis direction so as to expose the wire connection portions 91*a*-98*a* of the terminals 91-94. In this structure, the surroundings of the loose engagement convex portion 102*a* and the loose engagement concave portion 72*a* can be covered by the outer cover 79 (89), and it is possible to prevent the loose engagement convex portion 102*a* and the loose engagement concave portion 72*a* from being deformed due to external force or so and to effectively prevent the terminal blocks 70 and 80 from coming off from the bobbin 40.

DESCRIPTION OF THE REFERENCE NUMERICAL

10, 10A-10F . . . coil device
12 . . . core
13 . . . base
14 . . . middle leg
16 . . . side leg
20 . . . inner coil
22 . . . first wire
22*a* . . . lead portion (end of wire)
30 . . . outer coil
32 . . . second wire
32*a* . . . lead portion (end of wire)
40, 40B-40F . . . bobbin
42 . . . bobbin board
42*a* . . . leg portion
44 . . . first hollow cylinder portion
44*a* . . . first through hole
44*b* . . . separation convex portion
45 . . . first winding portion
45*a* . . . first main winding portion
45*b* . . . first sub winding portion
46 . . . winding partition flange
46*a* . . . partition convex piece (convex portion)
48 . . . bobbin upper flange portion
48*a* . . . step portion
48*b* . . . positioning concave portion
48*c* . . . engagement convex portion
50 . . . bobbin cover
50*a*, 50*b* . . . half-split body
52 . . . cover lower flange portion
52*a* . . . clearance holding piece (non-winding portion)
52*b* . . . opening
53 . . . split connection portion
53*a* . . . inner connection piece
53*b* . . . outer connection piece
54 . . . second hollow cylinder portion
55 . . . second winding portion
58 . . . upper flange portion
58*a* . . . connection upper flange portion
58*b* . . . connection lower flange portion
58*c*, 58*d* . . . step convex portion
58*e* . . . stopper convex portion
58*f*, 58*g* . . . pedestal
60 . . . core cover
62 . . . cover body
62*a* . . . split piece
64 . . . attachment edge
64*a* . . . protrusion piece
64*b* . . . opening
66 . . . insulation plate portion
66*a* . . . engagement convex portion
70, 70B-70F, 80, 80B-80F . . . terminal block
71, 71B, 71D, 71F, 81, 81B, 81D, 81F . . . base body
72, 72D, 82, 82D . . . through hole
72*a*, 72*a*D, 82*a*, 82*a*D . . . loose engagement concave portion
72*a*1, 82*a*1 . . . main concave portion
72*a*2, 82*a*2 . . . sub concave portion
72*a*3, 82*a*3 . . . support piece
72*a*4, 82*a*4 . . . stopper convex portion
72*b*, 82*b* . . . attachment concave portion
73, 83 . . . terminal attachment portion
74, 74B, 84, 84B . . . terminal groove
740 . . . grip portion
75, 75B, 85, 85B . . . engagement groove
76, 86 . . . attachment hole
77 . . . nut
78, 88 . . . inner cover
79, 89 . . . outer cover
91-98, 91B, 92B . . . terminal fitting (terminal)
91*a*-98*a* . . . wire connection portion
91*b*-98*b* . . . hook portion
91*c*-98*c* . . . attachment portion
91*d*-94*d* . . . insertion hole

95*d*-98*d* . . . external circuit connection piece
91*e*-98*e*, 91*e*', 92*e*' . . . joint portion
91*f*-98*f* . . . insertion convex portion
100, 200 . . . insulation wall
102*a*, 102*a*', 102*a*", 202*a*, 202*a*', 202*a*" . . . loose engagement convex portion
102*a*1, 202*a*1 . . . main convex portion
102*a*2, 202*a*2 . . . sub convex portion
102*a*3 . . . insertion hole
104, 204 . . . retaining hole
105 . . . terminal-block installation portion
106 . . . connection portion
206 . . . taking-out groove
300, 300*a* . . . circuit board
302, 302*a* . . . attachment hole
304 . . . screw
400 . . . case
410 . . . side portion
420 . . . terminal-block attachment portion
430 . . . loose engagement convex portion
500 . . . stopper wall portion
510 . . . wall portion
520 . . . engagement portion

The invention claimed is:

1. A coil device comprising:
a bobbin including a winding portion;
a wire wound around an outer circumference of the winding portion;
a terminal connected to an end of the wire; and
a terminal block that holds the terminal,
wherein:
the terminal block has an engagement hole that receives an engagement part of the terminal such that a gap is between an inner peripheral surface of the engagement hole and an outer peripheral surface of the engagement part; and
the engagement hole and the engagement part are configured such that the engagement part can move relative to the engagement hole in all directions perpendicular to a longitudinal axis of the engagement hole due to the gap.

2. The coil device according to claim 1, wherein the terminal block is attached to a case for housing the bobbin or to a cover for covering at least a part of the bobbin.

3. The coil device according to claim 1, wherein the terminal is attached to the terminal block so as to movable along the longitudinal axis.

4. The coil device according to claim 1, wherein the terminal block is movable relative to the bobbin along the longitudinal axis.

5. The coil device according to claim 1, wherein
the terminal block is movable along the longitudinal axis, and
the terminal is integral with the terminal block.

6. The coil device according to claim 1, wherein
the terminal comprises a plurality of the terminals,
the terminal block comprises a plurality of the terminal blocks, and
the plurality of the terminals is attached to the plurality of the terminal blocks.

7. The coil device according to claim 1, wherein:
one of the bobbin and the terminal block has an engagement convex portion protruding in a first direction perpendicular to the longitudinal axis;
another of the bobbin and the terminal block has an engagement concave portion;
the engagement convex portion is received in the engagement concave portion; and
the engagement convex portion and the engagement concave portion are configured such that the engagement convex portion is movable relative to the engagement concave portion in directions perpendicular to the longitudinal axis within a predetermined range.

8. The coil device according to claim 7, wherein
an inner wall constituting the engagement concave portion is partly structured by a support piece elastically deformable to open an entrance width of the engagement concave portion, and
the support piece is has a stopper convex portion serving as a retainer by engaging the engagement convex portion.

9. The coil device according to claim 7, further comprising a stopper wall portion serving as a retainer by being attached to the engagement convex portion inserted in the engagement concave portion,
wherein the stopper wall portion includes an engagement portion for engaging the engagement convex portion.

10. The coil device according to claim 7, further comprising a stopper wall portion serving as a retainer by being attached to the engagement convex portion inserted in the engagement concave portion,
wherein the stopper wall portion is connected to the engagement convex portion with resin.

11. The coil device according to claim 1, wherein:
one of the bobbin and the terminal block has an engagement convex portion protruding along the longitudinal axis or in a first direction perpendicular to the longitudinal axis;
another of the bobbin and the terminal block has an engagement concave portion;
the engagement convex portion is received in the engagement concave portion; and
the engagement convex portion and the engagement concave portion are configured such that the engagement convex portion can move relative to the engagement concave portion in the first direction or a second direction perpendicular to the first direction and the longitudinal axis within a predetermined range.

12. The coil device according to claim 11, wherein
the engagement convex portion includes a main convex portion and a sub convex portion,
the engagement concave portion includes a main concave portion that receives the main convex portion and a sub concave portion that receives the sub convex portion,
the engagement convex portion and the engagement concave portion are configured such that a first gap between the sub convex portion and the sub concave portion is smaller than a second gap between the main convex portion and the main concave portion along the longitudinal axis, and
the terminal block is held movably relative to the bobbin in the all directions perpendicular to the longitudinal axis along a guide surface where the sub convex portion and the sub concave portion contact with each other.

13. The coil device according to claim 1, wherein the terminal includes:
a wire connection portion connected to the end of the wire; and
a hook portion at a different position from the wire connection portion and inserted movably along the longitudinal axis into a terminal groove of the terminal block.

14. The coil device according to claim 13, wherein the terminal includes:

an insertion hole between the wire connection portion and the hook portion; and an external circuit connection piece between the wire connection portion and the hook portion.

15. The coil device according to claim 13, wherein the terminal block has an inner cover that engages the hook portion and restricts a movement range of the terminal along the longitudinal axis.

16. The coil device according to claim 15, wherein the terminal block has an outer cover covering the inner cover, an end of the terminal block in a first direction perpendicular to the longitudinal axis, and an end of the terminal block in a second direction perpendicular to the longitudinal axis and the first direction.

17. The coil device according to claim 16, wherein the outer cover covers an end of the terminal block along the longitudinal axis so as to expose the wire connection portion.

18. A coil device comprising:

a bobbin including a winding portion with a longitudinal axis;

a wire wound around an outer circumference of the winding portion;

a terminal connected to an end of the wire; and a terminal block that holds the terminal; wherein:

one of the bobbin and the terminal block has an engagement convex portion;

another of the bobbin and the terminal block has an engagement concave portion;

the engagement convex portion is received in the engagement concave portion such that a gap is between an inner peripheral surface of the engagement concave portion and an outer peripheral surface of the engagement convex portion; and the engagement convex portion and the engagement concave portion are configured such that terminal block can move relative to the bobbin in all directions perpendicular to the longitudinal axis due to the gap.

* * * * *